United States Patent
Niizuma

(10) Patent No.: US 9,132,739 B2
(45) Date of Patent: Sep. 15, 2015

(54) VEHICLE AND WIRELESS POWER TRANSMISSION DEVICE

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 14/284,661

(22) Filed: May 22, 2014

(65) Prior Publication Data
US 2014/0257614 A1 Sep. 11, 2014

Related U.S. Application Data

(63) Continuation of application No. PCT/JP2012/080122, filed on Nov. 21, 2012.

(30) Foreign Application Priority Data

| Nov. 25, 2011 | (JP) | 2011-257943 |
| Nov. 30, 2011 | (JP) | 2011-262609 |
| Feb. 15, 2012 | (JP) | 2012-030569 |
| Feb. 16, 2012 | (JP) | 2012-031864 |
| Jun. 11, 2012 | (JP) | 2012-131786 |

(51) Int. Cl.
*B60L 11/18* (2006.01)
*B60M 7/00* (2006.01)
(Continued)

(52) U.S. Cl.
CPC .......... *B60L 11/1801* (2013.01); *B60L 11/182* (2013.01); *B60L 11/1809* (2013.01); (Continued)

(58) Field of Classification Search
CPC .............. B60L 11/1801; B60L 11/182; B60L 11/1809; B60M 7/003; H02J 5/005; H02J 17/00; Y02T 10/7005; Y02T 90/14; Y02T 90/122; Y02T 10/7258
USPC .......................................... 701/22
See application file for complete search history.

(56) References Cited

U.S. PATENT DOCUMENTS 6,014,597 A * 1/2000 Kochanneck .................... 701/22
7,602,143 B2 * 10/2009 Capizzo ........................ 320/109
(Continued)

FOREIGN PATENT DOCUMENTS

JP 08-033112 2/1996
JP 10-112902 4/1998
(Continued)

OTHER PUBLICATIONS

International Search Report and Written Opinion mailed Feb. 19 2013 in corresponding PCT International Application No. PCT/JP2012/080122.

*Primary Examiner* — Richard Camby
(74) *Attorney, Agent, or Firm* — Ostrolenk Faber LLP

(57) ABSTRACT

The vehicle includes a motor capable of producing motive power for movement; a storage battery capable of supplying electric power to drive the motor; and a secondary coil capable of performing wireless transmission of electric power between the secondary coil and a primary coil at an outside of the vehicle. In addition, the vehicle includes a command generation part capable of generating a command to move the vehicle so as to adjust a relative position of the secondary coil with respect to the primary coil, using a first received power value indicating an amount of electric power received by the secondary coil from the primary coil or using a second received power value indicating an amount of electric power received by the primary coil from the secondary coil.

44 Claims, 20 Drawing Sheets

(51) Int. Cl.
   *H02J 17/00* (2006.01)
   *H02J 5/00* (2006.01)

(52) U.S. Cl.
   CPC ............... *B60M7/003* (2013.01); *H02J 17/00* (2013.01); *H02J 5/005* (2013.01); *Y02T 10/7005* (2013.01); *Y02T 10/7258* (2013.01); *Y02T 90/122* (2013.01); *Y02T 90/14* (2013.01)

(56) References Cited

U.S. PATENT DOCUMENTS

2005/0264432 A1* 12/2005 Tanaka et al. ............... 340/932.2
2011/0082612 A1* 4/2011 Ichikawa ........................ 701/22

FOREIGN PATENT DOCUMENTS

| | | |
|---|---|---|
| JP | 2006-345588 | 12/2006 |
| JP | 2008-236916 | 10/2008 |
| JP | 2008-289273 | 11/2008 |
| JP | 2009-225551 | 10/2009 |
| JP | 2010-172184 | 8/2010 |
| JP | 2010-226945 | 10/2010 |
| JP | 2010-252497 | 11/2010 |
| JP | 2010-259136 | 11/2010 |
| JP | 2011-160515 | 8/2011 |
| JP | 2011-188679 | 9/2011 |
| JP | 2011-205829 | 10/2011 |
| WO | WO 2010/052785 A1 | 5/2010 |

* cited by examiner

VEHICLE AND WIRELESS POWER TRANSMISSION DEVICE

This application is a Continuation application based on International Application No. PCT/JP2012/080122, filed Nov. 21, 2012, which claims priority on Japanese Patent Application No. 2011-257943, filed on Nov. 25, 2011, Japanese Patent Application No. 2011-262609, filed on Nov. 30, 2011, Japanese Patent Application No. 2012-030569, filed on Feb. 15, 2012, Japanese Patent Application No. 2012-031864, filed on Feb. 16, 2012, and Japanese Patent Application No. 2012-131786, filed on Jun. 11, 2012, the contents of which are incorporated herein by reference.

TECHNICAL FIELD

The present invention relates to a vehicle which is movable using the motive power of a motor and to a wireless power transmission device which can wirelessly transmit electric power to the vehicle.

BACKGROUND ART

In recent years, in order to achieve a low carbon society, vehicles including a motor as a motive power source instead of a combustion engine or together with a combustion engine increase in number. Typical vehicles with a motor instead of a combustion engine include an electric vehicle (EV), and typical vehicles with a motor together with a combustion engine include a hybrid vehicle (HV). Such a vehicle includes a rechargeable storage battery (e.g., a secondary battery such as a lithium-ion battery or a nickel-hydrogen battery) which supplies electric power to drive the motor, and it is possible to charge the storage battery using electric power supplied from an external power unit.

In an electric vehicle or a hybrid vehicle (to be precise, a plug-in hybrid vehicle) being currently put to practical use, the electric power to charge a storage battery is generally transmitted through a cable connecting the vehicle and a power unit. In contrast, in recent years, a method in which electric power to charge a storage battery is wirelessly transmitted to a vehicle is proposed. In order to efficiently wirelessly transmit electric power, it is necessary to properly adjust the relative positional relationship between a power-transmitting coil (primary coil) provided in a power unit and a power-receiving coil (secondary coil) provided in a vehicle.

The following Patent Documents 1 to 6 disclose various methods to adjust the relative positional relationship between a primary coil and a secondary coil in order to efficiently perform the wireless power transmission. Specifically, Patent Document 1 discloses a technology to adjust the position of a secondary coil based on the detection result of a magnetic sensor which detects the position of a primary coil installed in the ground. Patent Documents 2 and 3 disclose technologies to adjust the position of a primary coil depending on the position of a secondary coil.

Patent Document 4 discloses a technology to guide a vehicle provided with a secondary coil to the optimum position when the vehicle is parked in a parking space, by displaying an image of a positioning marker captured by a camera provided in the vehicle on a display in the cabin thereof. Patent Document 5 discloses a technology to perform the positioning between a primary coil and a secondary coil by a member to be contacted which is provided in an unmanned transportation vehicle contacting a contacting member provided in a power supply unit. Patent Document 6 discloses a technology in which a secondary coil used to sense an intensity of electric power is provided in addition to another secondary coil to charge a battery and the positioning between a primary coil to charge the battery and the secondary coil used to charge the battery is performed based on the detection result of an intensity of electric power obtained by these secondary coils.

DOCUMENT OF RELATED ART

Patent Document

[Patent Document 1] Japanese Patent Application, First Publication No. H8-33112
[Patent Document 2] Japanese Patent Application, First Publication No. 2006-345588
[Patent Document 3] Japanese Patent Application, First Publication No. 2011-205829
[Patent Document 4] Japanese Patent Application, First Publication No. 2010-226945
[Patent Document 5] Japanese Patent Application, First Publication No. 2010-259136
[Patent Document 6] Japanese Patent Application, First Publication No. 2011-160515

SUMMARY OF INVENTION

Technical Problem

In the technologies disclosed in Patent Documents 1 to 3, the position of the secondary coil is adjusted based on the position of the primary coil, or the position of the primary coil is adjusted based on the position of the secondary coil. Therefore, a motor, a drive mechanism or the like is required to adjust the position of the primary coil or the secondary coil, and thus the size and the costs may increase.

In the technology disclosed in Patent Document 4, the vehicle is guided to the optimum position by displaying the captured image of the positioning marker. In the technology disclosed in Patent Document 5, the unmanned transportation vehicle contacts the power supply unit, and thereby the positioning is performed. Therefore, in these technologies, in order to accept various vehicles and unmanned transportation vehicles which vary in size or in the attachment position of the secondary coil, it is necessary to prepare the most suitable positioning marker or contacting member for each kind of vehicles and unmanned transportation vehicles. However, it may not be realistic to choose positioning markers or contacting members depending on the various kinds of vehicles and unmanned transportation vehicles. In addition, in the technology disclosed in Patent Document 6, the configurations of secondary coils and the circuits thereof which are provided in the vehicle may become complicated.

The present invention was made in view of the above circumstances, and an object thereof is to provide a vehicle and a wireless power transmission device which can efficiently perform the wireless power transmission without causing increase in size or in cost, even if vehicles have various sizes or various coil attachment positions.

Solution to Problem

According to a first aspect of the present invention, a vehicle includes a motor capable of producing motive power for movement; a storage battery capable of supplying electric power to drive the motor; and a secondary coil capable of performing wireless transmission of electric power between the secondary coil and a primary coil at an outside of the vehicle. In addition, the vehicle includes a command generation part capable of generating a command to move the vehicle so as to adjust a relative position of the secondary coil with respect to the primary coil, using a first received power value indicating an amount of electric power received by the secondary coil from the primary coil or using a second received power value indicating an amount of electric power received by the primary coil from the secondary coil.

According to a second aspect of the present invention, in the first aspect, the vehicle further includes a first received power value-computing part configured to determine the first received power value to be used in the command generation part; and a control part capable of controlling the motor based on the command generated by the command generation part so as to adjust the position of the secondary coil with respect to the primary coil.

According to a third aspect of the present invention, in the second aspect, the control part adjusts the position of the secondary coil with respect to the primary coil by controlling the motor and by moving the vehicle backward and forward.

According to a fourth aspect of the present invention, in the second or third aspect, the vehicle is configured so that electric power received by the secondary coil is used as electric power to drive the motor when the control part controls the motor so as to perform positioning of the secondary coil with respect to the primary coil.

According to a fifth aspect of the present invention, in any one of the second to fourth aspects, the vehicle further includes a charging device capable of charging the storage battery using electric power received by the secondary coil; and a switching circuit used to electrically disconnect the motor from the storage battery during charging of the storage battery by the charging device.

According to a sixth aspect of the present invention, in any one of the second to fifth aspects, the vehicle further includes a first vehicle input part into which a first power supply value is input from the outside, the first power supply value indicating an amount of electric power which the primary coil supplies to the secondary coil; and a first efficiency calculation part configured to determine power transmission efficiency from the primary coil to the secondary coil, using the first received power value determined by the first received power value-computing part and using the first power supply value input into the first vehicle input part. In addition, the command generation part generates the command based on the power transmission efficiency determined by the first efficiency calculation part.

According to a seventh aspect of the present invention, a wireless power transmission device capable of wirelessly transmitting electric power outside thereof, the wireless power transmission device is capable of transmitting, to the secondary coil from the primary coil, electric power to charge the storage battery provided in the vehicle according to any one of the first to sixth aspects.

According to an eighth aspect of the present invention, a wireless power transmission device capable of wirelessly transmitting electric power outside thereof and of wirelessly transmitting, to the secondary coil from the primary coil, electric power to charge the storage battery provided in the vehicle according to the sixth aspect, the wireless power transmission device includes a first power supply value-computing part configured to determine the first power supply value indicating an amount of electric power which the primary coil supplies to the secondary coil; and a first device output part used to output the first power supply value determined by the first power supply value-computing part outside.

According to a ninth aspect of the present invention, in the first aspect, the vehicle further includes a first load device used to consume electric power received by the secondary coil; a power-supplying destination-setting device capable of setting a supply destination of the electric power received by the secondary coil to one of the first load device and the storage battery; a first received power value-computing part configured to determine the first received power value indicating an amount of electric power received by the secondary coil in a state where the supply destination of the electric power received by the secondary coil is set to the first load device by the power-supplying destination-setting device; and a control part capable of controlling the motor based on the command generated by the command generation part so as to adjust the position of the secondary coil with respect to the primary coil. In addition, the command generation part generates the command using the first received power value determined by the first received power value-computing part.

According to a tenth aspect of the present invention, in the ninth aspect, the control part adjusts the position of the secondary coil with respect to the primary coil by controlling the motor and by moving the vehicle backward and forward.

According to an eleventh aspect of the present invention, in the ninth or tenth aspect, the vehicle further includes a first vehicle input part into which a first power supply value is input from the outside, the first power supply value indicating an amount of electric power which the primary coil supplies to the secondary coil; and a first efficiency calculation part configured to determine power transmission efficiency from the primary coil to the secondary coil, using the first received power value determined by the first received power value-computing part and using the first power supply value input into the first vehicle input part. In addition, the command generation part generates the command based on the power transmission efficiency determined by the first efficiency calculation part.

According to a twelfth aspect of the present invention, in any one of the ninth to eleventh aspects, the vehicle further includes a first vehicle output part used to output, outside, a positioning completion notification indicating that positioning of the secondary coil with respect to the primary coil is finished.

According to a thirteenth aspect of the present invention, a wireless power transmission device is capable of wirelessly transmitting electric power to the vehicle according to any one of the ninth to twelfth aspects using the primary coil.

According to a fourteenth aspect of the present invention, a wireless power transmission device is capable of wirelessly transmitting electric power to the vehicle according to the eleventh aspect using the primary coil. In addition, the wireless power transmission device includes a first power supply value-computing part configured to determine the first power supply value indicating an amount of electric power which the primary coil supplies to the secondary coil; and a first device output part used to output the first power supply value determined by the first power supply value-computing part outside thereof.

According to a fifteenth aspect of the present invention, a wireless power transmission device is capable of wirelessly transmitting electric power to the vehicle according to the twelfth aspect using the primary coil. In addition, the wireless power transmission device includes a first power supply value-computing part configured to determine a first power supply value indicating an amount of electric power which the primary coil supplies to the secondary coil; a first device output part used to output the first power supply value determined by the first power supply value-computing part outside thereof, and a first device input part into which the positioning completion notification output from the first vehicle output part is input. Furthermore, the wireless power transmission device is configured to increase an amount of electric power supplied from the primary coil to the secondary coil when the positioning completion notification is input into the first device input part.

According to a sixteenth aspect of the present invention, in the first aspect, the vehicle further includes a second vehicle input part into which the second received power value is input from the outside, the second received power value indicating an amount of electric power received by the primary coil from the secondary coil and being used in the command generation part; and a control part capable of controlling the motor based on the command generated by the command generation part so as to adjust the position of the secondary coil with respect to the primary coil.

According to a seventeenth aspect of the present invention, in the sixteenth aspect, the vehicle further includes a second power supply value-computing part configured to determine a second power supply value indicating an amount of electric power which the secondary coil supplies to the primary coil; and a second efficiency calculation part configured to determine power transmission efficiency from the secondary coil to the primary coil, using the second power supply value determined by the second power supply value-computing part and using the second received power value input into the second vehicle input part. In addition, the command generation part generates the command based on the power transmission efficiency determined by the second efficiency calculation part.

According to an eighteenth aspect of the present invention, in the sixteenth or seventeenth aspect, the control part adjusts the position of the secondary coil with respect to the primary coil by controlling the motor and by moving the vehicle backward and forward.

According to a nineteenth aspect of the present invention, in any one of the sixteenth to eighteenth aspects, the vehicle is configured to start receiving electric power from the primary coil through the secondary coil when positioning of the secondary coil with respect to the primary coil is finished.

According to a twentieth aspect of the present invention, in any one of the sixteenth to eighteenth aspects, the vehicle further includes a first vehicle output part used to output, outside, a positioning completion notification indicating that positioning of the secondary coil with respect to the primary coil is finished. In addition, the vehicle is configured to start receiving electric power from the primary coil through the secondary coil when the first vehicle output part outputs the positioning completion notification outside.

According to a twenty-first aspect of the present invention, a wireless power transmission device is capable of wirelessly receiving or transmitting electric power from or to the vehicle according to any one of the sixteenth to nineteenth aspects using the primary coil. In addition, the wireless power transmission device includes a second load device used to consume electric power received by the primary coil from the secondary coil; a second received power value-computing part configured to determine the second received power value indicating an amount of electric power received by the primary coil from the secondary coil; and a second device output part used to output the second received power value determined by the second received power value-computing part outside thereof. Furthermore, the wireless power transmission device is configured to start supplying electric power from the primary coil to the secondary coil when positioning of the secondary coil with respect to the primary coil is finished.

According to a twenty-second aspect of the present invention, a wireless power transmission device is capable of wirelessly receiving or transmitting electric power from or to the vehicle according to the twentieth aspect using the primary coil. In addition, the wireless power transmission device includes a second load device used to consume electric power received by the primary coil from the secondary coil; a second received power value-computing part configured to determine the second received power value indicating an amount of electric power received by the primary coil from the secondary coil; a second device output part used to output the second received power value determined by the second received power value-computing part outside thereof; and a first device input part into which the positioning completion notification output from the first vehicle output part is input. Furthermore, the wireless power transmission device is configured to start supplying electric power from the primary coil to the secondary coil when the positioning completion notification is input into the first device input part.

According to a twenty-third aspect of the present invention, in the first aspect, the command generation part is configured as a signal presentation part used to present the command to move the vehicle so as to adjust the relative position of the secondary coil with respect to the primary coil, as a signal indicating a direction in which the vehicle is to be moved.

According to a twenty-fourth aspect of the present invention, in the twenty-third aspect, the vehicle further includes a first received power value-computing part configured to determine the first received power value which indicates an amount of electric power received by the secondary coil from the primary coil and which is used in the command generation part.

According to a twenty-fifth aspect of the present invention, in the twenty-third or twenty-fourth aspect, the signal presentation part is configured to present the signal indicating the direction in which the vehicle is to be moved, using light or sound.

According to a twenty-sixth aspect of the present invention, in any one of the twenty-third to twenty-fifth aspects, the vehicle is configured so that electric power received by the secondary coil is used as electric power to drive the motor.

According to a twenty-seventh aspect of the present invention, in any one of the twenty-third to twenty-sixth aspects, the vehicle further includes a charging device capable of charging the storage battery using electric power received by the secondary coil; and a switching circuit used to electrically disconnect the motor from the storage battery during charging of the storage battery by the charging device.

According to a twenty-eighth aspect of the present invention, in any one of the twenty-fourth to twenty-seventh aspects, the vehicle further includes a first vehicle input part into which a first power supply value is input from the outside, the first power supply value indicating an amount of electric power which the primary coil supplies to the secondary coil; and a first efficiency calculation part configured to determine power transmission efficiency from the primary coil to the secondary coil, using the first received power value determined by the first received power value-computing part and using the first power supply value input into the first vehicle input part. In addition, the command generation part generates the command based on the power transmission efficiency determined by the first efficiency calculation part.

According to a twenty-ninth aspect of the present invention, a wireless power transmission device is capable of wirelessly transmitting, to the secondary coil from the primary coil, electric power to charge the storage battery provided in the vehicle according to any one of the twenty-third to twenty-eighth aspects.

According to a thirtieth aspect of the present invention, a wireless power transmission device is capable of wirelessly transmitting, to the secondary coil from the primary coil, electric power to charge the storage battery provided in the vehicle according to the twenty-eighth aspect. In addition, the wireless power transmission device includes a first power supply value-computing part configured to determine a first power supply value indicating an amount of electric power which the primary coil supplies to the secondary coil; and a first device output part used to output the first power supply value determined by the first power supply value-computing part outside thereof.

According to a thirty-first aspect of the present invention, in the twenty-third aspect, the vehicle further includes a first load device used to consume electric power received by the secondary coil; a power-supplying destination-setting device capable of setting a supply destination of the electric power received by the secondary coil to one of the first load device and the storage battery; and a first received power value-computing part configured to determine the first received power value indicating an amount of electric power received by the secondary coil in a state where the supply destination of the electric power received by the secondary coil is set to the first load device by the power-supplying destination-setting device. In addition, the signal presentation part is configured to present the signal indicating the direction in which the vehicle is to be moved, using the first received power value determined by the first received power value-computing part.

According to a thirty-second aspect of the present invention, in the thirty-first aspect, the signal presentation part is configured to present the signal indicating the direction in which the vehicle is to be moved, using light or sound.

According to a thirty-third aspect of the present invention, in the thirty-first or thirty-second aspect, the vehicle further includes a first vehicle input part into which a first power supply value is input from the outside, the first power supply value indicating an amount of electric power which the primary coil supplies to the secondary coil; and a first efficiency calculation part used to determine power transmission efficiency from the primary coil to the secondary coil, using the first received power value determined by the first received power value-computing part and using the first power supply value input into the first vehicle input part. In addition, the signal presentation part is configured to present the signal indicating the direction in which the vehicle is to be moved, based on the power transmission efficiency determined by the first efficiency calculation part.

According to a thirty-fourth aspect of the present invention, in any one of the thirty-first to thirty-third aspects, the vehicle further includes a first vehicle output part used to output, outside, a positioning completion notification indicating that positioning of the secondary coil with respect to the primary coil is finished.

According to a thirty-fifth aspect of the present invention, a wireless power transmission device is capable of wirelessly transmitting electric power to the vehicle according to any one of the thirty-first to thirty-fourth aspects using the primary coil.

According to a thirty-sixth aspect of the present invention, a wireless power transmission device is capable of wirelessly transmitting electric power to the vehicle according to the thirty-third aspect using the primary coil. In addition, the wireless power transmission device includes a first power supply value-computing part configured to determine a first power supply value indicating an amount of electric power which the primary coil supplies to the secondary coil; and a first device output part used to output the first power supply value determined by the first power supply value-computing part outside thereof.

According to a thirty-seventh aspect of the present invention, a wireless power transmission device is capable of wirelessly transmitting electric power to the vehicle according to the thirty-fourth aspect using the primary coil. In addition, the wireless power transmission device includes a first power supply value-computing part configured to determine a first power supply value indicating an amount of electric power which the primary coil supplies to the secondary coil; a first device output part used to output the first power supply value determined by the first power supply value-computing part outside thereof, and a first device input part into which the positioning completion notification output from the first vehicle output part is input. Furthermore, the wireless power transmission device is configured to increase an amount of electric power supplied from the primary coil to the secondary coil when the positioning completion notification is input into the first device input part.

According to a thirty-eighth aspect of the present invention, a vehicle includes a motor capable of producing motive power for movement; a storage battery capable of supplying electric power to drive the motor; a secondary coil capable of performing wireless transmission of electric power between the secondary coil and a primary coil at an outside of the vehicle; a first received power value-computing part configured to determine a first received power value indicating an amount of electric power received by the secondary coil from the primary coil; and a second vehicle output part used to output the first received power value determined by the first received power value-computing part outside.

According to a thirty-ninth aspect of the present invention, in the thirty-eighth aspect, the vehicle is configured so that electric power received by the secondary coil is used as electric power to drive the motor.

According to a fortieth aspect of the present invention, in the thirty-eighth or thirty-ninth aspect, the vehicle further includes a charging device capable of charging the storage battery using electric power received by the secondary coil; and a switching circuit used to electrically disconnect the motor from the storage battery during charging of the storage battery by the charging device.

According to a forty-first aspect of the present invention, in any one of the thirty-eighth to fortieth aspects, the vehicle further includes a first load device used to consume electric power received by the secondary coil; and a power-supplying destination-setting device capable of setting a supply destination of the electric power received by the secondary coil to one of the first load device and the storage battery. In addition, the first received power value-computing part determines the first received power value in a state where the supply destination of the electric power received by the secondary coil is set to the first load device by the power-supplying destination-setting device.

According to a forty-second aspect of the present invention, a wireless power transmission device is capable of wirelessly transmitting, from the primary coil, electric power to charge the storage battery provided in the vehicle according to any one of the thirty-eighth to forty-first aspects. In addition, the wireless power transmission device includes a first power supply value-computing part configured to determine a first power supply value indicating an amount of electric power which the primary coil supplies to the secondary coil;

a second device input part into which the first received power value indicating an amount of electric power received by the secondary coil from the primary coil is input; a third efficiency calculation part configured to determine power transmission efficiency from the primary coil to the secondary coil, using the first power supply value determined by the first power supply value-computing part and using the first received power value input into the second device input part; and a signal presentation part capable of presenting a signal indicating a direction in which the vehicle is to be moved, based on the power transmission efficiency determined by the third efficiency calculation part.

According to a forty-third aspect of the present invention, in the forty-second aspect, the signal presentation part is configured to present the signal indicating the direction in which the vehicle is to be moved, using light or sound.

Effects of Invention

According to the present invention, electric power can be wirelessly transmitted between a primary coil of a wireless power transmission device and a secondary coil of a vehicle. A command to move the vehicle can be generated using the first received power value which indicates the amount of electric power received by the secondary coil from the primary coil or using the second received power value which indicates the amount of electric power received by the primary coil from the secondary coil. The relative position of the secondary coil with respect to the primary coil can be properly adjusted by manually or automatically moving the vehicle based on the command. Therefore, even if vehicles have various sizes or various attachment positions of the secondary coil, the position thereof can be precisely adjusted, and electric power can be efficiently transmitted. In addition, a mechanism or the like which individually moves the primary coil or the secondary coil is unnecessary, and thus it is possible to restrict increase in size or in cost of a vehicle.

DESCRIPTION OF EMBODIMENTS

Hereinafter, vehicles and wireless power transmission devices according to embodiments of the present invention are described in detail with reference to the drawings. Moreover, vehicles illustrated in the following embodiments are electric vehicles using only a motor as a motive power source.

First Embodiment

Figure 1:
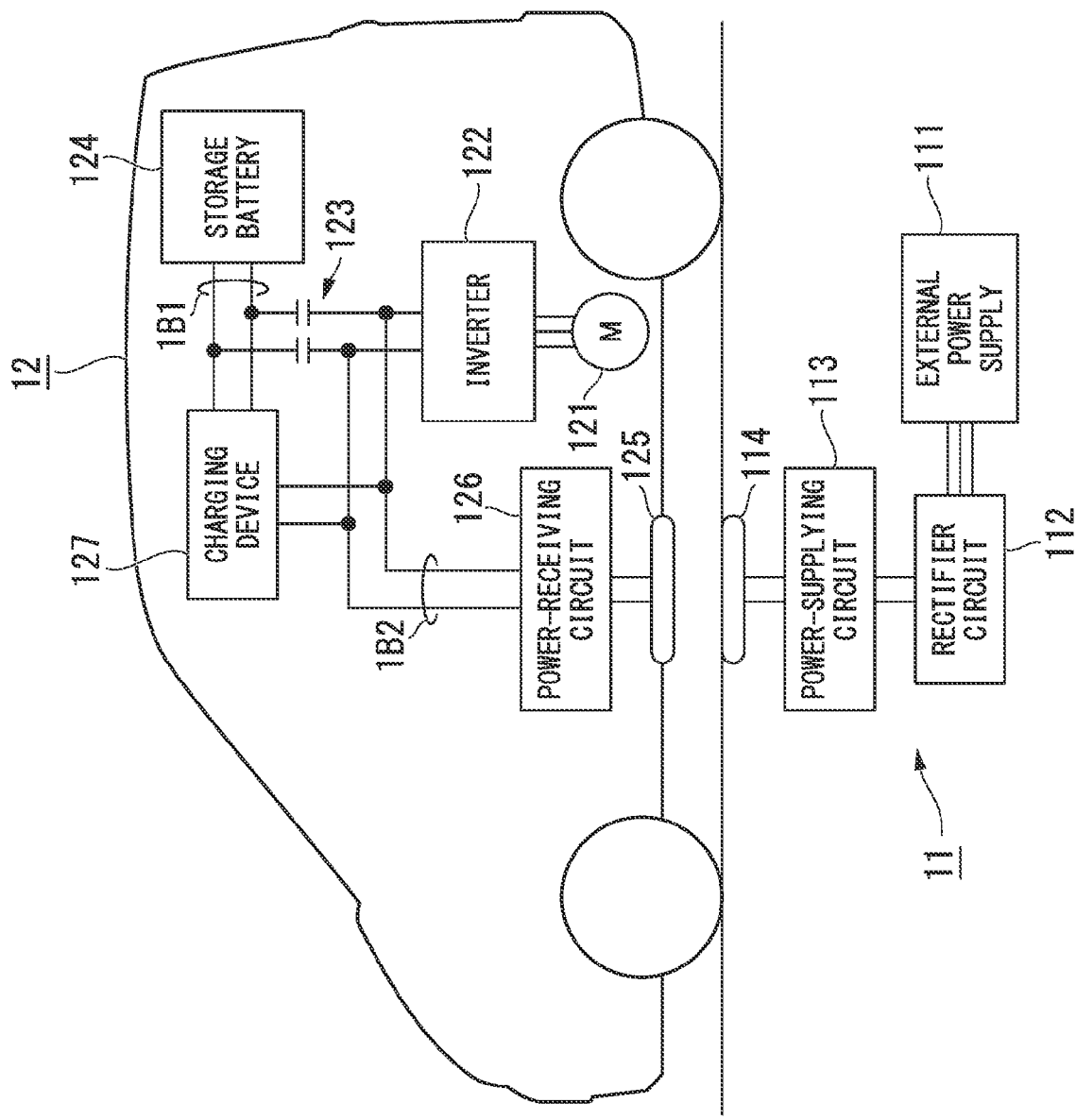
FIG. 1 is a block diagram showing main configurations of a vehicle and a wireless power transmission device according to a first embodiment of the present invention.

FIG. 1 is a block diagram showing main configurations of a vehicle and a wireless power transmission device according to a first embodiment of the present invention.

As shown in FIG. 1, a wireless power transmission device 11 of this embodiment is installed in the ground. When an electric vehicle 12 as a vehicle traveling on the ground stops in a predetermined positional relationship (positional relationship in which an electromagnetic coupling circuit described below is formed), the wireless power transmission device 11 can wirelessly transmit electric power (electric power to charge a storage battery 124) to the electric vehicle 12. The wireless power transmission device 11 includes an external power supply 111, a rectifier circuit 112, a power-supplying circuit 113, a power-transmitting coil 114 (primary coil), and the like.

The external power supply 111 is a power supply which supplies electric power required to generate electric power to be transmitted to the electric vehicle 12, and is a power supply which supplies, for example, three-phase AC power whose voltage is 200 V. In addition, the external power supply 111 is not limited to a three-phase AC power supply, and may be a power supply which supplies single-phase AC power such as a commercial AC power supply. The rectifier circuit 112 is a circuit which rectifies and converts AC power supplied from the external power supply 111, into DC power.

A DC power supply such as a fuel battery or a solar battery can be used for the external power supply 111. In this case, the rectifier circuit 112 can be omitted.

The power-supplying circuit 113 wirelessly supplies electric power to the electric vehicle 12 through an electromagnetic coupling circuit which is formed of the power-transmitting coil 114 and a power-receiving coil 125 provided in the electric vehicle 12, wherein the electric power is supplied from the rectifier circuit 112. Specifically, the power-supplying circuit 113 performs the wireless power supplying to the electric vehicle 12 by converting DC power from the rectifier circuit 112 into AC power and by supplying the AC power to the power-transmitting coil 114.

The power-transmitting coil 114 is installed in the ground and is a coil used to wirelessly supply AC power to the electric vehicle 12, wherein the AC power is supplied from the power-supplying circuit 113. The power-transmitting coil 114 and the power-receiving coil 125 provided in the electric vehicle 12 are disposed in adjacent positions to each other, and thereby the above-described electromagnetic coupling circuit is formed. The electromagnetic coupling circuit means a circuit in which the power-transmitting coil 114 and the power-receiving coil 125 are electromagnetically coupled together and the wireless power supplying from the power-transmitting coil 114 to the power-receiving coil 125 is performed. The electromagnetic coupling circuit may be either circuit, i.e., a circuit to supply electric power using "electromagnetic induction method" and a circuit to supply electric power using "electromagnetic field resonance method".

As shown in FIG. 1, the electric vehicle 12 as a vehicle includes a motor 121, an inverter 122, a contactor 123 (switching circuit), the storage battery 124, the power-receiving coil 125 (secondary coil), a power-receiving circuit 126, a charging device 127 and the like. The storage battery 124 and the charging device 127 among them are connected to a DC bus 1B1, and the inverter 122, the power-receiving circuit 126 and the charging device 127 are connected to a DC bus 1B2.

As a motive power source which produces motive power to move the electric vehicle 12, the motor 121 is mounted on the electric vehicle 12 and produces motive power depending on the drive of the inverter 122. For the motor 121, it is possible to use a motor such as a permanent magnet synchronous motor or an induction motor. The inverter 122 drives the motor 121 using electric power supplied from the storage battery 124 through the contactor 123, under the control of a control part 132 (omitted in FIG. 1, refer to FIG. 2).

The contactor 123 is provided between the DC bus 1B1 and the DC bus 1B2, and under the control of the control part 132, switches a connected state and a disconnected state between the DC bus 1B1 and the DC bus 1B2. Specifically, when the electric power of the storage battery 124 is discharged, the contactor 123 is controlled to make the DC bus 1B1 and the DC bus 1B2 the connected state, and thereby the storage battery 124 is connected to the inverter 122 and the power-receiving circuit 126. In contrast, when the storage battery 124 is charged, the contactor 123 is controlled to make the DC bus 1B1 and the DC bus 1B2 the disconnected state, and thereby the storage battery 124 is disconnected from the inverter 122 and the power-receiving circuit 126, and the motor 121 is electrically disconnected from the storage battery 124.

The storage battery 124 is a rechargeable battery (a secondary battery such as a lithium-ion battery or a nickel-hydrogen battery) which is mounted on the electric vehicle 12, and supplies electric power used to drive the motor 121.

The power-receiving coil 125 is provided in the bottom of the electric vehicle 12, and is a coil used to wirelessly receive electric power (AC power) supplied from the power-transmitting coil 114 provided in the wireless power transmission device 11. The power-receiving coil 125 approaches the power-transmitting coil 114 of the wireless power transmission device 11, and thereby the above-described electromagnetic coupling circuit is formed. That is, the power-receiving coil 125 is configured to be capable of performing wireless transmission of electric power between the power-receiving coil 125 and the power-transmitting coil 114 at the outside of the vehicle.

The power-receiving circuit 126 receives electric power (AC power) wirelessly supplied through the electromagnetic coupling circuit which is formed of the power-transmitting coil 114 of the wireless power transmission device 11 and the power-receiving coil 125, and converts the received electric power into DC power and supplies the DC power to the DC bus 1B2. The charging device 127 is a device which charges the storage battery 124 using the electric power (DC power) supplied from the power-receiving circuit 126 through the DC bus 1B2.

In addition, the details of configurations and operations of the power-supplying circuit 113, the power-transmitting coil 114, the power-receiving coil 125, and the power-receiving circuit 126 are disclosed in, for example, Japanese Unexamined Patent Application, First Publication No. 2009-225551 ("POWER TRANSMISSION SYSTEM") or Japanese Unexamined Patent Application, First Publication No. 2008-236916 ("WIRELESS POWER TRANSMISSION DEVICE").

Figure 2:
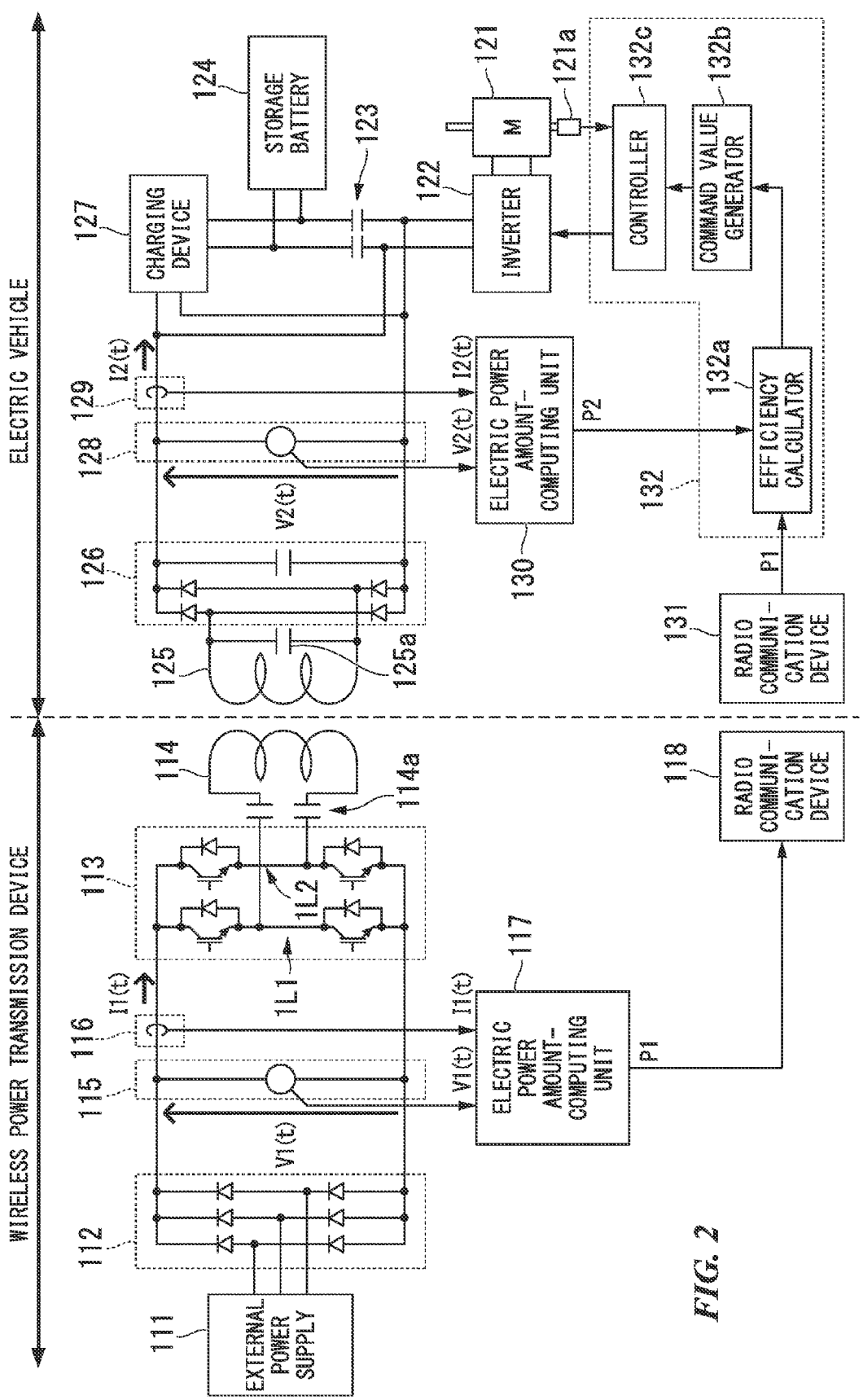
FIG. 2 is a diagram showing in detail electrical configurations of the vehicle and the wireless power transmission device according to the first embodiment of the present invention.

FIG. 2 is a diagram showing in detail electrical configurations of the vehicle and the wireless power transmission device according to the first embodiment of the present invention. Moreover, in FIG. 2, the same components as the components shown in FIG. 1 are represented by the same reference signs. As shown in FIG. 2, the rectifier circuit 112 of the wireless power transmission device 11 is configured as a three-phase full-wave rectifier circuit (bridge rectifier circuit). In addition, the power-supplying circuit 113 of the wireless power transmission device 11 is configured as a circuit in which switching legs 1L1, 1L2 (each circuit composed of series-connected two transistors and a diode which is connected to each of the two transistors in parallel) are connected in parallel.

In addition, two capacitors 114a are provided between the power-supplying circuit 113 and the power-transmitting coil 114. The capacitors 114a together with the power-transmitting coil 114 form a series resonant circuit. One end of the power-transmitting coil 114 is connected to the switching leg 1L1 of the power-supplying circuit 113 through one capacitor 114a, and the other end of the power-transmitting coil 114 is connected to the switching leg 1L2 of the power-supplying circuit 113 through the other capacitor 114a.

The wireless power transmission device 11 includes a voltage measurement unit 115, a current measurement unit 116, an electric power amount-computing unit 117 (first power supply value-computing part) and a radio communication device 118 (first device output part) in addition to the above-described components from the external power supply 111 to the power-transmitting coil 114. The voltage measurement unit 115 and the current measurement unit 116 are provided between the rectifier circuit 112 and the power-supplying circuit 113, and measure an input voltage V1 (t) and an input current I1 (t) of the power-supplying circuit 113, respectively.

The electric power amount-computing unit 117 determines an electric power amount P1 (a first power supply value) of electric power supplied to the power-supplying circuit 113, using the input voltage V1 (t) measured by the voltage measurement unit 115 and the input current I1 (t) measured by the current measurement unit 116. Specifically, the electric power amount P1 is calculated by multiplying V1 (t) and I1 (t) together. In addition, if a loss of the power-supplying circuit 113 and the power-transmitting coil 114 is zero, the electric power amount P1 of electric power supplied to the power-supplying circuit 113 becomes equal to the amount of electric power (a power supply amount) supplied from the power-transmitting coil 114. The electric power amount P1 indicates the amount of electric power which the power-transmitting coil 114 supplies to the power-receiving coil 125.

The radio communication device 118 is capable of wirelessly communicating various pieces of information with a radio communication device 131 provided in the electric vehicle 12, and sends, for example, the information indicating the electric power amount P1 determined by the electric power amount-computing unit 117 to the radio communication device 131. In addition, the radio communication device 118 can communicate with the radio communication device 131 when the radio communication device 131 of the electric vehicle 12 is positioned in an area around the installation position of the radio communication device 118 in which the radius from the installation position is several meters.

In addition, as shown in FIG. 2, the power-receiving circuit 126 of the electric vehicle 12 is configured using a bridge rectifier circuit composed of four diodes and using a capacitor connected to the output terminals of the bridge rectifier circuit in parallel. Moreover, a capacitor 125a is connected between the power-receiving coil 125 and the power-receiving circuit 126 in parallel, and a rotation angle detector 121a such as a resolver or an encoder which detects a rotation angle of the motor 121 is attached to the motor 121.

The electric vehicle 12 includes a voltage measurement unit 128, a current measurement unit 129, an electric power amount-computing unit 130 (first received power value-computing part), the radio communication device 131 (first vehicle input part) and the control part 132 in addition to the above-described components from the motor 121 to the charging device 127. The voltage measurement unit 128 and the current measurement unit 129 are provided between the power-receiving circuit 126 and the charging device 127 (at the DC bus 1B2 shown in FIG. 1), and measure an output voltage V2 (t) and an output current I2 (t) of the power-receiving circuit 126, respectively.

The electric power amount-computing unit 130 determines an electric power amount P2 (a first received power value) of electric power received by the power-receiving circuit 126, using the output voltage V2 (t) measured by the voltage measurement unit 128 and the output current I2 (t) measured by the current measurement unit 129. Specifically, the electric power amount P2 is calculated by multiplying V2 (t) and I2 (t) together. In addition, if a loss of the power-receiving coil 125 and the power-receiving circuit 126 is zero, the electric power amount P2 of electric power received by the power-receiving circuit 126 becomes equal to the amount of electric power (a received power amount) received by the power-receiving coil 125. The electric power amount P2 indicates the amount of electric power which the power-receiving coil 125 has received from the power-transmitting coil 114.

The radio communication device 131 is capable of wirelessly communicating various pieces of information with the radio communication device 118 provided in the wireless power transmission device 11, and receives, for example, the information indicating the electric power amount P1 to be sent from the radio communication device 118. In addition, the radio communication device 131 can communicate with the radio communication device 118 when the radio communication device 118 of the wireless power transmission device 11 is positioned in an area around the radio communication device 131 in which the radius from the radio communication device 131 is several meters.

The control part 132 controls each block shown in FIGS. 1 and 2, and thereby controls operation of the electric vehicle 12. For example, the control part 132 controls the inverter 122 which drives the motor 121 while always monitoring detection results of the rotation angle detector 121a attached to the motor 121, and thereby controls traveling of the electric vehicle 12. In addition, when charging the storage battery 124, the control part 132 slowly moves (travels) the electric vehicle 12 which has stopped at the installation position of the wireless power transmission device 11 or at the vicinity thereof, while referring to power transmission efficiency $\epsilon$ from the wireless power transmission device 11 to the electric vehicle 12, and adjusts the stop position of the electric vehicle 12.

The control part 132 includes an efficiency calculator 132a (first efficiency calculation part), a command value generator 132b (command generation part) and a controller 132c (control part) in order to adjust the stop position when the storage battery 124 is charged.

The efficiency calculator 132a calculates the power transmission efficiency from the wireless power transmission device 11 to the electric vehicle 12 based on the information indicating the electric power amount P2 determined by the electric power amount-computing unit 130 and on the information indicating the electric power amount P1 received by the radio communication device 131. Specifically, the power transmission efficiency $\epsilon$ is calculated by dividing the electric power amount P2 by the electric power amount P1.

The command value generator 132b generates a rotation angle command value for the motor 121 based on the power transmission efficiency $\epsilon$ calculated by the efficiency calculator 132a. The controller 132c outputs a torque command value to the inverter 122 while monitoring detection results of the rotation angle detector 121a, based on the rotation angle command value generated by the command value generator 132b.

The command value generator 132b is configured to generate a command (a rotation angle command value) to move the electric vehicle 12 in an appropriate direction, based on the power transmission efficiency $\epsilon$ which the efficiency calculator 132a has calculated using the electric power amount P1 and the electric power amount P2. In other words, the command value generator 132b generates a command to move the electric vehicle 12, using the electric power amount P1 and the electric power amount P2. In addition, the command value generator 132b is configured to output the generated command to the controller 132c, and the controller 132c is configured to be capable of controlling the motor 121 based on the command (the rotation angle command value) generated by the command value generator 132b.

The motor 121 rotates a tire whose radius is known, through a speed reducer (not shown) whose speed reduction ratio is known, and thus the relationship between the rotation angle of the motor 121 and the amount of movement of the electric vehicle 12 is fixed.

Specifically, if the radius of the tire is represented by r and the speed reduction ratio of the speed reducer is represented by n, the electric vehicle 12 moves a distance (2πr/n) when the motor makes one rotation. Therefore, by controlling the rotation angle of the motor 121, the amount of movement of the electric vehicle 12 can be controlled.

Figure 3:
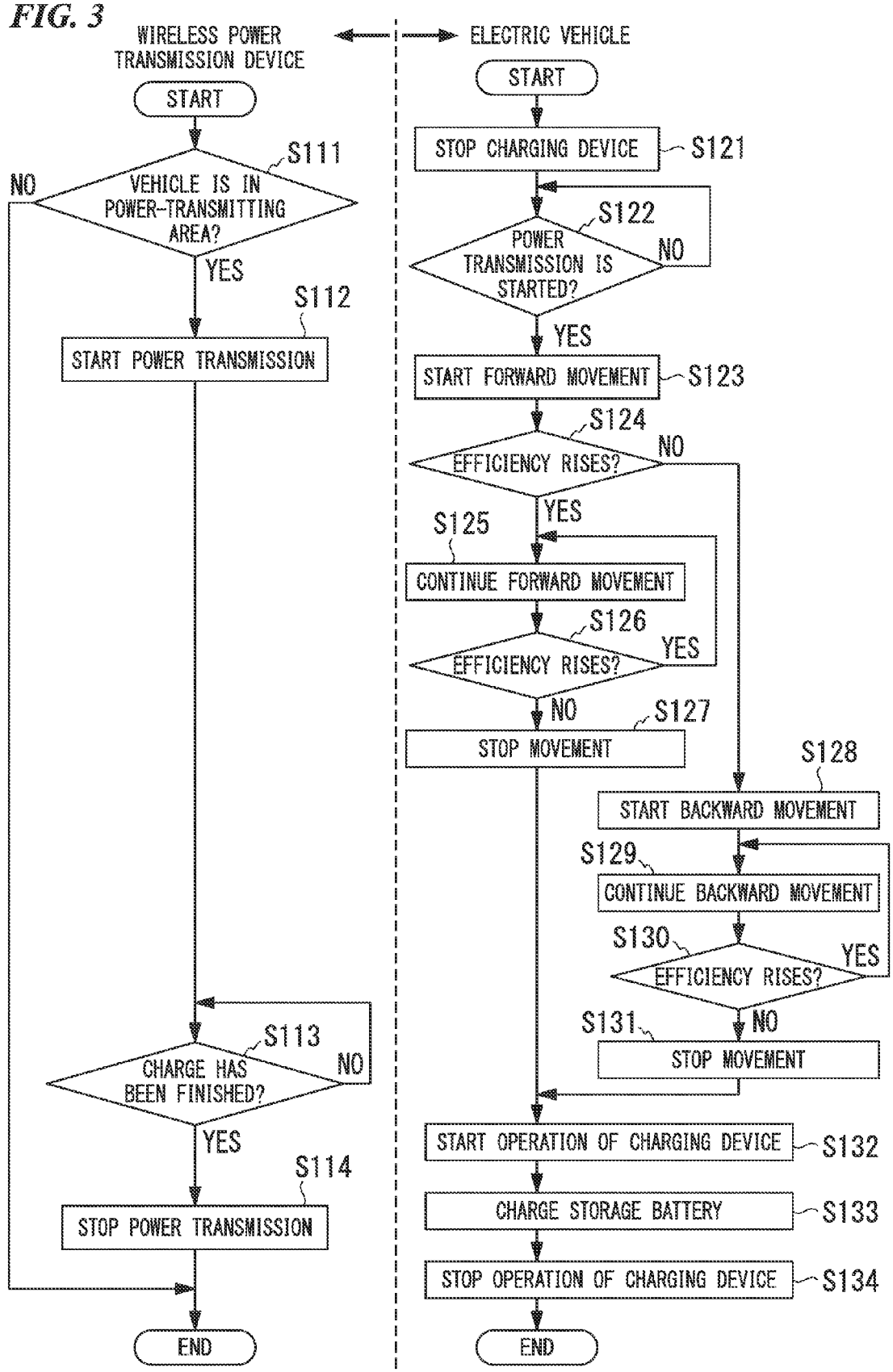
FIG. 3 is a flow diagram showing operations of the vehicle and the wireless power transmission device according to the first embodiment of the present invention.

Next, operations of the wireless power transmission device 11 and the electric vehicle 12 having the above-described configurations are described. FIG. 3 is a flow diagram showing operations of the vehicle and the wireless power transmission device according to the first embodiment of the present invention. In addition, hereinafter, operations in which the storage battery 124 mounted on the electric vehicle 12 is charged using electric power supplied from the wireless power transmission device 11 are mainly described.

First, a user drives the electric vehicle 12, and moves and stops the electric vehicle 12 at the installation position of the wireless power transmission device 11 or at the vicinity thereof. At this time, the wireless power transmission device 11 determines whether a vehicle (the electric vehicle 12) is positioned in a power-transmitting area (step S111). For example, based on whether the radio communication device 118 of the wireless power transmission device 11 can wirelessly communicate with the radio communication device 131 of the electric vehicle 12, it is determined whether the electric vehicle 12 is in the power-transmitting area.

When it is determined that the electric vehicle 12 is not positioned in the power-transmitting area (when the determination result of step S111 is "NO"), the process of the wireless power transmission device 11 shown in FIG. 3 is finished. On the other hand, when it is determined that the electric vehicle 12 is positioned in the power-transmitting area (when the determination result of step S111 is "YES"), the wireless power transmission device 11 operates the power-supplying circuit 113 and starts transmission of electric power (step S112). In addition, when the electric vehicle 12 is positioned in the power-transmitting area, an electromagnetic coupling circuit is formed of the power-transmitting coil 114 of the wireless power transmission device 11 and the power-receiving coil 125 of the electric vehicle 12.

When the user gives charging instructions to the electric vehicle 12 after the user moves and stops the electric vehicle 12 at the installation position of the wireless power transmission device 11 or at the vicinity thereof, at first, the control part 132 controls the contactor 123, thereby making the DC bus 1B1 and the DC bus 1B2 the disconnected state. In addition, the control part 132 controls the power-receiving circuit 126, thereby starting the operation thereof, and controls the charging device 127, thereby stopping the operation thereof (step S121).

Next, the control part determines whether the electric power transmission from the wireless power transmission device 11 is started (step S122). For example, it is determined whether a signal indicating the start of the electric power transmission has been sent from the radio communication device 118 of the wireless power transmission device 11.

When determining that the electric power transmission is not started (when the determination result of step S122 is "NO"), the control part 132 repeats the above determination. In contrast, when determining that the electric power transmission is started (when the determination result of step S122 is "YES"), the control part 132 controls the inverter 122, thereby starting forward movement of the electric vehicle 12 (step S123). At this time, the electric power transmitted from the wireless power transmission device 11 is used as electric power to drive the motor 121.

When starting forward movement of the electric vehicle 12, the control part 132 (the command value generator 132b) determines whether the power transmission efficiency ϵ calculated by the efficiency calculator 132a rises due to the forward movement of the electric vehicle 12 (step S124). When determining that the power transmission efficiency ϵ rose (when the determination result of step S124 is "YES"), the control part 132 controls the inverter 122, thereby continuing low-speed forward movement of the electric vehicle 12 (step S125). Subsequently, the control part 132 determines again whether the power transmission efficiency ϵ calculated by the efficiency calculator 132a rose due to the forward movement of the electric vehicle 12 (step S126).

When determining that the power transmission efficiency ϵ rose (when the determination result of step S126 is "YES"), the control part 132 controls the inverter 122, thereby continuing low-speed forward movement of the electric vehicle 12 (step S125). In contrast, when determining that the power transmission efficiency ϵ does not rise (when the determination result of step S126 is "NO"), the control part 132 controls the inverter 122, thereby stopping the electric vehicle 12 (step S127). At the time of this stop, the relative position of the power-receiving coil 125 with respect to the power-transmitting coil 114 is adjusted to the suitable position for the wireless transmission of electric power.

On the other hand, immediately after starting forward movement of the electric vehicle 12, when determining that the power transmission efficiency ϵ calculated by the efficiency calculator 132a does not rise even if the electric vehicle 12 moves forward (when the determination result of step S124 is "NO"), the control part 132 (the command value generator 132b) controls the inverter 122, thereby starting backward movement of the electric vehicle 12 (step S128). Subsequently, the control part 132 continues low-speed backward movement of the electric vehicle 12 (step S129), and determines whether the power transmission efficiency calculated by the efficiency calculator 132a rose due to the backward movement (step S130).

When determining that the power transmission efficiency ϵ rose (when the determination result of step S130 is "YES"), the control part 132 controls the inverter 122, thereby continuing low-speed backward movement of the electric vehicle 12 (step S129). In contrast, when determining that the power transmission efficiency ϵ does not rise (when the determination result of step S130 is "NO"), the control part 132 controls the inverter 122, thereby stopping the electric vehicle 12 (step S131). At the time of this stop, the relative position of the power-receiving coil 125 with respect to the power-transmitting coil 114 is adjusted to the suitable position for the wireless transmission of electric power.

When stopping the electric vehicle 12 through processing of step S127 or step S131, the control part 132 controls the charging device 127, thereby starting operation thereof, and controls the inverter 122, thereby stopping operation thereof (step S132). In this way, the storage battery 124 is charged (step S133). Specifically, the AC power from the wireless power transmission device 11 is wirelessly transmitted to the electric vehicle 12 through the electromagnetic coupling circuit formed of the power-transmitting coil 114 and of the power-receiving coil 125, and is received by the power-receiving circuit 126. The AC power received by the power-receiving circuit 126 is converted into DC power, and the DC power after the conversion is supplied to the charging device 127. Subsequently, the charge of the storage battery 124 using the direct current is performed by the charging device 127. When the storage battery 124 becomes the fully charged state through the charge by the charging device 127, the control part 132 stops the charging device 127 and stops the charge of the storage battery 124 (step S134).

After starting the transmission of electric power at step S112, the wireless power transmission device 11 determines whether the charge of the storage battery 124 mounted on the electric vehicle 12 is finished (step S113). For example, it is determined whether a signal indicating the charge completion of the storage battery 124 has been sent from the radio communication device 131 of the electric vehicle 12. When determining that the charge is not finished (when the determination result of step S113 is "NO"), the wireless power transmission device 11 repeats the above determination. In contrast, when determining that the charge is finished (when the determination result of step S113 is "YES"), the wireless power transmission device 11 stops the power-supplying circuit 113, thereby stopping the electric power transmission (step S114).

As described above, in this embodiment, the power transmission efficiency ϵ from the wireless power transmission device 11 to the electric vehicle 12 is determined, and the electric vehicle 12 is moved backward and forward while the power transmission efficiency ϵ is referred to, whereby the position between the power-transmitting coil 114 of the wireless power transmission device 11 and the power-receiving coil 125 of the electric vehicle 12 is adjusted. Therefore, the position can be precisely adjusted even if electric vehicles 12 have various sizes and various attachment positions of the power-receiving coil 125, and thus electric power can be efficiently transmitted. In addition, a mechanism or the like which individually moves the power-transmitting coil 114 and the power-receiving coil 125 is unnecessary, and thus the increase in size or in cost is not caused.

Moreover, in this embodiment, the power transmission efficiency ϵ from the wireless power transmission device 11 to the electric vehicle 12 is determined based on the electric power amount P1 of electric power supplied to the power-supplying circuit 113 of the wireless power transmission device 11 and on the electric power amount P2 of electric power received by the power-receiving circuit 126 of the electric vehicle 12. The power transmission efficiency ϵ is not only the power transmission efficiency between the power-transmitting coil 114 and the power-receiving coil 125, but is the power transmission efficiency in a state including the power-supplying circuit 113 and the power-receiving circuit 126, and is approximately the same as the actual power transmission efficiency. Therefore, the position between the power-transmitting coil 114 of the wireless power transmission device 11 and the power-receiving coil 125 of the electric vehicle 12 can be adjusted to a more appropriate position so that the actual power transmission efficiency is maximized.

Furthermore, in this embodiment, when the positioning between the power-transmitting coil 114 of the wireless power transmission device 11 and the power-receiving coil 125 of the electric vehicle 12 is performed by moving the electric vehicle 12 backward and forward, the electric power transmitted from the wireless power transmission device 11 is used as electric power to drive the motor 121. Therefore, even if the residual charge level of the storage battery 124 is zero, the above positioning can be performed.

Hereinbefore, the vehicle and the wireless power transmission device according to the first embodiment of the present invention were described, but the present invention is not limited to the above-described embodiment, and modifications can be freely adopted within the scope of the present invention.

For example, in the above-described embodiment, the positioning is performed by moving the electric vehicle 12 backward and forward while the power transmission efficiency ϵ from the wireless power transmission device 11 to the electric vehicle 12 is referred to. However, the positioning may be performed by moving the electric vehicle 12 backward and forward while the electric power amount P2 (electric power received by the power-receiving circuit 126) determined by the electric power amount-computing unit 130 is referred to instead of the power transmission efficiency ϵ. That is, the command value generator 132b may be configured to generate a rotation angle command value as a command to move the electric vehicle 12, using the electric power amount P2 determined by the electric power amount-computing unit 130, and to output the rotation angle command value to the controller 132c.

The wireless power transmission device 11 and the power-transmitting coil 114 may not be installed so as to be strictly flush with the ground. For example, they may be buried in the ground so that the efficiency of wireless power transmission is not remarkably decreased, and may be installed to be lower than the ground. In addition, they may be projected so that the traveling of the electric vehicle 12 is not remarkably disturbed, and may be installed to be higher than the ground.

In addition, in the above-described embodiment, a case where the positioning is performed by moving the electric vehicle 12 backward and forward was described as an example. However, if a vehicle can linearly move rightward and leftward, the positioning can be performed by moving the vehicle rightward and leftward. Moreover, in general, a vehicle can move only backward and forward if a steering is not operated, and cannot linearly move rightward and leftward. Accordingly, it is desirable to use a power-transmitting coil which does not cause an excessive drop of the transmission efficiency even if a position shift in the right-and-left direction occurs.

Figure 4:
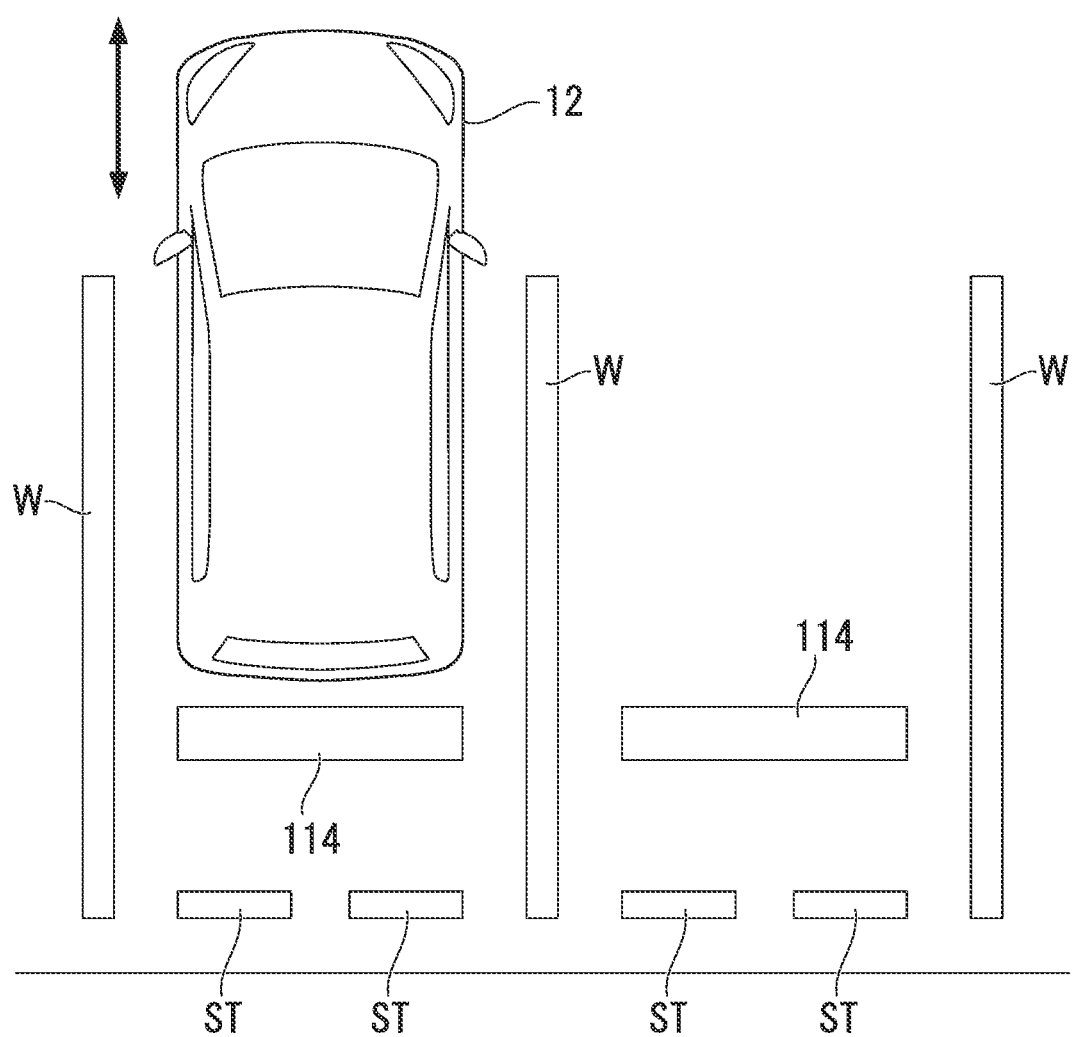
FIG. 4 is a schematic view showing an installation example of a power-transmitting coil used in the wireless power transmission device according to the first embodiment of the present invention.

FIG. 4 is a view showing an installation example of a power-transmitting coil preferably used in a wireless power transmission device according to the first embodiment of the present invention. As shown in FIG. 4, a power-transmitting coil 114 of a wireless power transmission device 11 is a coil having a rectangular shape in the plan view thereof. For example, in a parking area W, the coil is installed between compartment lines W so that the longitudinal direction of the coil is perpendicular to the compartment line W and so that the coil is separated from a stopper ST by about 1 meter. The power-transmitting area of the power-transmitting coil 114 installed in this way is long in a direction perpendicular to the compartment line W, and thus, even if some position shifts in the right-and-left direction of the electric vehicle 12 between the compartment lines W occur, an excessive drop of the transmission efficiency can be prevented.

In addition, in the above-described embodiment, during the positioning, the electric vehicle 12 is continuously moved forward or backward. However, not continuous movement, but intermittent movement of a minute distance may be performed. While the electric vehicle 12 performs movement of a minute distance, the received electric power is used as electric power to drive the motor 121, and therefore, an output current I2 (t) flows and the power transmission efficiency ϵ can be determined. However, since the output current I2 (t) does not flow during stop, the power transmission efficiency cannot be determined.

Accordingly, when the intermittent movement by the minute distance is performed, operations are repeated in which the movement of the minute distance is performed by stopping the charging device 127 and by driving the motor 121, and the storage battery 124 is charged by operating the charging device 127 after the stop. In this way, the received electric power is used to charge the storage battery 124 during the stop, and thus the power transmission efficiency $\epsilon$ can be determined even during the stop. In addition, the power transmission efficiency $\epsilon$ after performing one movement of the intermittent movement is compared with the power transmission efficiency $\epsilon$ before performing the intermittent movement, and thereby it is determined whether the power transmission efficiency $\epsilon$ rises or drops.

In addition, in the above-described embodiment, at step S111 in FIG. 3, it is determined whether the electric vehicle 12 is positioned in the power-transmitting area, based on whether the radio communication device 118 of the wireless power transmission device 11 can wirelessly communicate with the radio communication device 131 of the electric vehicle 12. However, it may be determined whether the electric vehicle 12 is positioned in the power-transmitting area, based on the position of the electric vehicle 12 obtained by GPS (Global Positioning System) or the like.

In addition, when the wireless power transmission device 11 is installed in a place where the movement of the electric vehicle 12 is limited to one-way (for example, a place where the movement is limited only to forward movement), it is only necessary to stop the electric vehicle 12 immediately after the electric vehicle 12 entered the power-transmitting area. That is, it is only necessary to stop the electric vehicle 12 so that the power-receiving coil 125 is disposed near the periphery of the power-transmitting area.

In this way, if the electric vehicle 12 is moved forward, the power transmission efficiency $\epsilon$ rises and the determination result of step S124 in FIG. 3 always becomes "YES", and thus it is possible to prevent the backward movement of the electric vehicle 12.

In addition, when the power transmission efficiency $\epsilon$ remarkably decreases during the positioning, it is desirable that the control part 132 of the electric vehicle 12 perform the control to stop the electric vehicle 12, and stop the transmission of electric power by notifying the wireless power transmission device 11 through the radio communication device 131 that the power transmission efficiency $\epsilon$ remarkably decreases. In this way, it is possible to prevent unexpected trouble which occurs during the positioning.

In addition, in the above-described embodiment, a case where an object to be supplied with electric power is an electric vehicle with a storage battery mounted thereon was described as an example. However, the present invention can be applied to a plug-in hybrid vehicle or to a transportation vehicle. Furthermore, the present invention can be applied to an unmanned vehicle.

Second Embodiment

Figure 5:
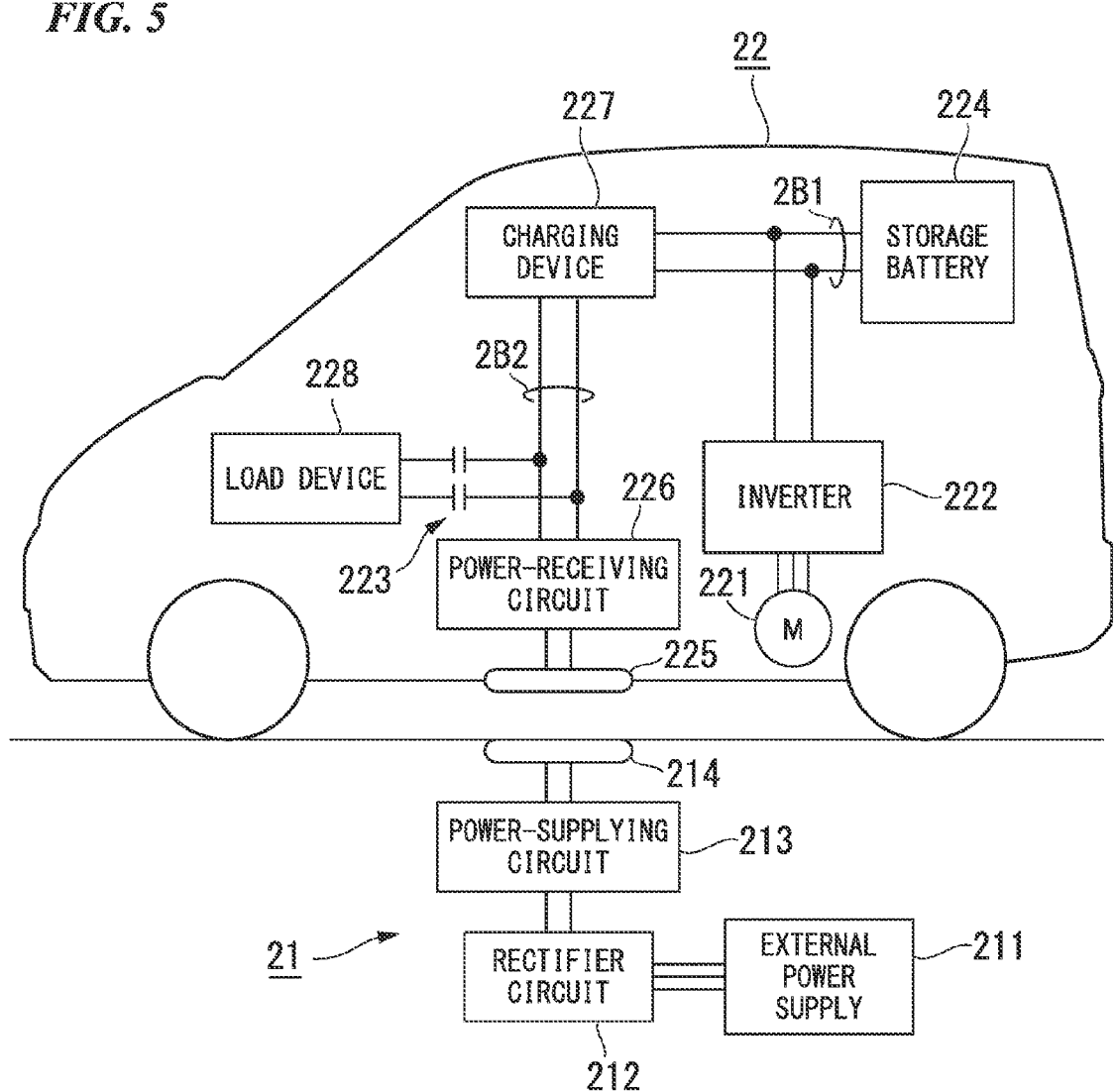
FIG. 5 is a block diagram showing main configurations of a vehicle and a wireless power transmission device according to a second embodiment of the present invention.

Next, a vehicle and a wireless power transmission device according to a second embodiment of the present invention are described in detail with reference to the drawings. FIG. 5 is a block diagram showing main configurations of the vehicle and the wireless power transmission device according to the second embodiment of the present invention.

As shown in FIG. 5, a wireless power transmission device 21 of this embodiment is installed in the ground. When an electric vehicle 22 as a vehicle traveling on the ground stops in a predetermined positional relationship (positional relationship in which an electromagnetic coupling circuit described below is formed), the wireless power transmission device 21 can wirelessly transmit electric power (electric power to charge a storage battery 224) to the electric vehicle 22. The wireless power transmission device 21 includes an external power supply 211, a rectifier circuit 212, a power-supplying circuit 213, a power-transmitting coil 214 (primary coil), and the like.

The external power supply 211 is a power supply which supplies electric power required to generate electric power to be transmitted to the electric vehicle 22, and is a power supply which supplies, for example, three-phase AC power whose voltage is 200 V. In addition, the external power supply 211 is not limited to a three-phase AC power supply, and may be a power supply which supplies single-phase AC power such as a commercial AC power supply. The rectifier circuit 212 is a circuit which rectifies and converts AC power supplied from the external power supply 211, into DC power.

A DC power supply such as a fuel battery or a solar battery can be used for the external power supply 211. In this case, the rectifier circuit 212 can be omitted.

The power-supplying circuit 213 wirelessly supplies electric power to the electric vehicle 22 through an electromagnetic coupling circuit which is formed of the power-transmitting coil 214 and a power-receiving coil 225 provided in the electric vehicle 22, wherein the electric power is supplied from the rectifier circuit 212. Specifically, the power-supplying circuit 213 performs the wireless power supplying to the electric vehicle 22 by converting DC power from the rectifier circuit 212 into AC power and by supplying the AC power to the power-transmitting coil 214.

The power-transmitting coil 214 is installed in the ground and is a coil used to wirelessly supply AC power to the electric vehicle 22, wherein the AC power is supplied from the power-supplying circuit 213. The power-transmitting coil 214 and the power-receiving coil 225 provided in the electric vehicle 22 are disposed in adjacent positions to each other, and thereby the above-described electromagnetic coupling circuit is formed. The electromagnetic coupling circuit means a circuit in which the power-transmitting coil 214 and the power-receiving coil 225 are electromagnetically coupled together and the wireless power supplying from the power-transmitting coil 214 to the power-receiving coil 225 is performed. The electromagnetic coupling circuit may be either circuit, i.e., a circuit to supply electric power using "electromagnetic induction method" and a circuit to supply electric power using "electromagnetic field resonance method".

As shown in FIG. 5, the electric vehicle 22 as a vehicle includes a motor 221, an inverter 222, a contactor 223, the storage battery 224, the power-receiving coil 225 (secondary coil), a power-receiving circuit 226, a charging device 227, a load device 228 (first load device) and the like. In addition, the electric vehicle 22 has functions to automatically adjust the position of the power-receiving coil 225 with respect to the power-transmitting coil 214 of the wireless power transmission device 21. The inverter 222, the storage battery 224 and the charging device 227 among the above components are connected to a DC bus 2B1, and the contactor 223, the power-receiving circuit 226 and the charging device 227 are connected to a DC bus 2B2. Moreover, the contactor 223 and the charging device 227 compose a power-supplying destination-setting device according to this embodiment.

As a motive power source which produces motive power to move the electric vehicle 22, the motor 221 is mounted on the electric vehicle 22 and produces motive power depending on the drive of the inverter 222. For the motor 221, it is possible to use a motor such as a permanent magnet synchronous motor or an induction motor. The inverter 222 drives the motor 221 using electric power supplied from the storage battery 224, under the control of a control part 233 (omitted in FIG. 5, refer to FIG. 6).

The contactor 223 is provided between the load device 228 and the DC bus 2B2, that is, between the power-receiving circuit 226 and the load device 228, and under the control of the control part 233, switches a connected state and a disconnected state between the power-receiving circuit 226 and the load device 228. Specifically, the contactor 223 becomes a closed state in order to connect the power-receiving circuit 226 and the load device 228 to each other during positioning of the power-receiving coil 225 with respect to the power-transmitting coil 214, and becomes an opened state in order to disconnect the power-receiving circuit 226 and the load device 228 from each other after the positioning is finished.

The storage battery 224 is a rechargeable battery (a secondary battery such as a lithium-ion battery or a nickel-hydrogen battery) which is mounted on the electric vehicle 22, and supplies electric power used to drive the motor 221.

The power-receiving coil 225 is provided in the bottom of the electric vehicle 22, and is a coil used to wirelessly receive electric power (AC power) supplied from the power-transmitting coil 214 provided in the wireless power transmission device 21. The power-receiving coil 225 approaches the power-transmitting coil 214 of the wireless power transmission device 21, and thereby the above-described electromagnetic coupling circuit is formed. That is, the power-receiving coil 225 is configured to be capable of performing wireless transmission of electric power between the power-receiving coil 225 and the power-transmitting coil 214 at the outside of the vehicle.

The power-receiving circuit 226 receives electric power (AC power) wirelessly supplied through the electromagnetic coupling circuit which is formed of the power-transmitting coil 214 of the wireless power transmission device 21 and the power-receiving coil 225, and converts the received electric power into DC power and supplies the DC power to the DC bus 2B2. The charging device 227 is a device which charges the storage battery 224 using the electric power (DC power) supplied from the power-receiving circuit 226 through the DC bus 2B2. The load device 228 is connected to the DC bus 2B2 through the contactor 223. The load device 228 described above is, for example, a resistor having a predetermined resistance value, and consumes DC power supplied from the power-receiving circuit 226 when the load device 228 is in the connected state to the power-receiving circuit 226 through the contactor 223.

In addition, the details of configurations and operations of the power-supplying circuit 213, the power-transmitting coil 214, the power-receiving coil 225, and the power-receiving circuit 226 are disclosed in, for example, Japanese Unexamined Patent Application, First Publication No. 2009-225551 ("POWER TRANSMISSION SYSTEM") or Japanese Unexamined Patent Application, First Publication No. 2008-236916 ("WIRELESS POWER TRANSMISSION DEVICE").

Figure 6:
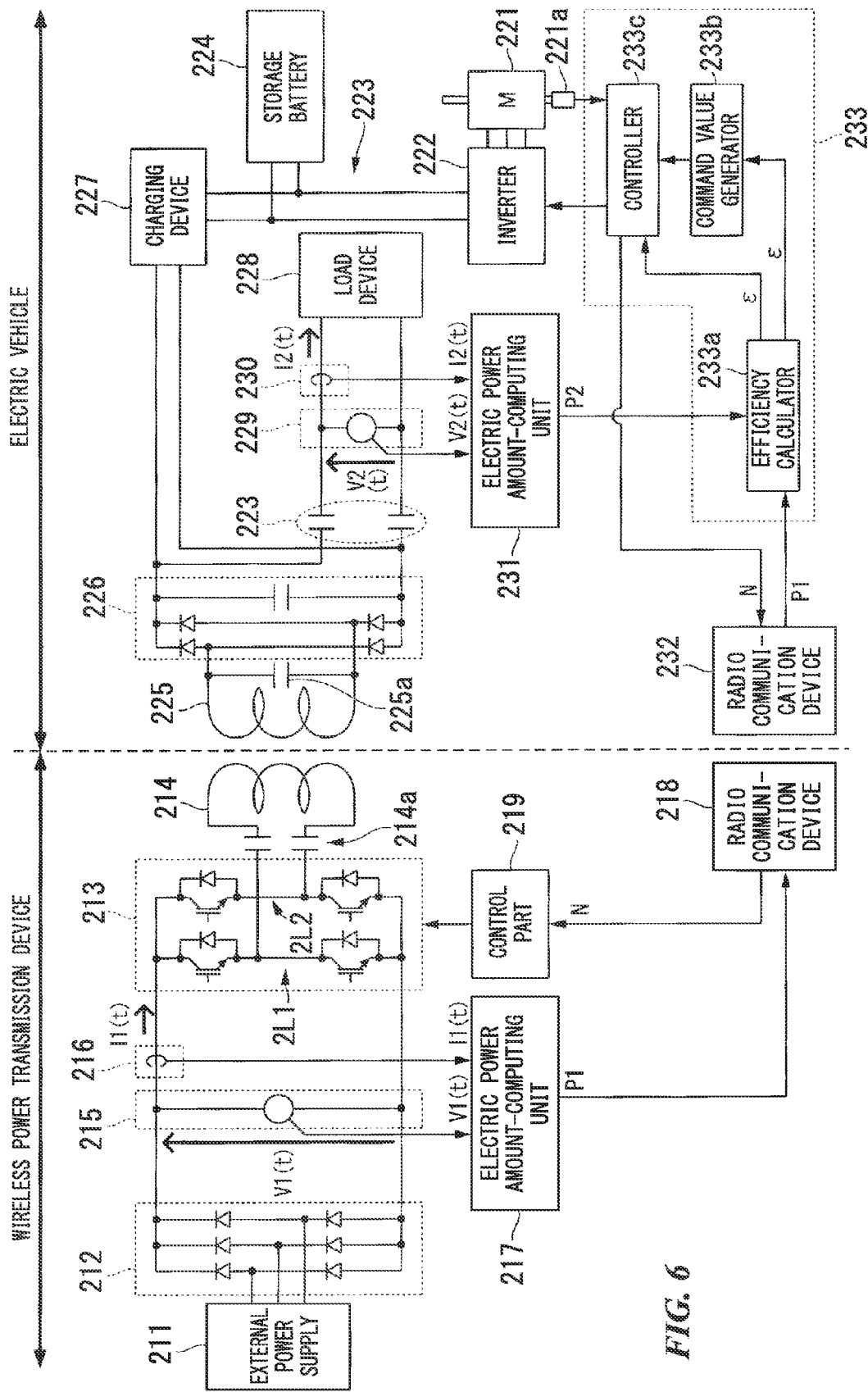
FIG. 6 is a diagram showing in detail electrical configurations of the vehicle and the wireless power transmission device according to the second embodiment of the present invention.

FIG. 6 is a diagram showing in detail electrical configurations of the vehicle and the wireless power transmission device according to the second embodiment of the present invention. Moreover, in FIG. 6, the same components as the components shown in FIG. 5 are represented by the same reference signs. As shown in FIG. 6, the rectifier circuit 212 of the wireless power transmission device 21 is configured as a three-phase full-wave rectifier circuit (bridge rectifier circuit). In addition, the power-supplying circuit 213 of the wireless power transmission device 21 is configured as a circuit (inverter) in which switching legs 2L1, 2L2 (each circuit composed of series-connected two transistors and a diode which is connected to each of the two transistors in parallel) are connected in parallel. Moreover, for the transistor, an IGBT (Insulated Gate Bipolar Transistor), a Power MOSFET (Metal-Oxide-Semiconductor Field-Effect Transistor) or the like can be used.

In addition, two capacitors 214a are provided between the power-supplying circuit 213 and the power-transmitting coil 214. The capacitors 214a together with the power-transmitting coil 214 form a series resonant circuit. One end of the power-transmitting coil 214 is connected to the switching leg 2L1 of the power-supplying circuit 213 through one capacitor 214a, and the other end of the power-transmitting coil 214 is connected to the switching leg 2L2 of the power-supplying circuit 213 through the other capacitor 214a.

The wireless power transmission device 21 includes a voltage measurement unit 215, a current measurement unit 216, an electric power amount-computing unit 217 (first power supply value-computing part), a radio communication device 218 (first device input part, first device output part) and a control part 219 in addition to the above-described components from the external power supply 211 to the power-transmitting coil 214. The voltage measurement unit 215 and the current measurement unit 216 are provided between the rectifier circuit 212 and the power-supplying circuit 213, and measure an input voltage V1 (t) and an input current I1 (t) of the power-supplying circuit 213, respectively.

The electric power amount-computing unit 217 determines an electric power amount P1 (a first power supply value) of electric power supplied to the power-supplying circuit 213, using the input voltage V1 (t) measured by the voltage measurement unit 215 and using the input current I1 (t) measured by the current measurement unit 216. Specifically, the electric power amount P1 is calculated by multiplying V1 (t) and I1 (t) together. In addition, if a loss of the power-supplying circuit 213 and the power-transmitting coil 214 is zero, the electric power amount P1 of electric power supplied to the power-supplying circuit 213 becomes equal to the amount of electric power (a power supply amount) supplied from the power-transmitting coil 214. The electric power amount P1 indicates the amount of electric power which the power-transmitting coil 214 supplies to the power-receiving coil 225.

The radio communication device 218 is capable of wirelessly communicating various pieces of information with a radio communication device 232 provided in the electric vehicle 22. For example, the radio communication device 218 sends the information indicating the electric power amount P1 determined by the electric power amount-computing unit 217 to the radio communication device 232, and receives a positioning completion notification N (described below) which a controller 233c outputs. In addition, the radio communication device 218 can communicate with the radio communication device 232 when the radio communication device 232 of the electric vehicle 22 is positioned in an area around the installation position of the radio communication device 218 in which the radius from the installation position is several meters.

The control part 219 controls the power-supplying circuit 213 in accordance with communication between the radio communication devices 218 and 232. That is, the control part 219 switches the electric power which the power-supplying circuit 213 outputs to the power-transmitting coil 214, between small electric power and large electric power, based on a signal (the positioning completion notification N described below) which the radio communication device 218 receives from the radio communication device 232.

In addition, as shown in FIG. 6, the power-receiving circuit 226 of the electric vehicle 22 is configured using a bridge rectifier circuit composed of four diodes and using a capacitor connected to the output terminals of the bridge rectifier circuit in parallel. Moreover, a capacitor 225a is connected between the power-receiving coil 225 and the power-receiving circuit 226 in parallel, and a rotation angle detector 221a such as a resolver or an encoder which detects a rotation angle of the motor 221 is attached to the motor 221.

The electric vehicle 22 includes a voltage measurement unit 229, a current measurement unit 230, an electric power amount-computing unit 231 (first received power value-computing part), the radio communication device 232 (first vehicle input part, first vehicle output part) and the control part 233 in addition to the above-described components from the motor 221 to the load device 228. The voltage measurement unit 229 and the current measurement unit 230 are provided between the power-receiving circuit 226 and the load device 228, and measure an input voltage V2 (t) and an input current I2 (t) from the power-receiving circuit 226 to the load device 228, respectively.

The electric power amount-computing unit 231 determines an electric power amount P2 of electric power received by the power-receiving circuit 226, using the input voltage V2 (t) measured by the voltage measurement unit 229 and using the input current I2 (t) measured by the current measurement unit 230. That is, the electric power amount-computing unit 231 is configured to determine the electric power amount P2 (a first received power value) of electric power received by the power-receiving circuit 226 when a supply destination of the electric power received by the power-receiving coil 225 is set to the load device 228. Specifically, the electric power amount P2 is calculated by multiplying V2 (t) and I2 (t) together. In addition, if a loss of the power-receiving coil 225 and the power-receiving circuit 226 is zero, the electric power amount P2 of electric power received by the power-receiving circuit 226 becomes equal to the amount of electric power (a received power amount) received by the power-receiving coil 225. The electric power amount P2 indicates the amount of electric power which the power-receiving coil 225 has received from the power-transmitting coil 214.

The radio communication device 232 is capable of wirelessly communicating various pieces of information with the radio communication device 218 provided in the wireless power transmission device 21. For example, the radio communication device 232 receives the information indicating the electric power amount P1 sent from the radio communication device 218, and sends the positioning completion notification N (described below) which the controller 233c outputs. In addition, the radio communication device 232 can communicate with the radio communication device 218 when the radio communication device 218 of the wireless power transmission device 21 is positioned in an area around the radio communication device 232 in which the radius from the radio communication device 232 is several meters.

The control part 233 controls each block shown in FIGS. 5 and 6, and thereby controls operation of the electric vehicle 22. For example, the control part 233 controls the inverter 222 which drives the motor 221 while always monitoring detection results of the rotation angle detector 221a attached to the motor 221, and thereby controls traveling of the electric vehicle 22. In addition, when charging the storage battery 224, the control part 233 slowly moves (travels) the electric vehicle 22 which has stopped at the installation position of the wireless power transmission device 21 or at the vicinity thereof, while referring to power transmission efficiency $\epsilon$ from the wireless power transmission device 21 to the electric vehicle 22, and adjusts the stop position of the electric vehicle 22.

The control part 233 includes an efficiency calculator 233a (first efficiency calculation part), a command value generator 233b and a controller 233c (command generation part, control part) in order to adjust the stop position when the storage battery 224 is charged.

The efficiency calculator 233a calculates the power transmission efficiency $\epsilon$ from the wireless power transmission device 21 to the electric vehicle 22 based on the information indicating the electric power amount P2 determined by the electric power amount-computing unit 231 and on the information indicating the electric power amount P1 received by the radio communication device 232, during positioning between the power-transmitting coil 214 and the power-receiving coil 225. Specifically, the power transmission efficiency $\epsilon$ is calculated by dividing the electric power amount P2 by the electric power amount P1.

The command value generator 233b generates a rotation angle command value for the motor 221 based on the power transmission efficiency $\epsilon$ calculated by the efficiency calculator 233a. The controller 233c outputs a torque command value to the inverter 222 while monitoring detection results of the rotation angle detector 221a, based on the rotation angle command value generated by the command value generator 233b.

The controller 233c is configured to generate an internal command to move the electric vehicle 22 in an appropriate direction, based on the power transmission efficiency $\epsilon$ which the efficiency calculator 233a has calculated using the electric power amounts P1 and P2, and is configured to control the motor 221 through the inverter 222 based on the command. That is, the controller 233c has two functions as a command generation part and a control part according to the present invention. In addition, the command value generator 233b as the above-described command generation part generates a command to move the electric vehicle 22 using the electric power amounts P1 and P2. Moreover, similar to the first embodiment, the command value generator 233b may have the function as a command generation part according to the present invention.

In addition, when charging instructions are input from an operating device (not shown) based on the operation of a driver, the controller 233c controls the contactor 223, thereby making the power-receiving circuit 226 and the load device 228 the connected state. Furthermore, the controller 233c controls the contactor 223 at the timing the power transmission efficiency $\epsilon$ calculated by the efficiency calculator 233a changes into a fixed value or into decreasing from increasing, thereby making the power-receiving circuit 226 and the load device 228 the disconnected state, and outputs the positioning completion notification N to the radio communication device 232.

The motor 221 rotates a tire whose radius is known, through a speed reducer (not shown) whose speed reduction ratio is known, and thus the relationship between the rotation angle of the motor 221 and the amount of movement of the electric vehicle 22 is fixed.

Specifically, if the radius of the tire is represented by r and the speed reduction ratio of the speed reducer is represented by n, the electric vehicle 22 moves a distance ($2\pi r/n$) when the motor makes one rotation. Therefore, by controlling the rotation angle of the motor 221, the amount of movement of the electric vehicle 22 can be controlled.

Figure 7:
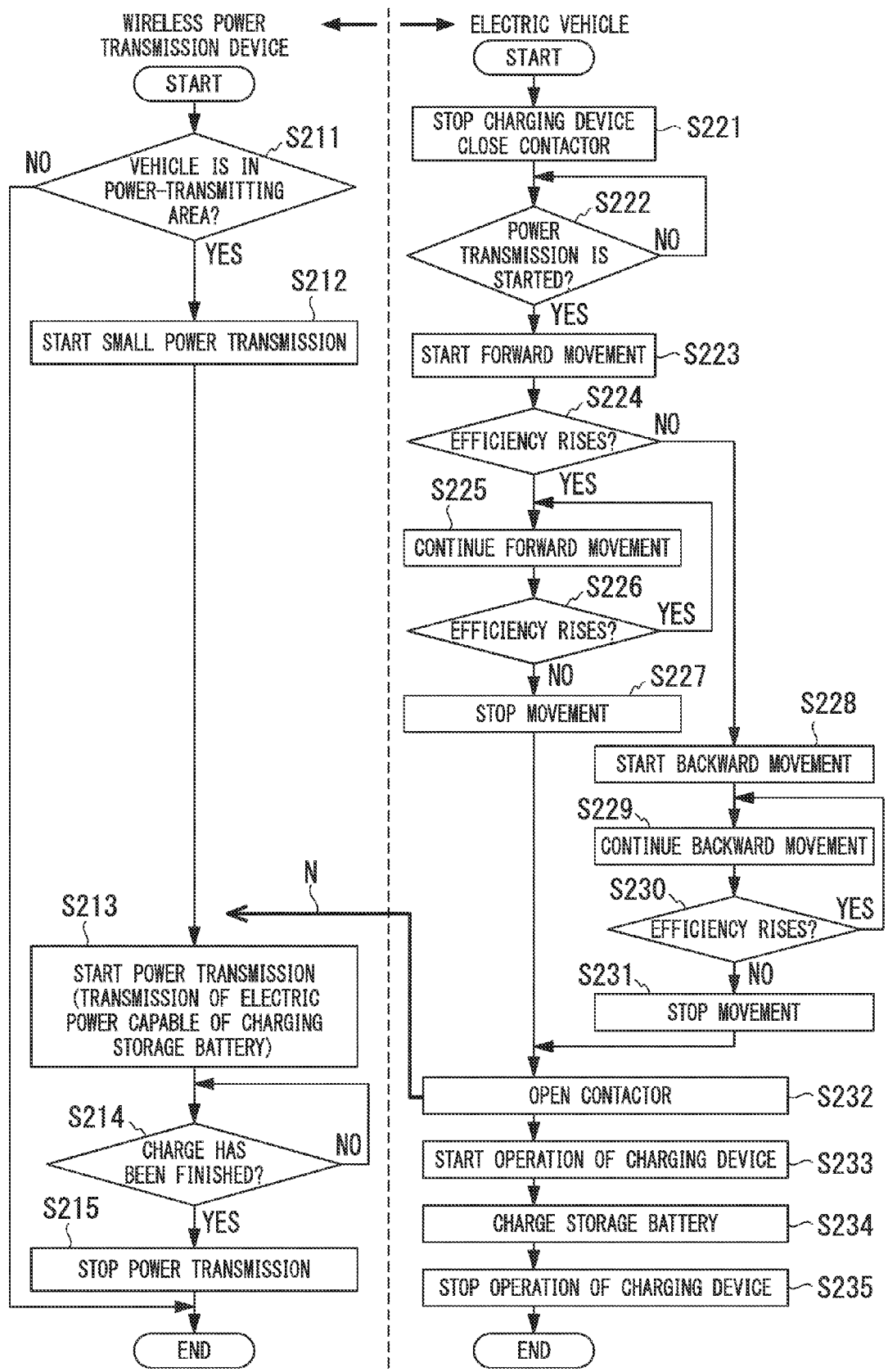
FIG. 7 is a flow diagram showing operations of the vehicle and the wireless power transmission device according to the second embodiment of the present invention.

Next, operations of the wireless power transmission device 21 and the electric vehicle 22 having the above-described configurations are described. FIG. 7 is a flow diagram showing operations of the vehicle and the wireless power transmission device according to the second embodiment of the present invention. In addition, hereinafter, operations in which the storage battery 224 mounted on the electric vehicle 22 is charged using electric power supplied from the wireless power transmission device 21 are mainly described.

First, a driver drives the electric vehicle 22, and moves and stops the electric vehicle 22 at the installation position of the wireless power transmission device 21 or at the vicinity thereof. At this time, the control part 219 of the wireless power transmission device 21 determines whether a vehicle (the electric vehicle 22) is positioned in a power-transmitting area (step S211). For example, the control part 219 determines whether the electric vehicle 22 is in the power-transmitting area, based on whether the radio communication device 218 can wirelessly communicate with the radio communication device 232 of the electric vehicle 22.

When the control part 219 determines that the electric vehicle 22 is not positioned in the power-transmitting area (when the determination result of step S211 is "NO"), the control part 219 finishes the process of the wireless power transmission device 21 shown in FIG. 7. In contrast, when the control part 219 determines that the electric vehicle 22 is positioned in the power-transmitting area (when the determination result of step S211 is "YES"), the control part 219 operates the power-supplying circuit 213, thereby starting the transmission of small electric power (step S212). In addition, when the electric vehicle 22 is positioned in the power-transmitting area, an electromagnetic coupling circuit is formed of the power-transmitting coil 214 of the wireless power transmission device 21 and the power-receiving coil 225 of the electric vehicle 22.

After the driver moved and stopped the electric vehicle 22 at the installation position of the wireless power transmission device 21 or at the vicinity thereof, the driver gives charging instructions to an operating device (not shown) of the electric vehicle 22. Based on the instructions, the controller 233$c$ of the electric vehicle 22 makes the contactor 223 the closed state, thereby making the power-receiving circuit 226 and the load device 228 the connected state. In addition, the controller 233$c$ controls the power-receiving circuit 226, thereby starting the power-receiving operation, and controls the charging device 227, thereby stopping the operation thereof (step S221).

That is, the controller 233$c$ switches the power-supplying destination of the power-receiving circuit 226 to the load device 228 from the charging device 227 in accordance with the start of positioning of the power-receiving coil 225 with respect to the power-transmitting coil 214. Moreover, the load of the load device 228 with respect to the power-receiving circuit 226 is greatly less than that of the charging device 227. Accordingly, in step S212, the control part 219 operates the power-supplying circuit 213 so as to supply the electric vehicle 22 with greatly smaller electric power than the electric power supplied to the electric vehicle 22 in a state where the power-supplying destination of the power-receiving circuit 226 is set to the charging device 227.

Next, the controller 233$c$ determines whether the electric power transmission of the above small electric power from the wireless power transmission device 21 is started (step S222). For example, the controller 233$c$ determines whether the signal indicating the start of the electric power transmission has been sent from the radio communication device 218 of the wireless power transmission device 21. When the controller 233$c$ determines that the electric power transmission is not started (when the determination result of step S222 is "NO"), the controller 233$c$ repeats the above determination. In contrast, when the controller 233$c$ determines that the electric power transmission is started (when the determination result of step S222 is "YES"), the controller 233$c$ controls the inverter 222, thereby starting forward movement of the electric vehicle 22 (step S223). At this time, the inverter 222 drives the motor 221 using electric power supplied from the storage battery 224.

When the controller 233$c$ starts forward movement of the electric vehicle 22, the controller 233$c$ determines whether the power transmission efficiency $\epsilon$ calculated by the efficiency calculator 233$a$ rose due to the forward movement of the electric vehicle 22 (step S224). When the controller 233$c$ determines that the power transmission efficiency $\epsilon$ rose (when the determination result of step S224 is "YES"), the controller 233$c$ controls the inverter 222, thereby continuing low-speed forward movement of the electric vehicle 22 (step S225). Subsequently, the controller 233$c$ determines again whether the power transmission efficiency $\epsilon$ calculated by the efficiency calculator 233$a$ rose due to the forward movement of the electric vehicle 22 (step S226).

When the controller 233$c$ determines that the power transmission efficiency $\epsilon$ rose (when the determination result of step S226 is "YES"), the controller 233$c$ controls the inverter 222, thereby continuing low-speed forward movement of the electric vehicle 22 (step S225). In contrast, when the controller 233$c$ determines that the power transmission efficiency $\epsilon$ does not rise (when the determination result of step S226 is "NO"), the controller 233$c$ controls the inverter 222, thereby stopping the electric vehicle 22 (step S227). That is, during forward movement of the electric vehicle 22, the controller 233$c$ stops the electric vehicle 22 when the power transmission efficiency $\epsilon$ changes into a fixed value or into dropping from rising. At the time of this stop, the relative position of the power-receiving coil 225 with respect to the power-transmitting coil 214 is adjusted to the position suitable for the wireless transmission of electric power.

On the other hand, immediately after starting forward movement of the electric vehicle 22, when the controller 233$c$ determines that the power transmission efficiency $\epsilon$ calculated by the efficiency calculator 233$a$ does not rise even if the electric vehicle 22 moves forward (when the determination result of step S224 is "NO"), the controller 233$c$ controls the inverter 222, thereby starting backward movement of the electric vehicle 22 (step S228). Subsequently, the controller 233$c$ continues low-speed backward movement of the electric vehicle 22 (step S229), and determines whether the power transmission efficiency $\epsilon$ calculated by the efficiency calculator 233$a$ rose due to the backward movement (step S230).

When the controller 233$c$ determines that the power transmission efficiency $\epsilon$ rose (when the determination result of step S230 is "YES"), the controller 233$c$ controls the inverter 222, thereby continuing low-speed backward movement of the electric vehicle 22 (step S229). In contrast, when the controller 233$c$ determines that the power transmission efficiency $\epsilon$ does not rise (when the determination result of step S230 is "NO"), the controller 233$c$ controls the inverter 222, thereby stopping the electric vehicle 22 (step S231). That is, during backward movement of the electric vehicle 22, the controller 233$c$ stops the electric vehicle 22 when the power transmission efficiency $\epsilon$ changes into a fixed value or into dropping from rising. At the time of this stop, the relative position of the power-receiving coil 225 with respect to the power-transmitting coil 214 is adjusted to the position suitable for the wireless transmission of electric power.

When the controller 233$c$ stops the electric vehicle 22 through performance of step S227 or step S231, the controller 233$c$ makes the contactor 223 the opened state, thereby making the power-receiving circuit 226 and the load device 228 the disconnected state. Furthermore, the controller 233$c$ makes the radio communication device 232 send a positioning completion notification N indicating that the positioning was finished, the electric vehicle 22 stopped, and the contactor 223 was set in the disconnected state (opened state) (step S232). That is, the controller 233c switches the power-supplying destination of the power-receiving circuit 226 to the charging device 227 from the load device 228. Subsequently, after step S232, the controller 233c controls the charging device 227, thereby starting the charging operation, and controls the inverter 222, thereby stopping the operation thereof (step S233).

As a result, in the electric vehicle 22, the storage battery 224 is charged by the charging device 227 (step S234). Specifically, the AC power from the wireless power transmission device 21 is wirelessly transmitted to the electric vehicle 22 through the electromagnetic coupling circuit formed of the power-transmitting coil 214 and the power-receiving coil 225 and is received by the power-receiving circuit 226. The AC power received by the power-receiving circuit 226 is converted into DC power, and the converted DC power is supplied to the charging device 227. Thus, the charge to the storage battery 224 using this direct current is performed by the charging device 227. Subsequently, when the storage battery 224 becomes the fully charged state through the charge by the charging device 227, the controller 233c stops the charging device 227, thereby stopping the charge to the storage battery 224 (step S235).

On the other hand, after starting the transmission of small electric power at step S212, when the radio communication device 218 receives the above-described positioning completion notification N (a notification that the contactor 223 is in the disconnected state) from the radio communication device 232, the control part 219 of the wireless power transmission device 21 controls the power-supplying circuit 213, thereby making the power-transmitting coil 214 start the transmission of increased electric power used to charge a battery (large electric power to charge the storage battery 224) (step S213). That is, the control part 219 switches the electric power transmitted from the power-transmitting coil 214, from small electric power to large electric power used to charge a battery.

After starting the transmission of increased electric power to charge a battery at step S213, the control part 219 determines whether the charge to the storage battery 224 mounted on the electric vehicle 22 is finished (step S214).

For example, the control part 219 determines whether a signal indicating the charge completion of the storage battery 224 has been sent from the radio communication device 232 of the electric vehicle 22. When the control part 219 determines that the charge is not finished (when the determination result of step S214 is "NO"), the control part 219 repeats the determination in step S214. In contrast, when the control part 219 determines that the charge is finished (when the determination result of step S214 is "YES"), the control part 219 stops the power-supplying circuit 213, thereby stopping the electric power transmission (step S215).

As described above, in this embodiment, the power transmission efficiency ε from the wireless power transmission device 21 to the electric vehicle 22 is determined, and the electric vehicle 22 is moved backward and forward while the power transmission efficiency ε is referred to, whereby the position between the power-transmitting coil 214 of the wireless power transmission device 21 and the power-receiving coil 225 of the electric vehicle 22 is adjusted. Therefore, the position can be precisely adjusted even if electric vehicles 22 vary in size or in the attachment position of the power-receiving coil 225, and electric power can be efficiently transmitted. In addition, a mechanism or the like which individually moves the power-transmitting coil 214 or the power-receiving coil 225 is unnecessary, and thus the increase in size or in cost is not caused.

In addition, in this embodiment, the power transmission efficiency ε from the wireless power transmission device 21 to the electric vehicle 22 is determined based on the electric power amount P1 of electric power supplied to the power-supplying circuit 213 of the wireless power transmission device 21 and on the electric power amount P2 of electric power received by the power-receiving circuit 226 of the electric vehicle 22. The power transmission efficiency ε is not only the power transmission efficiency between the power-transmitting coil 214 and the power-receiving coil 225, but is the power transmission efficiency in a state including the power-supplying circuit 213 and the power-receiving circuit 226, and is approximately the same as the actual power transmission efficiency. Therefore, the position between the power-transmitting coil 214 of the wireless power transmission device 21 and the power-receiving coil 225 of the electric vehicle 22 can be adjusted to a more appropriate position so that the actual power transmission efficiency is maximized.

In addition, in this embodiment, when the positioning between the power-transmitting coil 214 and the power-receiving coil 225 is performed, the motor 221 is driven and controlled using the electric power of the storage battery 224. That is, the above positioning is performed without using the electric power supplied from the power-transmitting coil 214. In this way, during the positioning, the power-transmitting coil 214 does not have to supply electric power to drive the motor 221, and it is sufficient if the power-transmitting coil 214 supplies minimum electric power required for the positioning. As a result, it is possible to reduce a power loss caused by the power-receiving coil 225 not receiving part of electric power output from the power-transmitting coil 214.

Hereinbefore, the vehicle and the wireless power transmission device according to the second embodiment of the present invention were described. However, the present invention is not limited to the above-described second embodiment, and modifications can be adopted within the scope of the present invention. For example, in the second embodiment, the positioning is performed by moving the electric vehicle 22 backward and forward while the power transmission efficiency ε from the wireless power transmission device 21 to the electric vehicle 22 is referred to. However, the positioning may be performed by moving the electric vehicle 22 backward and forward while the electric power amount P2 (the electric power received by the power-receiving circuit 226) determined by the electric power amount-computing unit 231 is referred to, instead of the power transmission efficiency ε. That is, the controller 233c may be configured to generate, using the electric power amount P2 determined by the electric power amount-computing unit 231, an internal command to move the electric vehicle 22 in an appropriate direction, and to control the motor 221 through the inverter 222 based on the command.

The wireless power transmission device 21 and the power-transmitting coil 214 may not be installed to be strictly flush with the ground. For example, they may be buried in the ground so that the efficiency of wireless power transmission is not remarkably decreased, and may be installed to be lower than the ground. In addition, they may be projected so that the traveling of the electric vehicle 22 is not remarkably disturbed, and may be installed to be higher than the ground.

In addition, in the second embodiment, a case where the positioning is performed by moving the electric vehicle 22 backward and forward was described as an example. However, if a vehicle can linearly move rightward and leftward, the positioning can be performed by moving the vehicle rightward and leftward. Moreover, in general, a vehicle can move only backward and forward if a steering is not operated, and cannot linearly move rightward and leftward. Accordingly, it is desirable to use a power-transmitting coil which does not cause an excessive drop of the transmission efficiency even if a position shift in the right-and-left direction occurs.

Therefore, the power-transmitting coil 214 of the wireless power transmission device 21 may be arranged in a configuration similar to the power-transmitting coil 114 in FIG. 4 of the above-described first embodiment.

In addition, in the second embodiment, during the positioning, the electric vehicle 22 is continuously moved forward or backward. However, not continuous movement, but intermittent movement of a minute distance may be performed. In addition, the power transmission efficiency $\epsilon$ after performing one movement of the intermittent movement is compared with the power transmission efficiency $\epsilon$ before performing the intermittent movement, and thereby it is determined whether the power transmission efficiency $\epsilon$ rises or drops.

In addition, in the second embodiment, at step S211 in FIG. 7, it is determined whether the electric vehicle 22 is positioned in the power-transmitting area, based on whether the radio communication device 218 of the wireless power transmission device 21 can wirelessly communicate with the radio communication device 232 of the electric vehicle 22. However, it may be determined whether the electric vehicle 22 is positioned in the power-transmitting area, based on the position of the electric vehicle 22 obtained by GPS (Global Positioning System) or the like.

In addition, when the wireless power transmission device 21 is installed in a place where the movement of the electric vehicle 22 is limited to one-way (for example, a place where the movement is limited only to forward movement), it is only necessary to stop the electric vehicle 22 immediately after the electric vehicle 22 entered the power-transmitting area. That is, it is only necessary to stop the electric vehicle 22 so that the power-receiving coil 225 is disposed near the periphery of the power-transmitting area.

In this way, if the electric vehicle 22 is moved forward, the power transmission efficiency $\epsilon$ rises and the determination result of step S224 in FIG. 7 always becomes "YES", and thus it is possible to prevent the electric vehicle 22 from moving backward.

In addition, when the power transmission efficiency $\epsilon$ remarkably decreases during the positioning, it is desirable that the controller 233c of the electric vehicle 22 perform the control to stop the electric vehicle 22, and stop the transmission of electric power by notifying the wireless power transmission device 21 through the radio communication device 232 that the power transmission efficiency $\epsilon$ remarkably decreases. In this way, it is possible to prevent unexpected trouble which occurs during the positioning.

In addition, in the second embodiment, a case where an object to be supplied with electric power is an electric vehicle with a storage battery mounted thereon was described as an example. However, the present invention can be applied to a plug-in hybrid vehicle or to a transportation vehicle. Furthermore, the present invention can be applied to an unmanned vehicle.

In addition, in the second embodiment, the contactor 223 is employed as a device used to switch the supply route of electric power, but an electronic switch such as a relay or an FET (Field Effect Transistor) may be employed instead of the contactor 223.

In addition, in the second embodiment, a resistor is employed as the load device 228. However, if the load device 228 consumes small electric power (a few watts), an electronic load device may be used therefor. For example, the voltage of part of small electric power is converted using a converter, and the converted electric power may be used as auxiliary control power for various devices (electronic load devices) in the electric vehicle 22.

In addition, in the second embodiment, during the positioning, the contactor 223 is set in the connected state (the closed state), and the charging device 227 is stopped. When the positioning is finished, the contactor 223 is set in the disconnected state (the opened state), and the charging device 227 is let to start the charging operation. In this way, the supply destination of electric power received by the power-receiving coil 225 is switched between the load device 228 and the storage battery 224 (the charging device 227). However, the present invention is not limited to this configuration. For example, instead of the contactor 223, a switching circuit which switches the connection destination of the power-receiving circuit 226 to the charging device 227 or to the load device 228 may be provided at the connection point between the load device 228 and the DC bus 2B2. That is, the switching circuit switches the connection destination of the power-receiving circuit 226 to the charging device 227 or to the load device 228, and thereby the supply destination of electric power received by the power-receiving coil 225 may be switched to the load device 228 or to the storage battery 224 (the charging device 227). As a result, during the positioning, the power-receiving circuit 226 and the charging device 227 are set in the disconnected state, and thus it is not necessary to stop the charging device 227.

In addition, in the second embodiment, at the positioning or at the charging of the electric vehicle 22, the wireless power transmission device 21 switches the electric power which the power-transmitting coil 214 transmits, to small electric power or to large electric power to charge a battery, but the present invention is not limited to this configuration. For example, the wireless power transmission device 21 may not switch the electric power which the power-transmitting coil 214 transmits, at the positioning or at the charging, and the power-transmitting coil 214 may continue transmitting constant large electric power to charge a battery. Moreover, at this time, it is necessary to set the load device 228 of the electric vehicle 22 to a load capable of consuming large electric power to charge a battery. In this case, the electric vehicle 22 does not have to send the positioning completion notification N to the wireless power transmission device 21.

Furthermore, an electric vehicle and a wireless power transmission device may be configured to be applied to both of the first and second embodiments. For example, it may be configured so that the supply destination of electric power used for the positioning of a vehicle is switched between the storage battery 224 and the load device 228, based on a predetermined condition.

Third Embodiment

Figure 8:
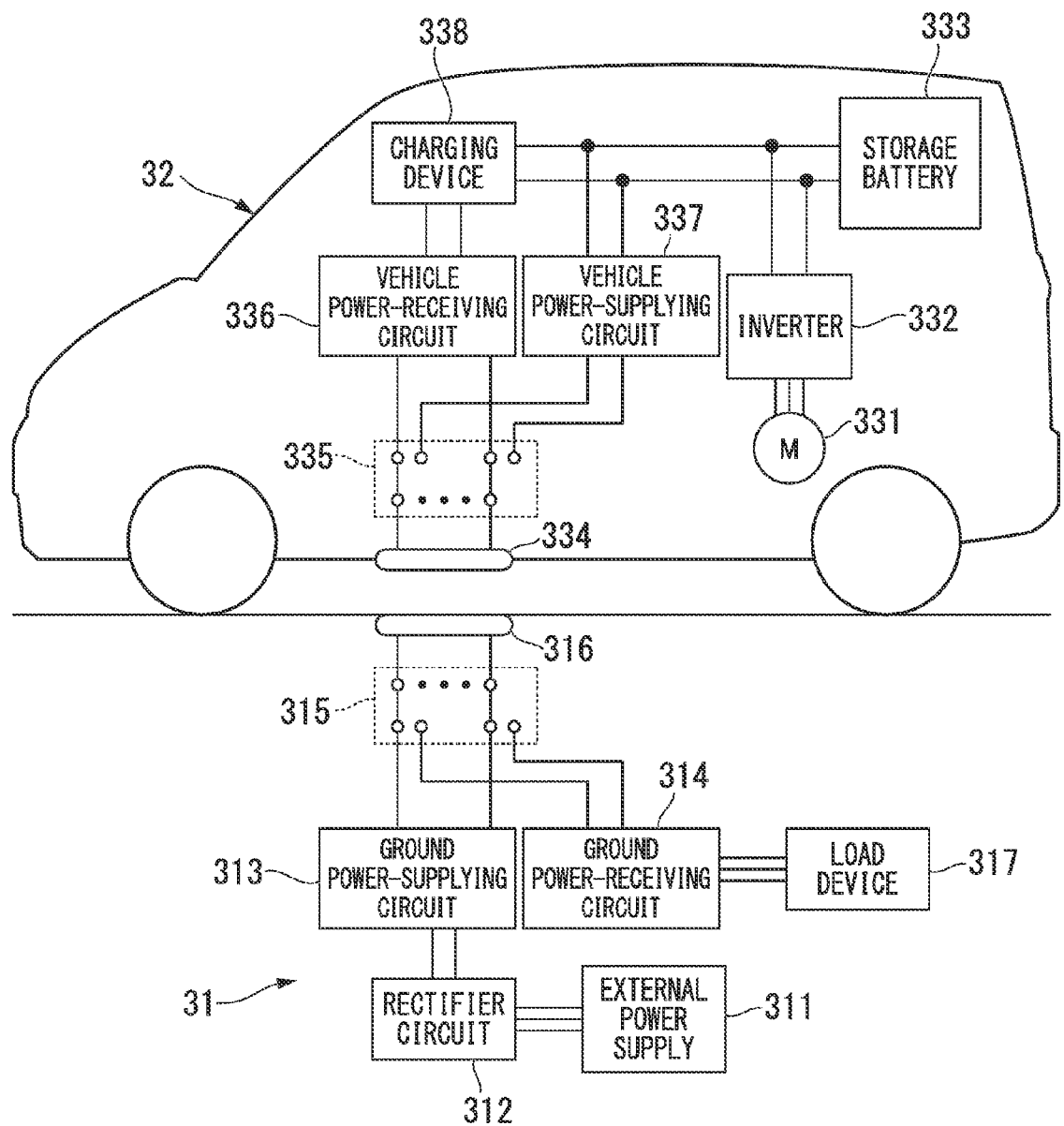
FIG. 8 is a block diagram showing main configurations of a vehicle and a wireless power transmission device according to a third embodiment of the present invention.

Next, a vehicle and a wireless power transmission device according to a third embodiment of the present invention are described in detail with reference to the drawings. FIG. 8 is a block diagram showing main configurations of the vehicle and the wireless power transmission device according to the third embodiment of the present invention.

As shown in FIG. 8, a wireless power transmission device 31 of this embodiment is installed in the ground. When an electric vehicle 32 as a vehicle traveling on the ground stops in a predetermined positional relationship (a positional relationship in which an electromagnetic coupling circuit described below is formed), the wireless power transmission device 31 can wirelessly transmit electric power (electric power to charge a storage battery 333) to the electric vehicle 32. The wireless power transmission device 31 includes an external power supply 311, a rectifier circuit 312, a ground power-supplying circuit 313, a ground power-receiving circuit 314, a ground switch 315, a ground coil 316 (primary coil), a load device 317 (second load device) and the like.

The external power supply 311 is a power supply which supplies electric power required to generate electric power to be transmitted to the electric vehicle 32, and is a power supply which supplies, for example, three-phase AC power whose voltage is 200 V. In addition, the external power supply 311 is not limited to a three-phase AC power supply, and may be a power supply which supplies single-phase AC power such as a commercial AC power supply. The rectifier circuit 312 is a circuit which rectifies and converts AC power supplied from the external power supply 311, into DC power. Moreover, as the external power supply 311, a DC power supply such as a fuel battery or a solar battery can be employed. In this case, the rectifier circuit 312 may be omitted, and the above DC power supply and the ground power-supplying circuit 313 may be directly connected to each other.

The ground power-supplying circuit 313 converts DC power supplied from the rectifier circuit 312, into AC power. In addition, when the ground power-supplying circuit 313 is connected to the ground coil 316 by the ground switch 315, the ground power-supplying circuit 313 supplies the above AC power to the ground coil 316. In this way, the ground power-supplying circuit 313 wirelessly supplies electric power to the electric vehicle 32 through an electromagnetic coupling circuit which is formed of the ground coil 316 and a vehicle coil 334 (described below) provided in the electric vehicle 32.

When the ground power-receiving circuit 314 is connected to the ground coil 316 by the ground switch 315, the ground power-receiving circuit 314 receives electric power (AC power) which is wirelessly supplied through the electromagnetic coupling circuit formed of the vehicle coil 334 of the electric vehicle 32 and the ground coil 316. In addition, the ground power-receiving circuit 314 converts the received electric power into DC power and supplies the DC power to the load device 317.

Figure 9:
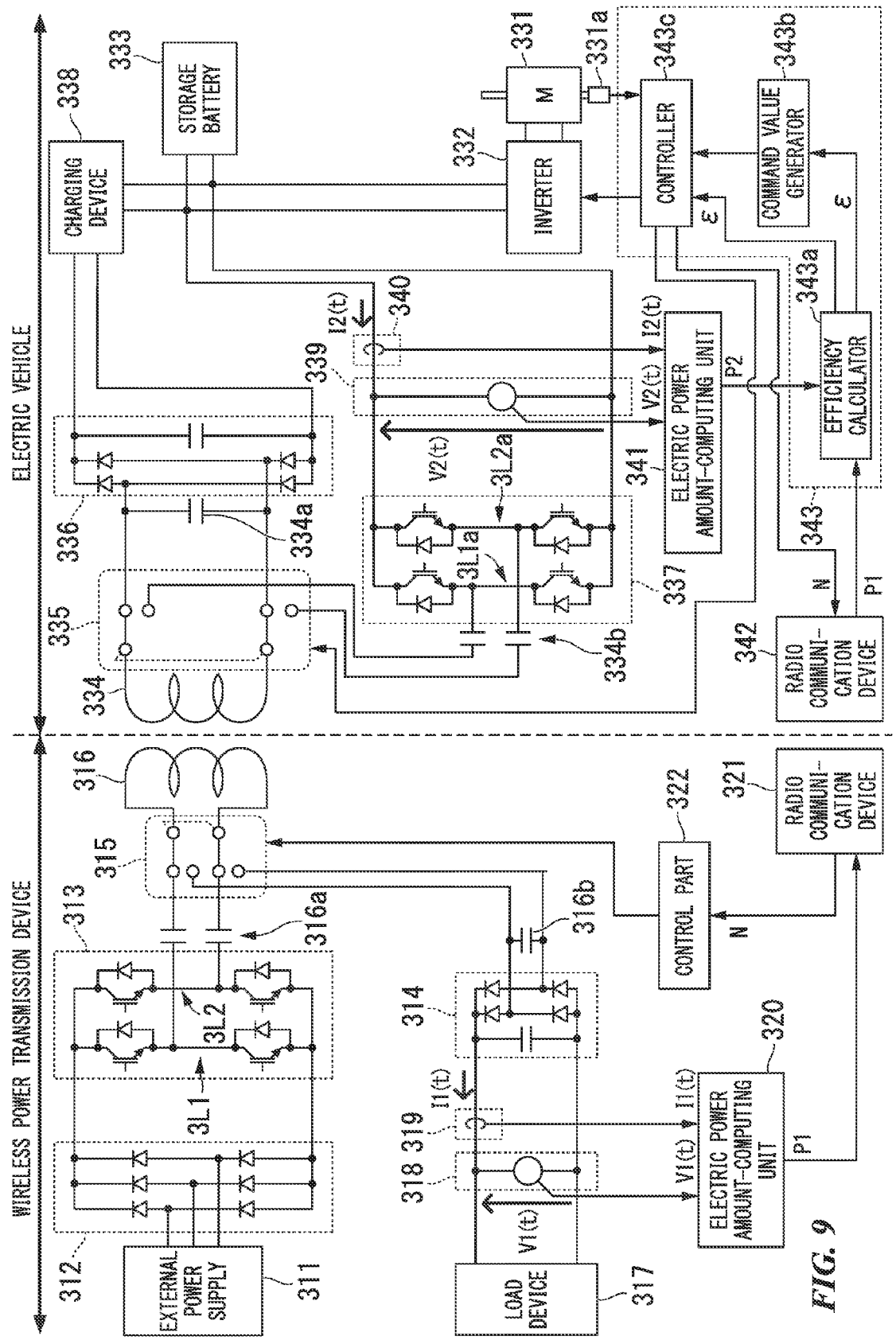
FIG. 9 is a diagram showing in detail electrical configurations of the vehicle and the wireless power transmission device according to the third embodiment of the present invention.

The ground switch 315 switches the connection destination of the ground coil 316 between the ground power-supplying circuit 313 and the ground power-receiving circuit 314 under the control of a control part 322 (omitted in FIG. 8, refer to FIG. 9). For the ground switch 315, an electronic switch using semiconductors or a mechanical contactor can be employed, wherein the mechanical contactor switches between contact and non-contact by actually moving a contact point thereof using a solenoid coil. Specifically, during the positioning of the vehicle coil 334 of the electric vehicle 32 with respect to the ground coil 316, the ground switch 315 switches the connection destination of the ground coil 316 to the ground power-receiving circuit 314. In contrast, after the positioning is finished, during power supply to the electric vehicle 32, the ground switch 315 switches the connection destination of the ground coil 316 to the ground power-supplying circuit 313.

The ground coil 316 is installed in the ground, and both ends thereof are connected to the ground switch 315. When an external magnetic field (a magnetic field caused by the vehicle coil 334) acts on the ground coil 316, the ground coil 316 generates electromotive force through electromagnetic induction. When the ground coil 316 is connected to the ground power-receiving circuit 314 by the ground switch 315, the ground coil 316 outputs the above electromotive force to the ground power-receiving circuit 314 through the ground switch 315. In contrast, when the ground coil 316 is connected to the ground power-supplying circuit 313 by the ground switch 315, the ground coil 316 is arranged to be close to the vehicle coil 334 provided in the electric vehicle 32, and thereby the ground coil 316 performs wireless power transmission to the vehicle coil 334 of the electric vehicle 32 using the AC power supplied from the ground power-supplying circuit 313 through the ground switch 315.

That is, an electromagnetic coupling circuit is formed of the ground coil 316 and the vehicle coil 334 provided in the electric vehicle 32. The electromagnetic coupling circuit means a circuit in which the ground coil 316 and the vehicle coil 334 are electromagnetically coupled together, and wireless power supplying is performed from the ground coil 316 to the vehicle coil 334, or is performed from the vehicle coil 334 to the ground coil 316. The electromagnetic coupling circuit may be either circuit, i.e., a circuit to supply electric power using "electromagnetic induction method" and a circuit to supply electric power using "electromagnetic field resonance method".

The load device 317 is connected to the ground power-receiving circuit 314. The load device 317 like this is, for example, a resistor having a predetermined resistance value, and consumes DC power supplied from the ground power-receiving circuit 314.

As shown in FIG. 8, the electric vehicle 32 as a vehicle includes a motor 331, an inverter 332, the storage battery 333, the vehicle coil 334 (secondary coil), a vehicle switch 335, a vehicle power-receiving circuit 336, a vehicle power-supplying circuit 337, a charging device 338 and the like. In addition, the electric vehicle 32 has a function of automatically adjusting the position of the vehicle coil 334 with respect to the ground coil 316 of the wireless power transmission device 31.

As a motive power source which produces motive power to move the electric vehicle 32, the motor 331 is mounted on the electric vehicle 32 and produces motive power based on the drive of the inverter 332. For the motor 331, a motor such as a permanent magnet synchronous motor or an induction motor can be employed. The inverter 332 drives the motor 331 using electric power supplied from the storage battery 333, under the control of a control part 343 (omitted in FIG. 8, refer to FIG. 9).

The storage battery 333 is a rechargeable battery (e.g., a secondary battery such as a lithium-ion battery or a nickel-hydrogen battery) mounted on the electric vehicle 32, and supplies electric power to drive the motor 331.

The vehicle coil 334 is provided in the bottom of the electric vehicle 32, and both ends thereof are connected to the vehicle switch 335. When an external magnetic field (a magnetic field caused by the ground coil 316) acts on the vehicle coil 334, the vehicle coil 334 generates electromotive force through electromagnetic induction. When the vehicle coil 334 is connected to the vehicle power-receiving circuit 336 by the vehicle switch 335, the vehicle coil 334 outputs the above electromotive force to the vehicle power-receiving circuit 336 through the vehicle switch 335. In contrast, in a case where the vehicle coil 334 is connected to the vehicle power-supplying circuit 337 by the vehicle switch 335, when AC power is supplied from the vehicle power-supplying circuit 337 through the vehicle switch 335, the vehicle coil 334 performs wireless power supplying to the ground coil 316 of the wireless power transmission device 31 using the AC power. That is, the vehicle coil 334 is configured to be capable of performing wireless transmission of electric power between the vehicle coil 334 and the ground coil 316 at the outside of the vehicle.

The vehicle switch 335 switches the connection destination of the vehicle coil 334 to the vehicle power-receiving circuit 336 or to the vehicle power-supplying circuit 337 under the control of the control part 343. For the vehicle switch 335, an electronic switch using semiconductors or a mechanical contactor can be employed, wherein the mechanical contactor switches between contact and non-contact by actually moving a contact point thereof using a solenoid coil. Specifically, during the positioning of the vehicle coil 334 with respect to the ground coil 316, the vehicle switch 335 switches the connection destination of the vehicle coil 334 to the vehicle power-supplying circuit 337. In contrast, after the positioning is finished, during power supply to the electric vehicle 32, the vehicle switch 335 switches the connection destination of the vehicle coil 334 to the vehicle power-receiving circuit 336.

When the vehicle power-receiving circuit 336 is connected to the vehicle coil 334 by the vehicle switch 335, the vehicle power-receiving circuit 336 receives electric power (AC power) which is wirelessly supplied through an electromagnetic coupling circuit formed of the ground coil 316 of the wireless power transmission device 31 and the vehicle coil 334. In addition, the vehicle power-receiving circuit 336 converts the received electric power into DC power and supplies the DC power to the charging device 338.

The vehicle power-supplying circuit 337 converts, into AC power, DC power supplied from the storage battery 333. In addition, when the vehicle power-supplying circuit 337 is connected to the vehicle coil 334 by the vehicle switch 335, the vehicle power-supplying circuit 337 supplies the above AC power to the vehicle coil 334, and thereby wirelessly supplies electric power to the wireless power transmission device 31 through the electromagnetic coupling circuit formed of the vehicle coil 334 and the ground coil 316 of the wireless power transmission device 31.

The charging device 338 is a device which charges the storage battery 333 using electric power (DC power) supplied from the vehicle power-receiving circuit 336.

In addition, configurations and operations of the ground power-supplying circuit 313, the ground power-receiving circuit 314, the ground coil 316, the vehicle coil 334, the vehicle power-receiving circuit 336, and the vehicle power-supplying circuit 337 are disclosed in, for example, Japanese Unexamined Patent Application, First Publication No. 2009-225551 ("POWER TRANSMISSION SYSTEM") or Japanese Unexamined Patent Application, First Publication No. 2008-236916 ("WIRELESS POWER TRANSMISSION DEVICE").

FIG. 9 is a diagram showing in detail electrical configurations of a vehicle and a wireless power transmission device according to an embodiment of the present invention. Moreover, in FIG. 9, the same components as that shown in FIG. 8 are represented by the same reference signs. As shown in FIG. 9, the rectifier circuit 312 of the wireless power transmission device 31 is configured as a three-phase full-wave rectifier circuit (bridge rectifier circuit). In addition, the ground power-supplying circuit 313 of the wireless power transmission device 31 is configured as a circuit (inverter) in which switching legs 3L1, 3L2 (each circuit composed of series-connected two transistors and a diode which is connected to each of the two transistors in parallel) are connected in parallel. Moreover, for the transistor, an IGBT (Insulated Gate Bipolar Transistor), a Power MOSFET (Metal-Oxide-Semiconductor Field-Effect Transistor) or the like can be used.

In addition, two capacitors 316a are provided between the ground power-supplying circuit 313 and the ground switch 315. When the capacitors 316a are connected to the ground coil 316 through the ground switch 315, the capacitors 316a together with the ground coil 316 form a series resonant circuit. When the ground coil 316 is connected to the ground power-supplying circuit 313 by the ground switch 315, one end of the ground coil 316 is connected to the switching leg 3L1 of the ground power-supplying circuit 313 through one capacitor 316a, and the other end thereof is connected to the switching leg 3L2 of the ground power-supplying circuit 313 through the other capacitor 316a.

In addition, the ground power-receiving circuit 314 is configured using a bridge rectifier circuit composed of four diodes and using a capacitor connected to the output terminals of the bridge rectifier circuit in parallel. Moreover, a capacitor 316b is connected between the ground power-receiving circuit 314 and the ground switch 315 in parallel.

The wireless power transmission device 31 includes a voltage measurement unit 318, a current measurement unit 319, an electric power amount-computing unit 320 (second received power value-computing part), a radio communication device 321 (first device input part, second device output part) and the control part 322 in addition to the above-described components from the external power supply 311 to the load device 317.

The voltage measurement unit 318 and the current measurement unit 319 are provided between the ground power-receiving circuit 314 and the load device 317, and measure an input voltage V1 (t) and an input current I1 (t) of the load device 317, respectively.

The electric power amount-computing unit 320 determines, using the input voltage V1 (t) measured by the voltage measurement unit 318 and using the input current I1 (t) measured by the current measurement unit 319, an electric power amount P1 (second received power value) of electric power received by the ground power-receiving circuit 314. Specifically, the electric power amount P1 is calculated by multiplying V1 (t) and I1 (t) together. Moreover, if a loss of the ground switch 315 and the ground coil 316 is zero, the electric power amount P1 of electric power received by the ground power-receiving circuit 314 becomes equal to the amount of electric power (a received power amount) received by the ground coil 316. The electric power amount P1 indicates the amount of electric power which the ground coil 316 has received from the vehicle coil 334.

The radio communication device 321 can wirelessly communicate various pieces of information with a radio communication device 342 provided in the electric vehicle 32. In addition, the radio communication device 321 sends, for example, the information indicating the electric power amount P1 determined by the electric power amount-computing unit 320 to the radio communication device 342, and receives a positioning completion notification N (described below) which a controller 343c (described below) of the electric vehicle 32 outputs. Moreover, the radio communication device 321 can communicate with the radio communication device 342 when the radio communication device 342 of the electric vehicle 32 is positioned in an area around the installation position of the radio communication device 321 in which the radius from the installation position is several meters.

The control part 322 controls the ground power-supplying circuit 313 and the ground switch 315 based on the communication between the radio communication device 321 and the radio communication device 342. That is, the control part 322 controls the ground power-supplying circuit 313 based on a signal which the radio communication device 321 receives from the radio communication device 342, and thereby controls electric power which the ground power-supplying circuit 313 outputs to the ground coil 316. In addition, the control part 322 controls the ground switch 315, and thereby switches the connection destination of the ground coil 316 to the ground power-supplying circuit 313 or to the ground power-receiving circuit 314.

In addition, as shown in FIG. 9, the vehicle power-receiving circuit 336 of the electric vehicle 32 is configured using a bridge rectifier circuit composed of four diodes and using a capacitor connected to the output terminals of the bridge rectifier circuit in parallel. Moreover, a capacitor 334a is connected between the vehicle power-receiving circuit 336 and the vehicle switch 335 in parallel, and a rotation angle detector 331a such as a resolver or an encoder which detects a rotation angle of the motor 331 is attached to the motor 331.

In addition, the vehicle power-supplying circuit 337 is configured as a circuit (inverter) in which switching legs 3L1a, 3L2a (each circuit composed of series-connected two transistors and a diode which is connected to each of the two transistors in parallel) are connected in parallel. Moreover, similar to the ground power-supplying circuit 313 of the wireless power transmission device 31, for the transistor, an IGBT, a Power MOSFET or the like can be used.

In addition, two capacitors 334b are provided between the vehicle power-supplying circuit 337 and the vehicle switch 335. When the capacitors 334b are connected to the vehicle coil 334 through the vehicle switch 335, the capacitors 334b together with the vehicle coil 334 form a series resonant circuit. When the vehicle coil 334 is connected to the vehicle power-supplying circuit 337 by the vehicle switch 335, one end of the vehicle coil 334 is connected to the switching leg 3L1a of the vehicle power-supplying circuit 337 through one capacitor 334b, and the other end thereof is connected to the switching leg 3L2a of the ground power-supplying circuit 313 through the other capacitor 334b.

The electric vehicle 32 includes a voltage measurement unit 339, a current measurement unit 340, an electric power amount-computing unit 341 (second power supply value-computing part), the radio communication device 342 (second vehicle input part, first vehicle output part) and the control part 343 in addition to the above-described components form the motor 331 to the charging device 338.

The voltage measurement unit 339 and the current measurement unit 340 are provided between the vehicle power-supplying circuit 337 and the storage battery 333, and measure an input voltage V2 (t) and an input current I2 (t) of the vehicle power-supplying circuit 337, respectively.

The electric power amount-computing unit 341 determines, using the input voltage V2 (t) measured by the voltage measurement unit 339 and using the input current I2 (t) measured by the current measurement unit 340, an electric power amount P2 (second power supply value) of electric power supplied to the vehicle power-supplying circuit 337. Specifically, the electric power amount P2 is calculated by multiplying V2 (t) and I2 (t) together. Moreover, if a loss of the vehicle coil 334, the vehicle switch 335, and the vehicle power-supplying circuit 337 is zero, the electric power amount P2 of electric power supplied to the vehicle power-supplying circuit 337 becomes equal to the amount of electric power (a power supply amount) supplied from the vehicle coil 334. The electric power amount P2 indicates the amount of electric power which the vehicle coil 334 supplies to the ground coil 316.

The radio communication device 342 can wirelessly communicate various pieces of information with the radio communication device 321 provided in the wireless power transmission device 31. In addition, the radio communication device 342 receives the information indicating the electric power amount P1 to be sent from the radio communication device 321, and sends a positioning completion notification N (described below) which the controller 343c outputs. Moreover, the radio communication device 342 can communicate with the radio communication device 321 when the radio communication device 321 of the wireless power transmission device 31 is positioned in an area around the radio communication device 342 in which the radius from the radio communication device 342 is several meters.

The control part 343 controls each block shown in FIGS. 8 and 9, and thereby controls operation of the electric vehicle 32. For example, the control part 343 controls the inverter 332 which drives the motor 331 while always monitoring detection results of the rotation angle detector 331a attached to the motor 331, and thereby controls traveling of the electric vehicle 32. In addition, during positioning of the vehicle coil 334 with respect to the ground coil 316 of the wireless power transmission device 31, the control part 343 slowly moves (travels) the electric vehicle 32 which has stopped at the installation position of the wireless power transmission device 31 or at the vicinity thereof, while referring to power transmission efficiency ε (described below) from the electric vehicle 32 to the wireless power transmission device 31, and thus adjusts the stop position of the electric vehicle 32.

The control part 343 includes an efficiency calculator 343a (second efficiency calculation part), a command value generator 343b and the controller 343c (command generation part, control part) in order to adjust the stop position when the storage battery 333 is charged.

During positioning between the ground coil 316 and the vehicle coil 334, the efficiency calculator 343a calculates the power transmission efficiency ε from the electric vehicle 32 to the wireless power transmission device 31 based on the information indicating the electric power amount P2 determined by the electric power amount-computing unit 341 and on the information indicating the electric power amount P1 received by the radio communication device 342. Specifically, the power transmission efficiency ε is calculated by dividing the electric power amount P1 by the electric power amount P2.

The command value generator 343b generates a rotation angle command value for the motor 331 based on the power transmission efficiency ε calculated by the efficiency calculator 343a. The controller 343c outputs a torque command value to the inverter 332 while monitoring detection results of the rotation angle detector 331a, based on the rotation angle command value generated by the command value generator 343b. The controller 343c is configured to generate an internal command to move the electric vehicle 32 in an appropriate direction, based on the power transmission efficiency ε which the efficiency calculator 343a has calculated using the electric power amounts P1 and P2, and is configured to control the motor 221 through the inverter 222 based on the internal command. That is, the controller 343c has two functions as a command generation part and a control part according to the present invention. In addition, the command value generator 343b as the above-described command generation part generates, using the electric power amounts P1 and P2, a command to move the electric vehicle 32. Moreover, similar to the first embodiment, the command value generator 343b may have the function as a command generation part according to the present invention.

In addition, when charging instructions are input from an operating device (not shown) based on the operation of a driver, the controller 343c controls the vehicle switch 335, thereby switching the connection destination of the vehicle switch 335 to the vehicle power-supplying circuit 337. Furthermore, the controller 343c controls the vehicle switch 335 at the timing the power transmission efficiency ϵ calculated by the efficiency calculator 343a changes into a fixed value or into dropping from rising, and thereby switches the connection destination of the vehicle switch 335 to the vehicle power-receiving circuit 336 and outputs the positioning completion notification N to the radio communication device 342.

The motor 331 rotates a tire whose radius is known, through a speed reducer (not shown) whose speed reduction ratio is known, and thus the relationship between the rotation angle of the motor 331 and the amount of movement of the electric vehicle 32 is fixed.

Specifically, if the radius of the tire is represented by r and the speed reduction ratio of the speed reducer is represented by n, the electric vehicle 32 moves a distance ($2\pi r/n$) when the motor makes one rotation. Therefore, by controlling the rotation angle of the motor 331, the amount of movement of the electric vehicle 32 can be controlled.

Figure 10:
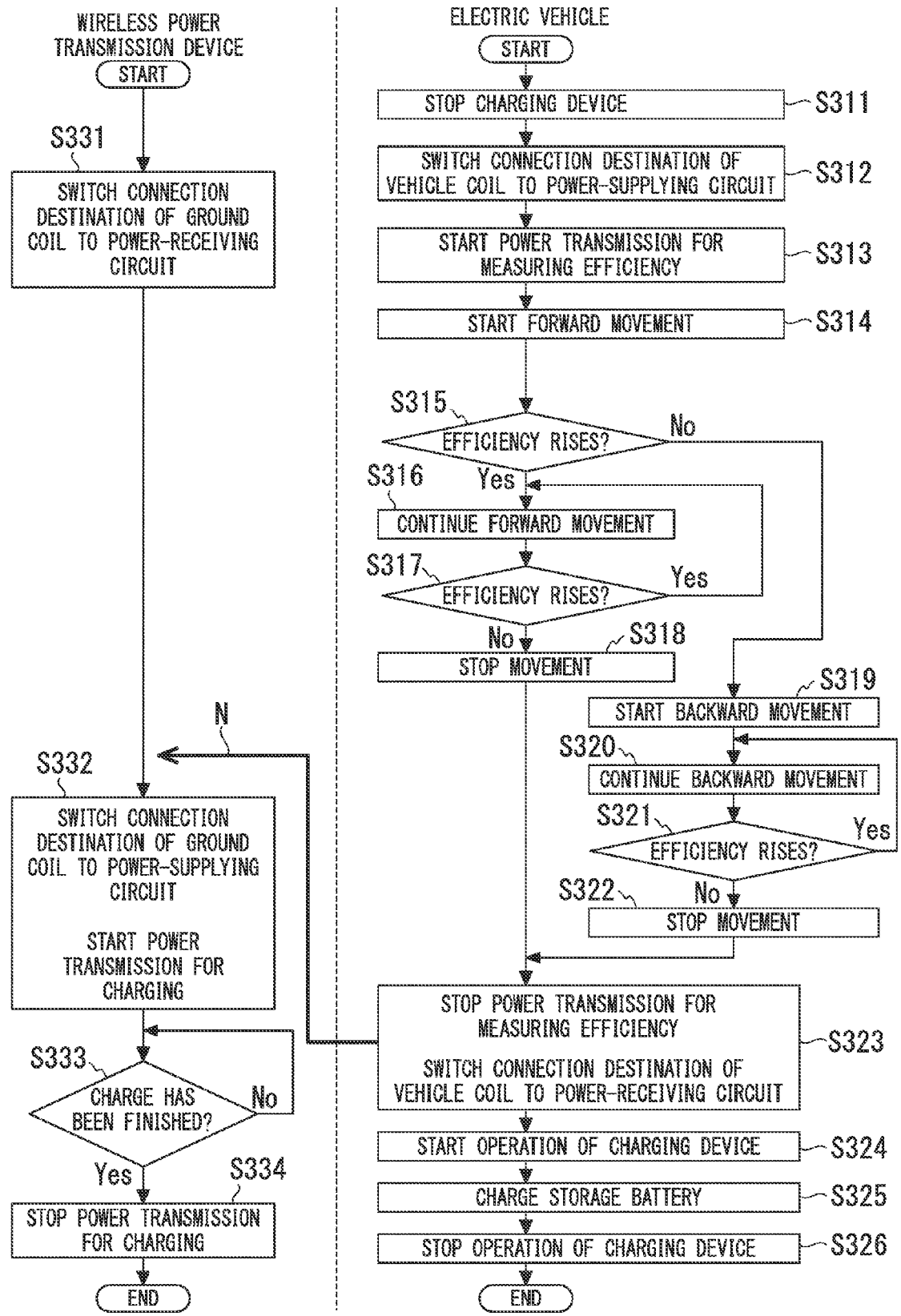
FIG. 10 is a flow diagram showing operations of the vehicle and the wireless power transmission device according to the third embodiment of the present invention.

Next, operations of the wireless power transmission device 31 and the electric vehicle 32 having the above-described configurations are described. FIG. 10 is a flow diagram showing operations of the vehicle and the wireless power transmission device according to the third embodiment of the present invention.

First, a driver drives the electric vehicle 32, moves and stops the electric vehicle 32 at the installation position of the wireless power transmission device 31 or at the vicinity thereof, and thereafter gives charging instructions to an operating device (not shown) of the electric vehicle 32. At this time, the controller 343c of the electric vehicle 32 controls the charging device 338, thereby stopping the operation thereof (step S311), controls the vehicle switch 335, thereby switching the connection destination of the vehicle coil 334 to the vehicle power-supplying circuit 337 (step S312), and operates the vehicle power-supplying circuit 337, thereby starting the transmission of small electric power in order to measure the power transmission efficiency ϵ (step S313). Moreover, when the electric vehicle 32 is positioned in the power-transmitting area of the wireless power transmission device 31, an electromagnetic coupling circuit is formed of the ground coil 316 of the wireless power transmission device 31 and the vehicle coil 334 of the electric vehicle 32.

On the other hand, the control part 322 of the wireless power transmission device 31 determines whether the electric vehicle 32 is positioned in the power-transmitting area of the wireless power transmission device 31. For example, the control part 322 determines whether the electric vehicle 32 is positioned in the power-transmitting area of the wireless power transmission device 31, based on whether the radio communication device 321 can wirelessly communicate with the radio communication device 342 of the electric vehicle 32.

Figure 11:
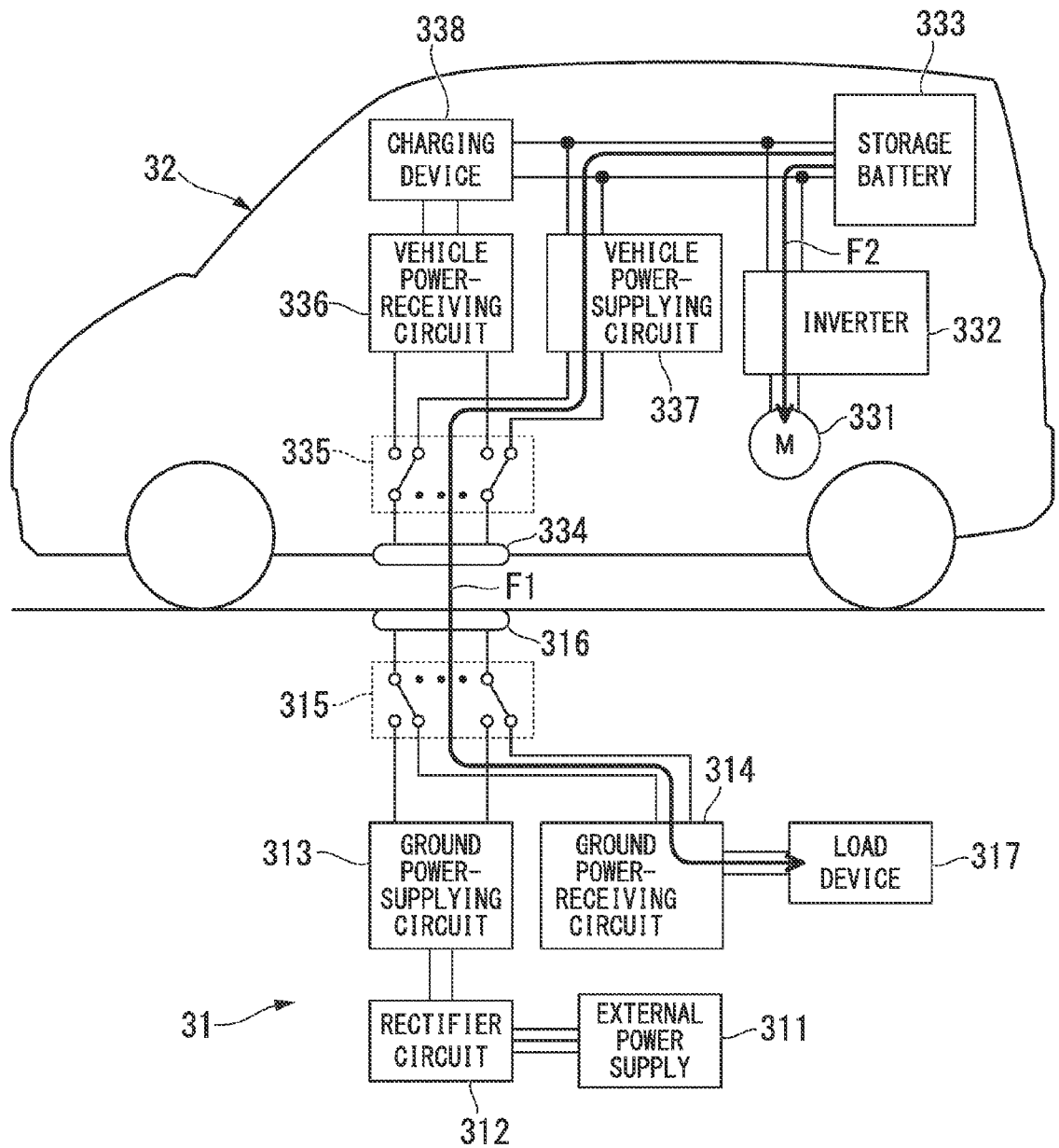
FIG. 11 is a schematic diagram showing a flow of electric power during the positioning of the vehicle according to the third embodiment of the present invention.

When the control part 322 determines that the electric vehicle 32 is positioned in the power-transmitting area of the wireless power transmission device 31, the control part 322 controls the ground switch 315, thereby switching the connection destination of the ground coil 316 to the ground power-receiving circuit 314 (step S331). In this way, as shown in FIG. 11, the electric power which the ground coil 316 has received from the electric vehicle 32 is supplied to the load device 317 through the ground switch 315 and through the ground power-receiving circuit 314. In addition, in FIG. 11, a flow of electric power to measure efficiency is represented by a reference sign F1, and a flow of electric power to drive the motor 331 is represented by a reference sign F2.

In contrast, when starting the transmission of small electric power, the controller 343c of the electric vehicle 32 controls the inverter 332, thereby starting forward movement of the electric vehicle 32 (step S314). At this time, the inverter 332 drives the motor 331 based on the electric power supplied from the storage battery 333.

When starting the forward movement of the electric vehicle 32, the controller 343c determines whether the power transmission efficiency ϵ calculated by the efficiency calculator 343a rose due to the forward movement of the electric vehicle 32 (step S315). When the controller 343c determines that the power transmission efficiency ϵ rose (the determination result of step S315 is "YES"), the controller 343c controls the inverter 332, thereby continuing low-speed forward movement of the electric vehicle 32 (step S316). Subsequently, the controller 343c determines again whether the power transmission efficiency ϵ calculated by the efficiency calculator 343a rose due to the forward movement of the electric vehicle 32 (step S317).

When the controller 343c determines that the power transmission efficiency ϵ rose (the determination result of step S317 is "YES"), the controller 343c controls the inverter 332, thereby continuing low-speed forward movement of the electric vehicle 32 (step S316). In contrast, when the controller 343c determines that the power transmission efficiency ϵ does not rise (the determination result of step S317 is "NO"), the controller 343c controls the inverter 332, thereby stopping the electric vehicle 32 (step S318). That is, during the forward movement of the electric vehicle 32, when the power transmission efficiency ϵ changes from rising into a fixed value or into dropping, the controller 343c stops the electric vehicle 32. At the time of this stop, the relative position of the vehicle coil 334 with respect to the ground coil 316 is adjusted to the position suitable for the wireless transmission of electric power.

On the other hand, immediately after starting the forward movement of the electric vehicle 32, the controller 343c determines that the power transmission efficiency ϵ calculated by the efficiency calculator 343a does not rise even if the electric vehicle 32 moves forward (the determination result of step S315 is "NO"), the controller 343c controls the inverter 332, thereby starting backward movement the electric vehicle 32 (step S319). Subsequently, the controller 343c continues low-speed backward movement of the electric vehicle 32 (step S320), and determines whether the power transmission efficiency ϵ calculated by the efficiency calculator 343a rose due to the backward movement (step S321).

When the controller 343c determines that the power transmission efficiency ϵ rose (the determination result of step S321 is "YES"), the controller 343c controls the inverter 332, thereby continuing low-speed backward movement of the electric vehicle 32 (step S320). In contrast, when the controller 343c determines that the power transmission efficiency ϵ does not rise (the determination result of step S321 is "NO"), the controller 343c controls the inverter 332, thereby stopping the electric vehicle 32 (step S322). That is, during the backward movement of the electric vehicle 32, when the power transmission efficiency ϵ changes from rising into a fixed value or into dropping, the controller 343c stops the electric vehicle 32. At the time of this stop, the relative position of the vehicle coil 334 with respect to the ground coil 316 is adjusted to the position suitable for the wireless transmission of electric power.

When the controller 343c stops the electric vehicle 32 through performance of step S318 or step S322, the controller 343c stops the transmission of small electric power in order to measure the power transmission efficiency $\epsilon$, and controls the vehicle switch 335, thereby switching the connection destination of the vehicle coil 334 to the vehicle power-receiving circuit 336. Furthermore, the controller 343c makes the radio communication device 342 send a positioning completion notification N indicating that the positioning was finished, the electric vehicle 32 was stopped, and the transmission of small electric power was stopped (step S323). Subsequently, after step S323, the controller 343c controls the charging device 338, thereby starting the charging operation thereof, and controls the inverter 332, thereby stopping the operation thereof (step S324).

On the other hand, when the radio communication device 321 receives the above-described positioning completion notification N from the radio communication device 342 after step S331, the control part 322 of the wireless power transmission device 31 controls the ground switch 315, thereby switching the connection destination of the ground coil 316 to the ground power-supplying circuit 313, and controls the ground power-supplying circuit 313, thereby starting the transmission of electric power to charge a battery (large electric power to charge the storage battery 333) from the ground coil 316 (step S332). That is, the control part 322 transmits large electric power to charge a battery from the ground coil 316.

Figure 12:
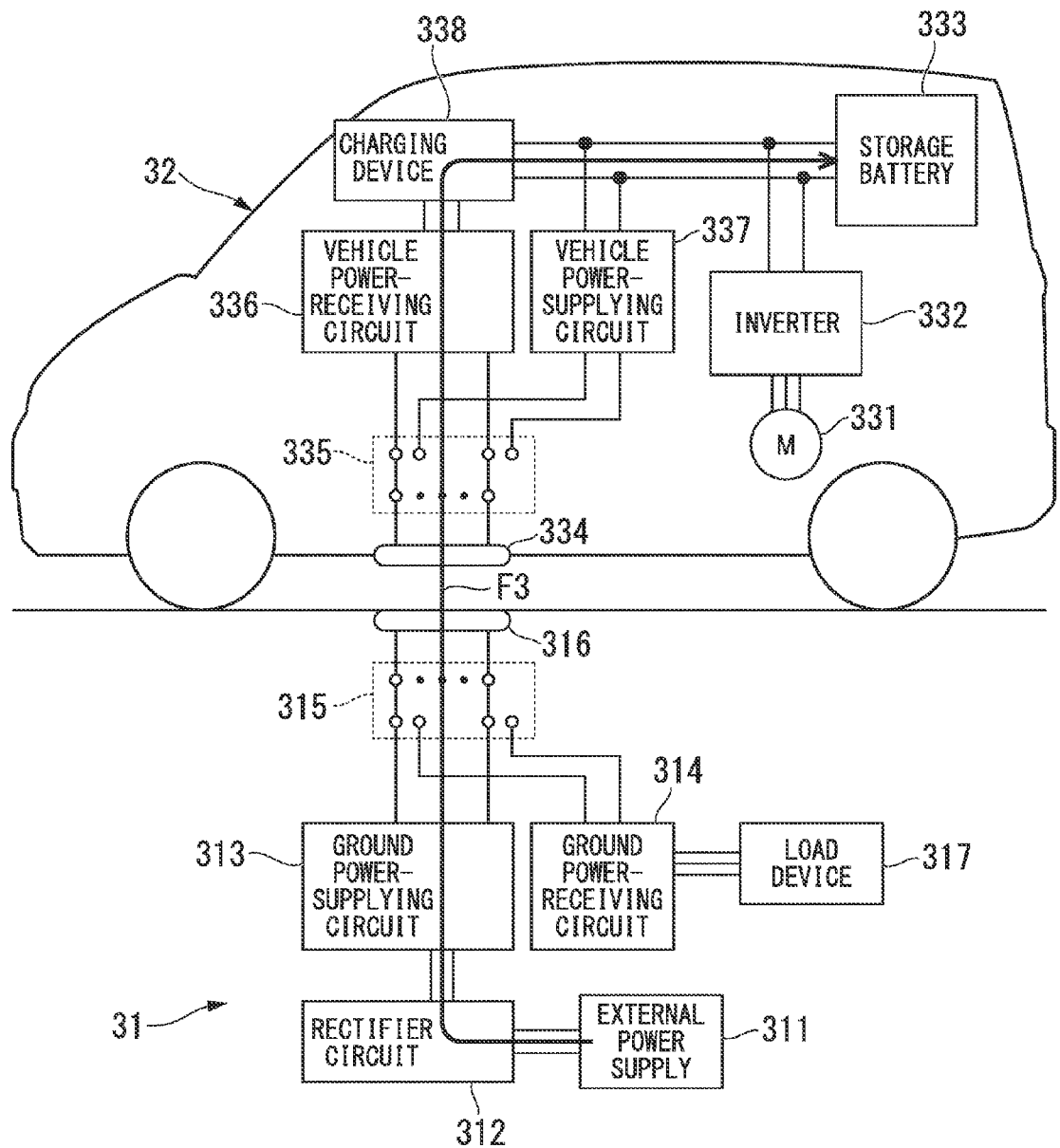
FIG. 12 is a schematic diagram showing a flow of electric power during the power supply to the vehicle according to the third embodiment of the present invention.

As a result, in the electric vehicle 32, the charge to the storage battery 333 is performed by the charging device 338 (step S325). Specifically, as shown in FIG. 12, the AC power from the wireless power transmission device 31 is wirelessly transmitted to the electric vehicle 32 through the electromagnetic coupling circuit formed of the ground coil 316 and the vehicle coil 334 and is received by the vehicle power-receiving circuit 336. Moreover, in FIG. 12, a flow of electric power to charge a battery is represented by a reference sign F3. The AC power received by the vehicle power-receiving circuit 336 is converted into DC power, and the converted DC power is supplied to the charging device 338. Thus, the charge to the storage battery 333 using this DC power is performed by the charging device 338. Subsequently, when the storage battery 333 becomes the fully charged state through the charge by the charging device 338, the controller 343c stops the charging device 338, thereby stopping the charge to the storage battery 333 (step S326).

After starting the transmission of electric power to charge a battery at step S332, the control part 322 determines whether the charge to the storage battery 333 mounted on the electric vehicle 32 was finished (step S333). For example, the control part 322 determines whether a signal indicating the charge completion of the storage battery 333 has been sent from the radio communication device 342 of the electric vehicle 32. When the control part 322 determines that the charge is not finished (the determination result of step S333 is "NO"), the control part 322 repeats the determination in step S333. In contrast, when the control part 322 determines that the charge was finished (the determination result of step S333 is "YES"), the control part 322 stops the ground power-supplying circuit 313, thereby stopping the electric power transmission (step S334).

This embodiment described above uses that the wireless power transmission can be efficiently performed without reference to a direction of power transmission (from a vehicle to a ground device, or from a ground device to a vehicle) if the electromagnetic coupling between the vehicle coil 334 and the ground coil 316 is strong, because both of the vehicle coil 334 and the ground coil 316 are passive circuit elements (not performing active operations such as in a semiconductor). That is, this embodiment uses that, in a case where the position of the vehicle coil 334 is adjusted, in a state of using the vehicle coil 334 as a power-transmitting coil and of using the ground coil 316 as a power-receiving coil, if the position is adjusted so that the power transmission efficiency of the wireless power transmission from the electric vehicle 32 to the wireless power transmission device 31 is increased, the power transmission efficiency is also increased when the wireless power transmission from the wireless power transmission device 31 to the electric vehicle 32 is performed in a state of using the vehicle coil 334 as a power-receiving coil and of using the ground coil 316 as a power-transmitting coil.

As described above, in this embodiment, the power transmission efficiency $\epsilon$ from the electric vehicle 32 to the wireless power transmission device 31 is determined, and the electric vehicle 32 is moved backward and forward while the power transmission efficiency $\epsilon$ is referred to, whereby the position between the ground coil 316 of the wireless power transmission device 31 and the vehicle coil 334 of the electric vehicle 32 is adjusted. Therefore, the position can be precisely adjusted even if electric vehicles 32 vary in size or in the attachment position of the vehicle coil 334, and electric power can be efficiently transmitted. In addition, a mechanism or the like which individually moves the ground coil 316 or the vehicle coil 334 is unnecessary, and thus the increase in size or in cost is not caused.

In addition, in this embodiment, during the positioning of the vehicle coil 334, the load device 317 provided in the wireless power transmission device 31 is configured to consume electric power supplied to the ground coil 316 from the vehicle coil 334. Therefore, compared to a case where a load device is provided in the electric vehicle 32 and consumes electric power supplied to the vehicle coil 334 from the ground coil 316, the deterioration of moving performance of the electric vehicle 32 due to increase in weight can be prevented.

Hereinbefore, an embodiment of the present invention was described, but the present invention is not limited to the above-described third embodiment, and modifications can be freely adopted within the scope of the present invention. For example, in the third embodiment, the positioning is performed by moving the electric vehicle 32 backward and forward while the power transmission efficiency $\epsilon$ from the electric vehicle 32 to the wireless power transmission device 31 is referred to. However, the positioning may be performed by moving the electric vehicle 32 backward and forward while the electric power amount P1 (the electric power received by the wireless power transmission device 31) instead of the power transmission efficiency $\epsilon$ is referred to. That is, the controller 343c may be configured to generate, using the electric power amount P1 input to the radio communication device 342 from the radio communication device 321, an internal command to move the electric vehicle 32 to an appropriate direction, and be configured to control the motor 331 through the inverter 332 based on the internal command.

The wireless power transmission device 31 and the ground coil 316 may not be installed to be strictly flush with the ground. For example, they may be buried in the ground so that the efficiency of wireless power transmission is not remarkably decreased, and may be installed to be lower than the ground. In addition, they may be projected so that the traveling of the electric vehicle 22 is not remarkably disturbed, and may be installed to be higher than the ground.

In addition, in the above-described embodiment, a case where the positioning is performed by moving the electric vehicle 32 backward and forward was described as an example. However, if a vehicle can linearly move rightward and leftward, the positioning can be performed by moving the vehicle rightward and leftward. Moreover, in general, a vehicle can move only backward and forward if a steering is not operated, and cannot linearly move rightward and leftward. Accordingly, it is desirable to use a power-transmitting coil which does not cause an excessive drop of the transmission efficiency even if a position shift in the right-and-left direction occurs.

Therefore, the ground coil 316 of the wireless power transmission device 31 may be arranged in a configuration similar to the power-transmitting coil 114 in FIG. 4 of the above-described first embodiment.

In addition, in the third embodiment, during the positioning, the electric vehicle 32 is continuously moved forward or backward. However, not continuous movement, but intermittent movement of a minute distance may be performed. Moreover, the power transmission efficiency $\epsilon$ after performing one movement of the intermittent movement is compared with the power transmission efficiency $\epsilon$ before performing the intermittent movement, and thereby it is determined whether the power transmission efficiency $\epsilon$ rises or drops.

In addition, in the third embodiment, at step S331 in FIG. 10, it is determined whether the electric vehicle 32 is positioned in the power-transmitting area, based on whether the radio communication device 321 of the wireless power transmission device 31 can wirelessly communicate with the radio communication device 342 of the electric vehicle 32. However, it may be determined whether the electric vehicle 32 is positioned in the power-transmitting area, based on the position of the electric vehicle 32 obtained by GPS (Global Positioning System) or the like.

In addition, when the wireless power transmission device 31 is installed in a place where the movement of the electric vehicle 32 is limited to one-way (for example, a place where the movement is limited only to forward movement), it is only necessary to stop the electric vehicle 32 immediately after the electric vehicle 32 entered the power-transmitting area. That is, it is only necessary to stop the electric vehicle 32 so that the vehicle coil 334 is disposed near the periphery of the power-transmitting area.

In this way, if the electric vehicle 32 is moved forward, the power transmission efficiency $\epsilon$ rises and the determination result of step S315 in FIG. 10 always becomes "YES", and thus it is possible to prevent the electric vehicle 32 from moving backward.

In addition, when the power transmission efficiency $\epsilon$ remarkably decreases during the positioning, it is desirable that the controller 343c of the electric vehicle 32 perform the control to stop the electric vehicle 32, stop the transmission of electric power, and notify the wireless power transmission device 31 through the radio communication device 342 that the power transmission efficiency $\epsilon$ remarkably decreases. In this way, it is possible to prevent unexpected trouble which occurs during the positioning.

In addition, when the value of the power transmission efficiency $\epsilon$ (the electric power amount P1) is maintained to be small even if the position of the electric vehicle 32 is changed in steps S314 to S322, the controller 343c of the electric vehicle 32 determines that it is impossible to start charging a battery, and notifies the wireless power transmission device 31 of it. In this case, both of the electric vehicle 32 and the wireless power transmission device 31 are configured to stop operations thereof.

In addition, in the third embodiment, a case where an object to be supplied with electric power is an electric vehicle with a storage battery mounted thereon was described as an example. However, the present invention can be applied to a plug-in hybrid vehicle or to a transportation vehicle. Furthermore, the present invention can be applied to an unmanned vehicle.

In addition, in the third embodiment, a resistor is employed as the load device 317. However, if the load device 317 consumes small electric power (a few watts), an electronic load device may be used therefor. For example, the voltage of part of small electric power is converted using a converter, and the converted electric power may be used as auxiliary control power for various devices in the electric vehicle 32.

In addition, in the third embodiment, the electric vehicle 32 sends a positioning completion notification N to the wireless power transmission device 31, and the wireless power transmission device 31 switches from power receiving to power supplying when receiving the positioning completion notification N, but the present invention is not limited to this configuration. For example, even when the electric vehicle 32 does not send the positioning completion notification N, in the wireless power transmission device 31, the control part 322 may be configured to determine, based on the electric power amount P1, whether the positioning is finished, and be configured to switch from power receiving to power supplying.

Furthermore, an electric vehicle and a wireless power transmission device may be configured to be applied to any one of the first to third embodiments. For example, based on a predetermined condition, one of the amount of electric power (second received power value) received by the ground coil 316 and the amount of electric power (first received power value) received by the vehicle coil 334 may be alternatively used as a received power value which the controller 343c (command generation part) uses for the positioning of a vehicle.

Fourth Embodiment

Figure 13:
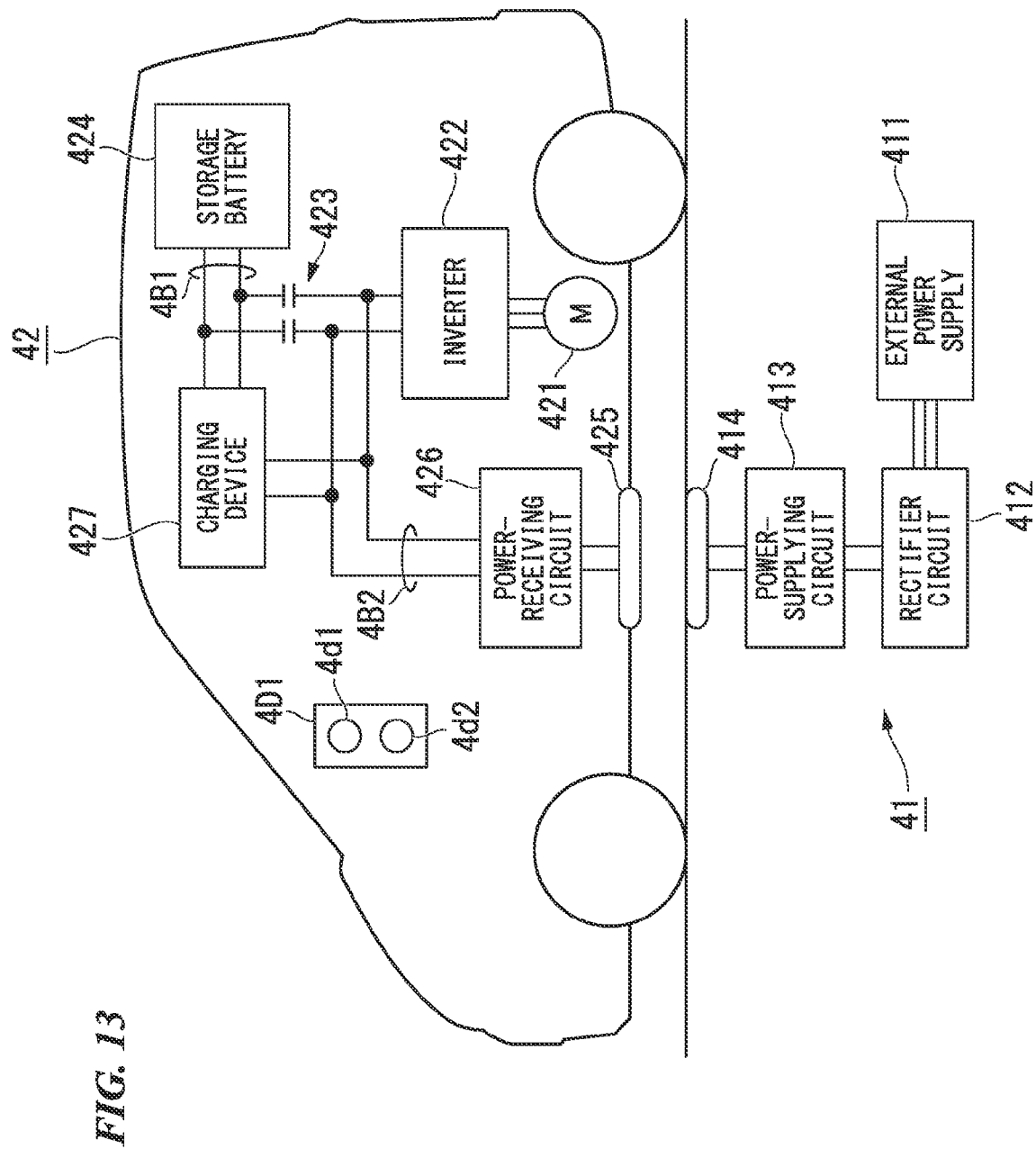
FIG. 13 is a block diagram showing main configurations of a vehicle and a wireless power transmission device according to a fourth embodiment of the present invention.

FIG. 13 is a block diagram showing main configurations of a vehicle and a wireless power transmission device according to a fourth embodiment of the present invention. As shown in FIG. 13, a wireless power transmission device 41 of this embodiment is installed in the ground. When an electric vehicle 42 as a vehicle traveling on the ground stops in a predetermined positional relationship (a positional relationship in which an electromagnetic coupling circuit described below is formed), the wireless power transmission device 41 can wirelessly transmit electric power (electric power to charge a storage battery 424) to the electric vehicle 42. The wireless power transmission device 41 includes an external power supply 411, a rectifier circuit 412, a power-supplying circuit 413, a power-transmitting coil 414 (primary coil), and the like.

The external power supply 411 is a power supply which supplies electric power required to generate electric power to be transmitted to the electric vehicle 42, and is a power supply which supplies, for example, three-phase AC power whose voltage is 200 V. In addition, the external power supply 411 is not limited to a three-phase AC power supply, and may be a power supply which supplies single-phase AC power such as a commercial AC power supply. The rectifier circuit 412 is a circuit which rectifies and converts AC power supplied from the external power supply 411, into DC power.

A DC power supply such as a fuel battery or a solar battery can be used for the external power supply 411. In this case, the rectifier circuit 412 can be omitted.

The power-supplying circuit 413 wirelessly supplies electric power to the electric vehicle 42 through an electromagnetic coupling circuit which is formed of the power-transmitting coil 414 and a power-receiving coil 425 provided in the electric vehicle 42, wherein the electric power is supplied from the rectifier circuit 412. Specifically, the power-supplying circuit 413 performs the wireless power supplying to the electric vehicle 42 by converting DC power from the rectifier circuit 412 into AC power and by supplying the AC power to the power-transmitting coil 414.

The power-transmitting coil 414 is installed in the ground and is a coil used to wirelessly supply AC power to the electric vehicle 42, wherein the AC power is supplied from the power-supplying circuit 413. The power-transmitting coil 414 and the power-receiving coil 425 provided in the electric vehicle 42 are disposed in adjacent positions to each other, and thereby the above-described electromagnetic coupling circuit is formed. The electromagnetic coupling circuit means a circuit in which the power-transmitting coil 414 and the power-receiving coil 425 are electromagnetically coupled together and the wireless power supplying from the power-transmitting coil 414 to the power-receiving coil 425 is performed. The electromagnetic coupling circuit may be either circuit, i.e., a circuit to supply electric power using "electromagnetic induction method" and a circuit to supply electric power using "electromagnetic field resonance method".

As shown in FIG. 13, the electric vehicle 42 as a vehicle includes a motor 421, an inverter 422, a contactor 423 (switching circuit), the storage battery 424, the power-receiving coil 425 (secondary coil), a power-receiving circuit 426, a charging device 427, a signal presentation unit 4D1 (command generation part, signal presentation part) and the like. The storage battery 424 and the charging device 427 among them are connected to a DC bus 4B1, and the inverter 422, the power-receiving circuit 426 and the charging device 427 are connected to a DC bus 4B2.

As a motive power source which produces motive power to move the electric vehicle 42, the motor 421 is mounted on the electric vehicle 42 and produces motive power depending on the drive of the inverter 422. For the motor 421, it is possible to use a motor such as a permanent magnet synchronous motor or an induction motor. The inverter 422 drives the motor 421 using electric power supplied from the storage battery 424 through the contactor 423, under the control of a controller 433 (omitted in FIG. 13, refer to FIG. 14).

The contactor 423 is provided between the DC bus 4B1 and the DC bus 4B2, and under the control of a control device (not shown) mounted on the electric vehicle 42, switches a connected state and a disconnected state between the DC bus 4B1 and the DC bus 4B2. Specifically, when the electric power of the storage battery 424 is discharged, the contactor 423 is controlled to make the DC bus 4B1 and the DC bus 4B2 the connected state, and thereby the storage battery 424 is connected to the inverter 422 and to the power-receiving circuit 426. In contrast, when the storage battery 424 is charged, the contactor 423 is controlled to make the DC bus 4B1 and the DC bus 4B2 the disconnected state, and thereby the storage battery 424 is disconnected from the inverter 422 and from the power-receiving circuit 426, and the motor 421 is electrically disconnected from the storage battery 424.

The storage battery 424 is a rechargeable battery (a secondary battery such as a lithium-ion battery or a nickel-hydrogen battery) which is mounted on the electric vehicle 42, and supplies electric power used to drive the motor 421.

The power-receiving coil 425 is provided in the bottom of the electric vehicle 42, and is a coil used to wirelessly receive electric power (AC power) supplied from the power-transmitting coil 414 provided in the wireless power transmission device 41. The power-receiving coil 425 approaches the power-transmitting coil 414 of the wireless power transmission device 41, and thereby the above-described electromagnetic coupling circuit is formed. That is, the power-receiving coil 425 is configured to be capable of performing wireless transmission of electric power between the power-receiving coil 425 and the power-transmitting coil 414 at the outside of the vehicle.

The power-receiving circuit 426 receives electric power (AC power) wirelessly supplied through the electromagnetic coupling circuit which is formed of the power-transmitting coil 414 of the wireless power transmission device 41 and the power-receiving coil 425, and converts the received electric power into DC power and supplies the DC power to the DC bus 4B2. The charging device 427 is a device which charges the storage battery 424 using electric power (DC power) supplied from the power-receiving circuit 426 through the DC bus 4B2.

In addition, the details of configurations and operations of the power-supplying circuit 413, the power-transmitting coil 414, the power-receiving coil 425, and the power-receiving circuit 426 are disclosed in, for example, Japanese Unexamined Patent Application, First Publication No. 2009-225551 ("POWER TRANSMISSION SYSTEM") or Japanese Unexamined Patent Application, First Publication No. 2008-236916 ("WIRELESS POWER TRANSMISSION DEVICE").

While the storage battery 424 mounted on the electric vehicle 42 is charged using the electric power from the wireless power transmission device 41, the signal presentation unit 4D1 presents, to a driver, a signal indicating a direction in which the electric vehicle 42 is to be moved, in order to perform positioning between the power-transmitting coil 414 of the wireless power transmission device 41 and the power-receiving coil 425 of the electric vehicle 42. Specifically, the signal presentation unit 4D1 includes a green lamp 4*d*1 and a red lamp 4*d*2, and presents a signal indicating a direction in which the electric vehicle 42 is to be moved, by lighting the green lamp 4*d*1 or the red lamp 4*d*2 based on the power transmission efficiency (described below) from the wireless power transmission device 41 to the electric vehicle 42. In other words, the signal presentation unit 4D1 is configured to generate, based on the above power transmission efficiency, a command to move the electric vehicle 42 in an appropriate direction, and is configured to present the command as a signal indicating the direction in which the electric vehicle 42 is to be moved.

For example, the signal presentation unit 4D1 lights the green lamp 4*d*1 when the electric vehicle 42 moves in a direction in which the power transmission efficiency rises, and lights the red lamp 4*d*2 when the electric vehicle 42 moves in a direction in which the power transmission efficiency drops. In addition, the signal presentation unit 4D1 may present a signal indicating the direction in which the electric vehicle 42 is to be moved, using light, or may present the signal using sound (for example, repetition of a short-duration sound).

Figure 14:
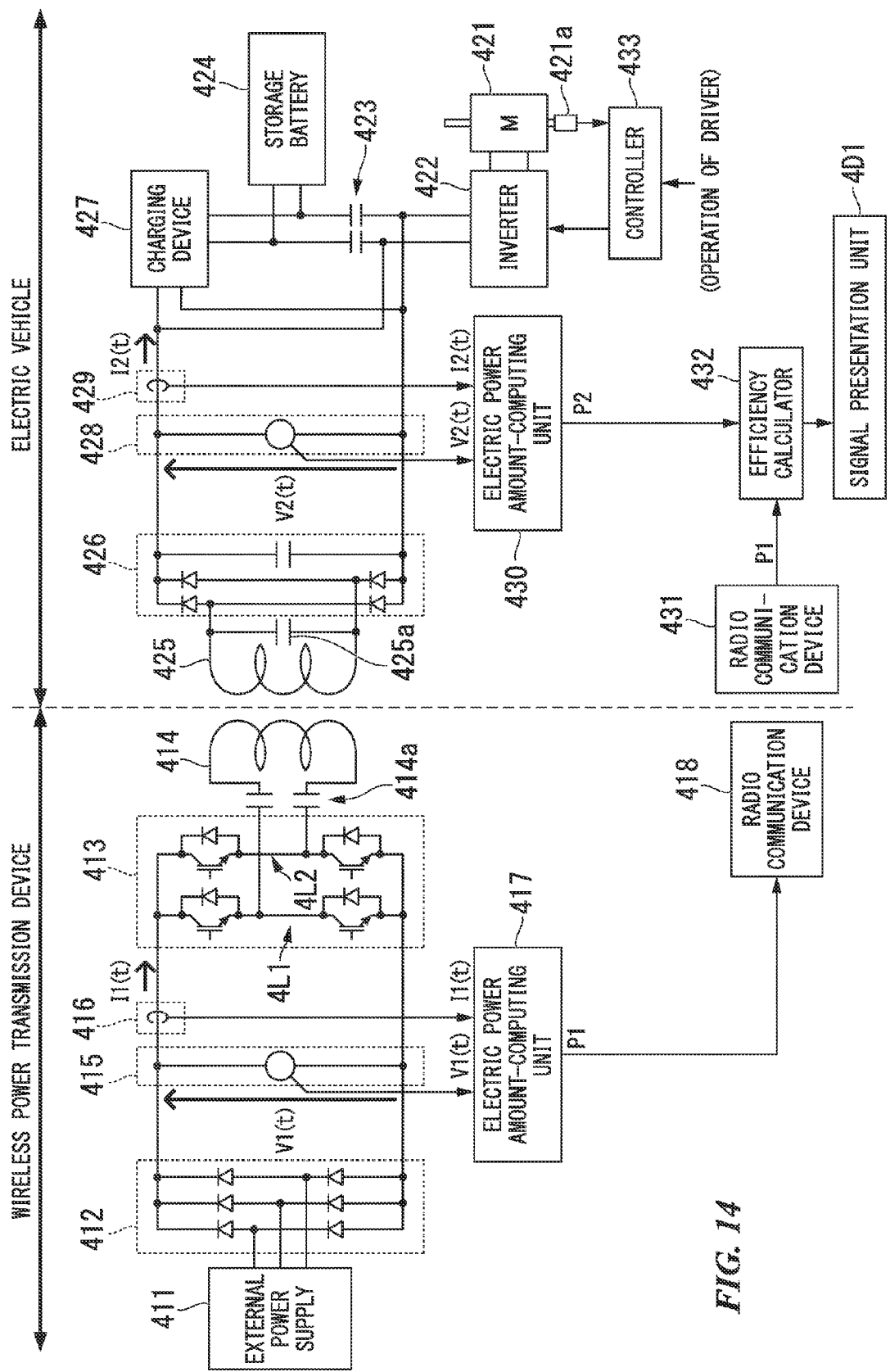
FIG. 14 is a diagram showing in detail electrical configurations of the vehicle and the wireless power transmission device according to the fourth embodiment of the present invention.

FIG. 14 is a diagram showing in detail electrical configurations of the vehicle and the wireless power transmission device according to the fourth embodiment of the present invention. Moreover, in FIG. 14, the same components as that shown in FIG. 13 are represented by the same reference signs. As shown in FIG. 14, the rectifier circuit 412 of the wireless power transmission device 41 is configured as a three-phase full-wave rectifier circuit (bridge rectifier circuit). In addition, the power-supplying circuit 413 of the wireless power transmission device 41 is configured as a circuit in which switching legs 4L1, 4L2 (each circuit composed of series-connected two transistors and a diode which is connected to each of the two transistors in parallel) are connected in parallel.

In addition, two capacitors 414a are provided between the power-supplying circuit 413 and the power-transmitting coil 414. The capacitors 414a together with the power-transmitting coil 414 form a series resonant circuit. One end of the power-transmitting coil 414 is connected to the switching leg 4L1 of the power-supplying circuit 413 through one capacitor 414a, and the other end of the power-transmitting coil 414 is connected to the switching leg 4L2 of the power-supplying circuit 413 through the other capacitor 414a.

The wireless power transmission device 41 includes a voltage measurement unit 415, a current measurement unit 416, an electric power amount-computing unit 417 (first power supply value-computing part) and a radio communication device 418 (first device output part) in addition to the above-described components from the external power supply 411 to the power-transmitting coil 414. The voltage measurement unit 415 and the current measurement unit 416 are provided between the rectifier circuit 412 and the power-supplying circuit 413, and measure an input voltage V1 (t) and an input current I1 (t) of the power-supplying circuit 413, respectively.

The electric power amount-computing unit 417 determines an electric power amount P1 (a first power supply value) of electric power supplied to the power-supplying circuit 413, using the input voltage V1 (t) measured by the voltage measurement unit 415 and the input current I1 (t) measured by the current measurement unit 416. Specifically, the electric power amount P1 is calculated by multiplying V1 (t) and I1 (t) together. In addition, if a loss of the power-supplying circuit 413 and the power-transmitting coil 414 is zero, the electric power amount P1 of electric power supplied to the power-supplying circuit 413 becomes equal to the amount of electric power (a power supply amount) supplied from the power-transmitting coil 414. The electric power amount P1 indicates the amount of electric power which the power-transmitting coil 414 supplies to the power-receiving coil 425.

The radio communication device 418 is capable of wirelessly communicating various pieces of information with a radio communication device 431 provided in the electric vehicle 42, and sends, for example, the information indicating the electric power amount P1 determined by the electric power amount-computing unit 417 to the radio communication device 431. In addition, the radio communication device 418 can communicate with the radio communication device 431 when the radio communication device 431 of the electric vehicle 42 is positioned in an area around the installation position of the radio communication device 418 in which the radius from the installation position is several meters.

In addition, as shown in FIG. 14, the power-receiving circuit 426 of the electric vehicle 42 is configured using a bridge rectifier circuit composed of four diodes and using a capacitor connected to the output terminals of the bridge rectifier circuit in parallel. Moreover, a capacitor 425a is connected between the power-receiving coil 425 and the power-receiving circuit 426 in parallel, and a rotation angle detector 421a such as a resolver or an encoder which detects a rotation angle of the motor 421 is attached to the motor 421.

The electric vehicle 42 includes a voltage measurement unit 428, a current measurement unit 429, an electric power amount-computing unit 430 (first received power value-computing part), the radio communication device 431 (first vehicle input part), an efficiency calculator 432 (first efficiency calculation part) and the controller 433 in addition to the above-described components from the motor 421 to the charging device 427 and the signal presentation unit 4D1. The voltage measurement unit 428 and the current measurement unit 429 are provided between the power-receiving circuit 426 and the charging device 427 (at the DC bus 4B2 shown in FIG. 13), and measure an output voltage V2 (t) and an output current I2 (t) of the power-receiving circuit 426, respectively.

The electric power amount-computing unit 430 determines an electric power amount P2 (a first received power value) of electric power received by the power-receiving circuit 426, using the output voltage V2 (t) measured by the voltage measurement unit 428 and the output current I2 (t) measured by the current measurement unit 429. Specifically, the electric power amount P2 is calculated by multiplying V2 (t) and I2 (t) together. In addition, if a loss of the power-receiving coil 425 and the power-receiving circuit 426 is zero, the electric power amount P2 of electric power received by the power-receiving circuit 426 becomes equal to the amount of electric power (a received power amount) received by the power-receiving coil 425. The electric power amount P2 indicates the amount of electric power which the power-receiving coil 425 has received from the power-transmitting coil 414.

The radio communication device 431 is capable of wirelessly communicating various pieces of information with the radio communication device 418 provided in the wireless power transmission device 41, and receives, for example, the information indicating the electric power amount P1 to be sent from the radio communication device 418. In addition, the radio communication device 431 can communicate with the radio communication device 418 when the radio communication device 418 of the wireless power transmission device 41 is positioned in an area around the radio communication device 431 in which the radius from the radio communication device 431 is several meters.

The efficiency calculator 432 calculates the power transmission efficiency $\epsilon$ from the wireless power transmission device 41 to the electric vehicle 42 based on the information indicating the electric power amount P2 determined by the electric power amount-computing unit 430 and on the information indicating the electric power amount P1 received by the radio communication device 431. Specifically, the power transmission efficiency $\epsilon$ is calculated by dividing the electric power amount P2 by the electric power amount P1. The controller 433 outputs a torque command value to the inverter 422 while monitoring detection results of the rotation angle detector 421a, based on a rotation angle command value of the motor 421 depending on operations (driving operations) of the driver.

The motor 421 rotates a tire whose radius is known, through a speed reducer (not shown) whose speed reduction ratio is known, and thus the relationship between the rotation angle of the motor 421 and the amount of movement of the electric vehicle 42 is fixed.

Specifically, if the radius of the tire is represented by r and the speed reduction ratio of the speed reducer is represented by n, the electric vehicle 42 moves a distance ($2\pi r/n$) when the motor makes one rotation. Therefore, by controlling the rotation angle of the motor 421, the amount of movement of the electric vehicle 42 can be controlled.

Next, operations of the wireless power transmission device 41 and the electric vehicle 42 having the above-described configurations are described. In addition, hereinafter, operations in which the storage battery 424 mounted on the electric vehicle 42 is charged using electric power supplied from the wireless power transmission device 41 are mainly described.

First, a user drives the electric vehicle 42, and moves and stops the electric vehicle 42 at the installation position of the wireless power transmission device 41 or at the vicinity thereof. Then, the wireless power transmission device 41 determines whether the electric vehicle 42 is positioned in a power-transmitting area. For example, based on whether the radio communication device 418 of the wireless power transmission device 41 can wirelessly communicate with the radio communication device 431 of the electric vehicle 42, it is determined whether the electric vehicle 42 is in the power-transmitting area.

When it is determined that the electric vehicle 42 is positioned in the power-transmitting area, the wireless power transmission device 41 operates the power-supplying circuit 413, thereby starting the transmission of electric power. In addition, when the electric vehicle 42 is positioned in the power-transmitting area, an electromagnetic coupling circuit is formed of the power-transmitting coil 414 of the wireless power transmission device 41 and the power-receiving coil 425 of the electric vehicle 42.

When the user gives charging instructions to the electric vehicle 42 after the user moves and stops the electric vehicle 42 at the installation position of the wireless power transmission device 41 or at the vicinity thereof, at first, the control device (not shown) mounted on the electric vehicle 42 controls the contactor 423, thereby making the DC bus 4B1 and the DC bus 4B2 the disconnected state. In addition, the control device controls the power-receiving circuit 426, thereby starting the operation thereof, and controls the charging device 427, thereby stopping the operation thereof.

When the power transmission from the wireless power transmission device 41 is not performed, the output current I2 (t) is not measured by the current measurement unit 429, and the electric power amount P2 determined by the electric power amount-computing unit 430 is zero.

Therefore, the power transmission efficiency $\epsilon$ calculated by the efficiency calculator 432 is also zero, and none of the green lamp 4d1 and the red lamp 4d2 provided in the signal presentation unit 4D1 is lit.

In contrast, when the power transmission from the wireless power transmission device 41 is performed, the output current I2 (t) is measured by the current measurement unit 429, and the electric power amount P2 based on the measured output current I2 (t) is determined by the electric power amount-computing unit 430. Moreover, while the wireless power transmission device 41 performs the power transmission, the electric power amount P1 of electric power supplied by the power-supplying circuit 413 is always determined by the electric power amount-computing unit 417, and the information indicating the electric power amount P1 is sent from the radio communication device 418.

The information indicating the electric power amount P2 determined by the electric power amount-computing unit 430 and the information indicating the electric power amount P1 received by the radio communication device 431 are input into the efficiency calculator 432, and the efficiency calculator 432 calculates the power transmission efficiency $\epsilon$ from the wireless power transmission device 41 to the electric vehicle 42 using the electric power amounts P1 and P2. The power transmission efficiency $\epsilon$ calculated by the efficiency calculator 432 is input into the signal presentation unit 4D1, and the signal presentation unit 4D1 determines, every a certain period (e.g., 1/10 sec), whether the power transmission efficiency rises.

When the user sets a selector to D-range and operates an accelerator, the electric power transmitted from the wireless power transmission device 41 is used as electric power to drive the motor 421, and the electric vehicle 42 slowly moves forward. When it is determined that the power transmission efficiency $\epsilon$ rose due to the forward movement of the electric vehicle 42, the signal presentation unit 4D1 lights the green lamp 4d1 and prompts the driver of the electric vehicle 42 to continue the movement (forward movement).

In contrast, when it is determined that the power transmission efficiency $\epsilon$ maintains a fixed value or dropped due to the forward movement of the electric vehicle 42, the signal presentation unit 4D1 lights the red lamp 4d2 and prompts the driver of the electric vehicle 42 to stop the vehicle or to change the moving direction (moving backward). Since the power transmission efficiency $\epsilon$ is maximized at the time the signal presentation unit 4D1 switches to the lighting of the red lamp 4d2 after the green lamp 4d1 lights once, the driver stops the electric vehicle 42 at this time. At the time of this stop, the relative position of the power-receiving coil 425 with respect to the power-transmitting coil 414 is adjusted to the position suitable for the wireless transmission of electric power.

When the electric vehicle 42 is stopped, the control device (not shown) controls the charging device 427, thereby starting the operation thereof, and controls the inverter 422, thereby stopping the operation thereof. Thereby, the control device starts charging the storage battery 424. Specifically, the AC power from the wireless power transmission device 41 is wirelessly transmitted to the electric vehicle 42 through the electromagnetic coupling circuit formed of the power-transmitting coil 414 and of the power-receiving coil 425, and is received by the power-receiving circuit 426. The AC power received by the power-receiving circuit 426 is converted into DC power, and the DC power after the conversion is supplied to the charging device 427. Thus, the charge to the storage battery 424 using the direct current is performed by the charging device 427. When the storage battery 424 becomes the fully charged state through the charge by the charging device 427, the control device (not shown) stops the charging device 427, thereby stopping charging the storage battery 424.

After starting the transmission of electric power, the wireless power transmission device 41 determines whether the charge to the storage battery 424 mounted on the electric vehicle 42 is finished. For example, it is determined whether a signal indicating the charge completion of the storage battery 424 has been sent from the radio communication device 431 of the electric vehicle 42. When determining that the charge is finished, the wireless power transmission device 41 stops the power-supplying circuit 413, thereby stopping the electric power transmission.

As described above, in this embodiment, the power transmission efficiency $\epsilon$ from the wireless power transmission device 41 to the electric vehicle 42 is determined, and the signal presentation unit 4D1 presents, based on the power transmission efficiency $\epsilon$, a signal indicating a direction in which the electric vehicle 42 is to be moved, to the driver. Accordingly, the position of the vehicle can be precisely adjusted through the operation of the driver even if electric vehicles 42 vary in size or in the attachment position of the power-receiving coil 425, and thus electric power can be efficiently transmitted. In addition, a mechanism used to individually move the power-transmitting coil 414 or the power-receiving coil 425, a secondary coil used to sense a position or the like is unnecessary, and thus the increase in size, the complicated structure, or the increase in cost is not caused.

In addition, in this embodiment, the power transmission efficiency $\epsilon$ from the wireless power transmission device 41 to the electric vehicle 42 is determined based on the electric power amount P1 of electric power supplied to the power-supplying circuit 413 of the wireless power transmission device 41 and on the electric power amount P2 of electric power received by the power-receiving circuit 426 of the electric vehicle 42. The power transmission efficiency $\epsilon$ is not only the power transmission efficiency between the power-transmitting coil 414 and the power-receiving coil 425, but is the power transmission efficiency in a state including the power-supplying circuit 413 and the power-receiving circuit 426, and is approximately the same as the actual power transmission efficiency. Therefore, the position between the power-transmitting coil 414 of the wireless power transmission device 41 and the power-receiving coil 425 of the electric vehicle 42 can be adjusted to a more appropriate position so that the actual power transmission efficiency is maximized.

Furthermore, in this embodiment, when the positioning between the power-transmitting coil 414 of the wireless power transmission device 41 and the power-receiving coil 425 of the electric vehicle 42 is performed by moving the electric vehicle 42 backward and forward, the electric power transmitted from the wireless power transmission device 41 is used as electric power to drive the motor 421. Therefore, even if the residual charge level of the storage battery 424 is zero, the above positioning can be performed.

Fifth Embodiment

Figure 19:
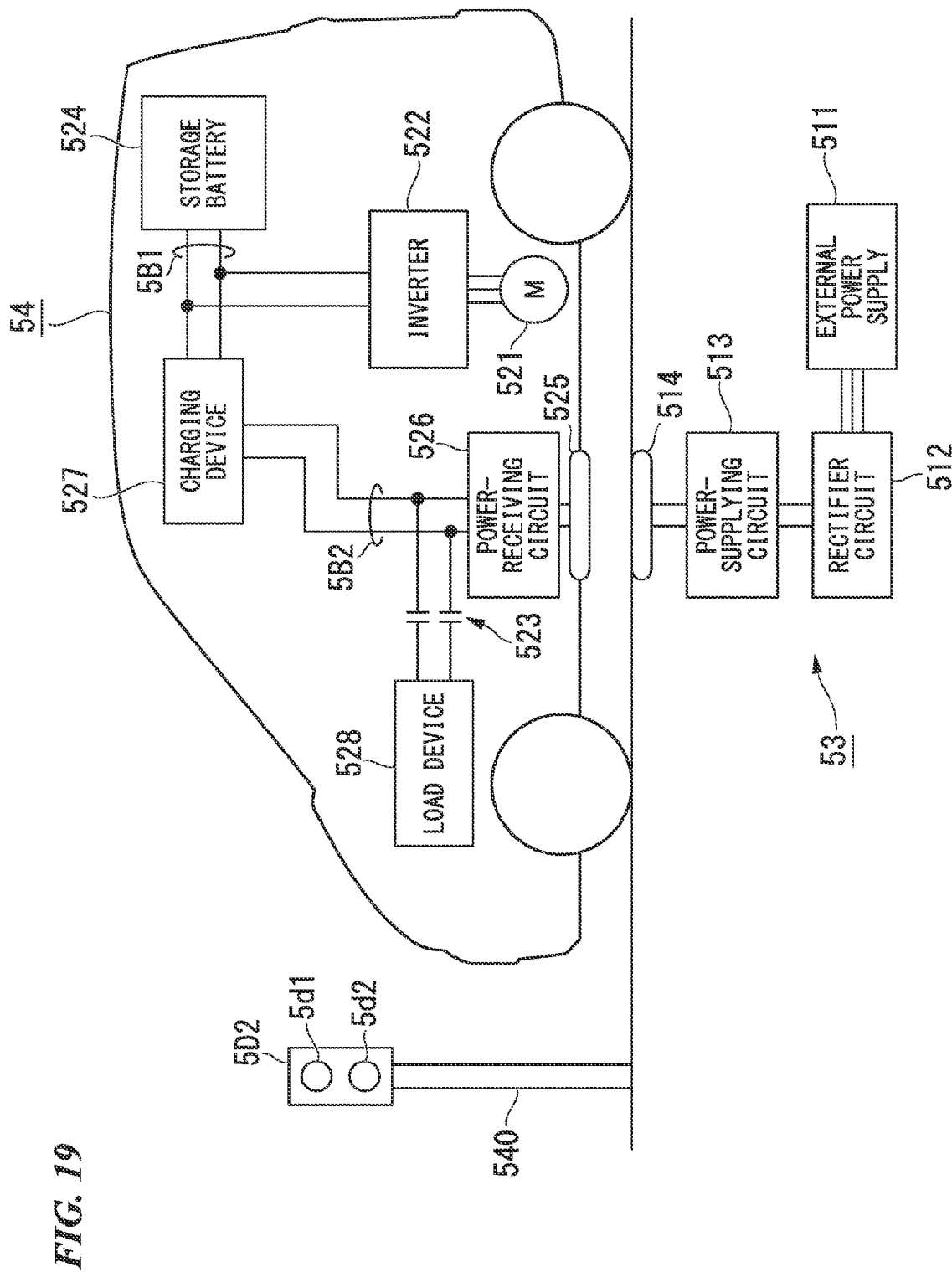
FIG. 19 is a block diagram showing main configurations of a vehicle and a wireless power transmission device according to a seventh embodiment of the present invention.
Figure 20:
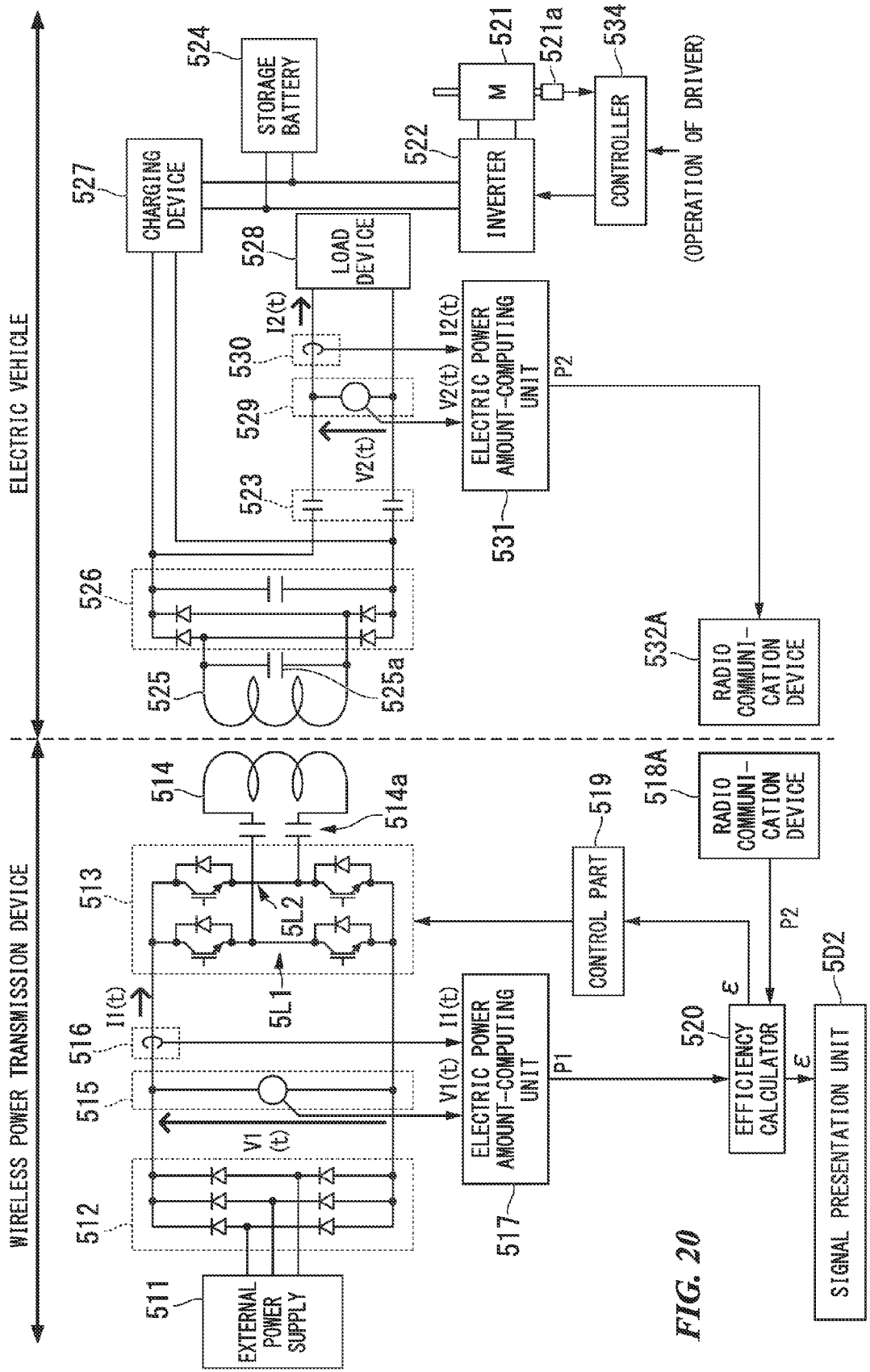
FIG. 20 is a diagram showing in detail electrical configurations of the vehicle and the wireless power transmission device according to the seventh embodiment of the present invention.

FIG. 19 is a block diagram showing main configurations of a vehicle and a wireless power transmission device according to a fifth embodiment of the present invention. FIG. 20 is a diagram showing in detail electrical configurations of the vehicle and the wireless power transmission device according to the fifth embodiment of the present invention. In the above-described sixth embodiment, a signal presentation unit used to present a signal indicating a direction in which an electric vehicle is to be moved is provided in the electric vehicle. On the other hand, in this embodiment, the signal presentation unit is provided at the outside of an electric vehicle (in a wireless power transmission device).

Figure 15:
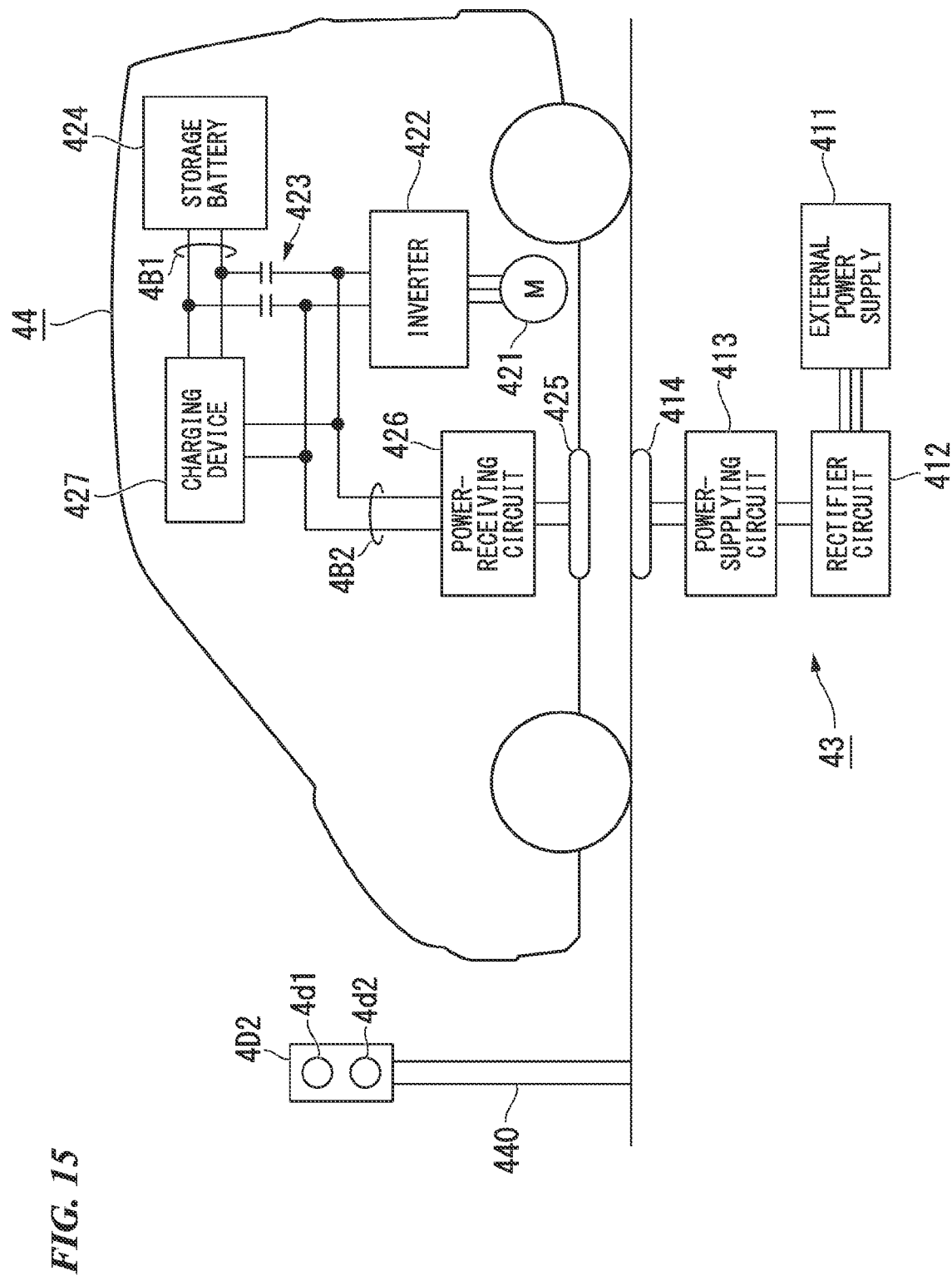
FIG. 15 is a block diagram showing main configurations of a vehicle and a wireless power transmission device according to a fifth embodiment of the present invention.
Figure 16:
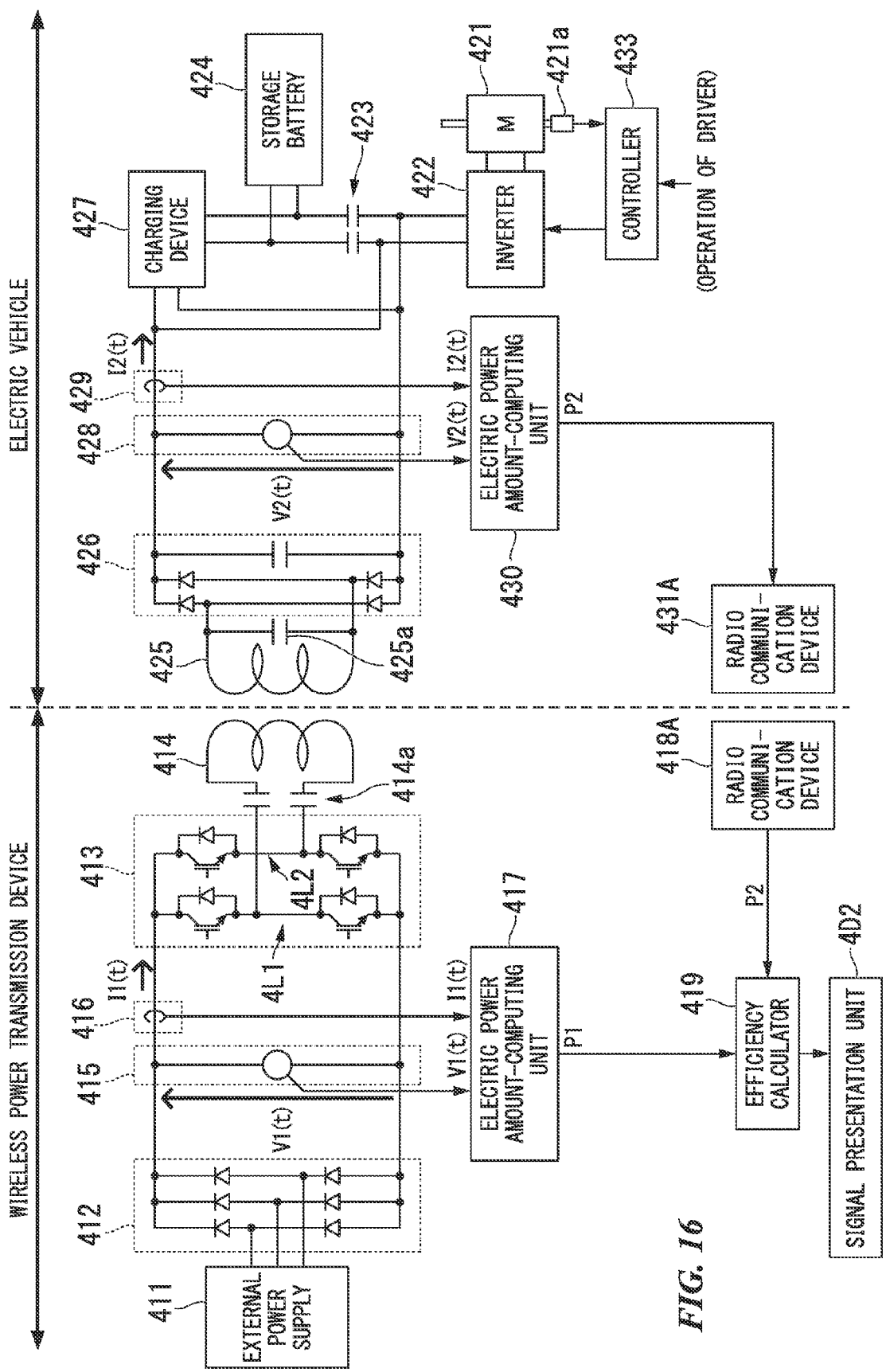
FIG. 16 is a diagram showing in detail electrical configurations of the vehicle and the wireless power transmission device according to the fifth embodiment of the present invention.

That is, as shown in FIGS. 15 and 16, a wireless power transmission device 43 of this embodiment has a configuration in which a radio communication device 418A (second device input part), an efficiency calculator 419 (third efficiency calculation part) and a signal presentation unit 4D2 (signal presentation part) are added to the components from the external power supply 411 to the electric power amount-computing unit 417 which the wireless power transmission device 41 shown in FIGS. 13 and 14 includes. In addition, an electric vehicle 44 of this embodiment has a configuration in which the efficiency calculator 432 and the signal presentation unit 4D1 which the electric vehicle 42 shown in FIGS. 13 and 14 includes are omitted, and a radio communication device 431A (second vehicle output part) is used instead of the radio communication device 431. Moreover, the radio communication device 418A of the wireless power transmission device 43 receives the information indicating the electric power amount P2 to be sent from the radio communication device 431A of the electric vehicle 44, and the radio communication device 431A of the electric vehicle 44 sends the information indicating the electric power amount P2.

The efficiency calculator 419 calculates a power transmission efficiency ε from the wireless power transmission device 43 to the electric vehicle 44 based on the information indicating the electric power amount P1 determined by the electric power amount-computing unit 417 and on the information indicating the electric power amount P2 received by the radio communication device 418A. Specifically, the power transmission efficiency ε is calculated by dividing the electric power amount P2 by the electric power amount P1. The signal presentation unit 4D2 has a configuration similar to the signal presentation unit 4D1, and is mounted on, for example, a pole 440 in a state where waterproofing or the like is applied thereto.

In the wireless power transmission device 43 and the electric vehicle 44 having the above-described configurations, the power transmission efficiency ε from the wireless power transmission device 43 to the electric vehicle 44 is calculated in the wireless power transmission device 43, and a green lamp 4d1 or a red lamp 4d2 provided in the signal presentation unit 4D2 is lit based on the calculation result of the power transmission efficiency ε. Since the operation during the positioning of the electric vehicle 44 and the operation during the charge to the storage battery 424 mounted on the electric vehicle 44 are similar to that of the above-described sixth embodiment, its description is omitted.

As described above, in this embodiment, the power transmission efficiency ε from the wireless power transmission device 43 to the electric vehicle 44 is determined, and the signal presentation unit 4D2 presents, based on the power transmission efficiency ε, a signal indicating a direction in which the electric vehicle 44 is to be moved, to a driver. Accordingly, the position of the vehicle can be precisely adjusted through the operation of the driver even if electric vehicles 44 vary in size or in the attachment position of the power-receiving coil 425, and electric power can be efficiently transmitted. In addition, a mechanism used to individually move the power-transmitting coil 414 or the power-receiving coil 425, a secondary coil used to sense a position or the like is unnecessary, and thus the increase in size, the complicated structure, or the increase in cost is not caused.

In addition, in this embodiment, the power transmission efficiency ε from the wireless power transmission device 43 to the electric vehicle 44 is also determined based on the electric power amount P1 of electric power supplied to the power-supplying circuit 413 of the wireless power transmission device 43 and on the electric power amount P2 of electric power received by the power-receiving circuit 426 of the electric vehicle 44. The power transmission efficiency ε is not only the power transmission efficiency between the power-transmitting coil 414 and the power-receiving coil 425, but is the power transmission efficiency in a state including the power-supplying circuit 413 and the power-receiving circuit 426, and is approximately the same as the actual power transmission efficiency. Therefore, the position between the power-transmitting coil 414 of the wireless power transmission device 43 and the power-receiving coil 425 of the electric vehicle 44 can be adjusted to a more appropriate position so that the actual power transmission efficiency is maximized.

Furthermore, in this embodiment, when the positioning between the power-transmitting coil 414 of the wireless power transmission device 43 and the power-receiving coil 425 of the electric vehicle 44 is performed by moving the electric vehicle 44 backward and forward, the electric power transmitted from the wireless power transmission device 43 is used as electric power to drive the motor 421. Therefore, even if the residual charge level of the storage battery 424 is zero, the above positioning can be performed.

Hereinbefore, a vehicle and a wireless power transmission device according to the embodiments of the present invention were described. However, the present invention is not limited to the above-described fourth or fifth embodiment, and modifications can be freely adopted within the scope of the present invention. For example, in the fourth or fifth embodiment, a signal indicating a direction in which the vehicle is to be moved is presented based on the power transmission efficiency ε from the wireless power transmission device 41 or 43 to the electric vehicle 42 or 44. However, a signal indicating a direction in which the vehicle is to be moved may be presented based on the electric power amount P2 (the electric power received by the power-receiving circuit 426) determined by the electric power amount-computing unit 430 instead of the power transmission efficiency $\epsilon$. That is, the signal presentation unit 4D1 or 4D2 may be configured to present a signal indicating a direction in which the electric vehicle 42 or 44 is to be moved, using the electric power amount P2 determined by the electric power amount-computing unit 430.

The wireless power transmission device 41 or 43 and the power-transmitting coil 414 may not be installed to be strictly flush with the ground. For example, they may be buried in the ground so that the efficiency of wireless power transmission is not remarkably decreased, and may be installed to be lower than the ground. In addition, they may be projected so that the traveling of the electric vehicle 42 or 44 is not remarkably disturbed, and may be installed to be higher than the ground.

In addition, in the fourth or fifth embodiment, a case where the positioning is performed by moving the electric vehicle 42 or 44 backward and forward was described as an example. However, if a vehicle can linearly move rightward and leftward, the positioning can be performed by moving the vehicle rightward and leftward. Moreover, in general, a vehicle can move only backward and forward if a steering is not operated, and cannot linearly move rightward and leftward. Accordingly, it is desirable to use a power-transmitting coil which does not cause an excessive drop of the transmission efficiency even if a position shift in the right-and-left direction occurs.

Therefore, the power-transmitting coil 414 of the wireless power transmission device 41 or 43 may be arranged in a configuration similar to the power-transmitting coil 114 in FIG. 4 of the above-described first embodiment.

In addition, when the wireless power transmission device 41 or 43 is installed in a place where the movement of the electric vehicle 42 or 44 is limited to one-way (for example, a place where the movement is limited only to forward movement), the electric vehicle 42 or 44 is stopped immediately after the electric vehicle 42 or 44 entered a power-transmitting area. That is, the electric vehicle 42 is stopped so that the power-receiving coil 425 is disposed near the periphery of the power-transmitting area. In this way, the power transmission efficiency $\epsilon$ gradually rises as the electric vehicle 42 or 44 moves forward, and thus it is possible to prevent the electric vehicle 42 or 44 form moving backward.

In addition, when the power transmission efficiency $\epsilon$ remarkably decreases during the positioning, in the sixth embodiment, it is desirable to prompt the driver to stop the vehicle by lighting the red lamp 4d2 of the signal presentation unit 4D1, and is desirable to stop the transmission of electric power by notifying the wireless power transmission device 41 through the radio communication devices 431 and 418 that the power transmission efficiency $\epsilon$ remarkably decreases. Moreover, in the fifth embodiment, it is desirable to prompt the driver to stop the vehicle by lighting the red lamp 4d2 of the signal presentation unit 4D2, and is desirable to let the wireless power transmission device 43 stop the transmission of electric power. In this way, it is possible to prevent unexpected trouble which occurs during the positioning.

In addition, the signal presentation unit 4D1 or 4D2 may be provided at each of several positions, the same signal may be presented thereon. For example, in the fifth embodiment, in a case where the signal presentation units 4D2 which present the same signal are provided in the back side and the front side of the position at which the electric vehicle 44 is to be stopped, the driver can easily recognize the signal.

Moreover, in the fourth or fifth embodiment, a case where an object to be supplied with electric power is an electric vehicle with a storage battery mounted thereon was described as an example. However, the present invention can be applied to a plug-in hybrid vehicle or to a transportation vehicle. Furthermore, the present invention can be applied to an unmanned vehicle.

Furthermore, an electric vehicle and a wireless power transmission device may be configured to be applied to any one of the first to fifth embodiments. For example, based on a predetermined condition, a case where the positioning of a vehicle is automatically performed as shown in the first to third embodiments and a case where a driver performs the positioning of a vehicle as shown in the fourth and fifth embodiments may be alternately switched.

Sixth Embodiment

Figure 17:
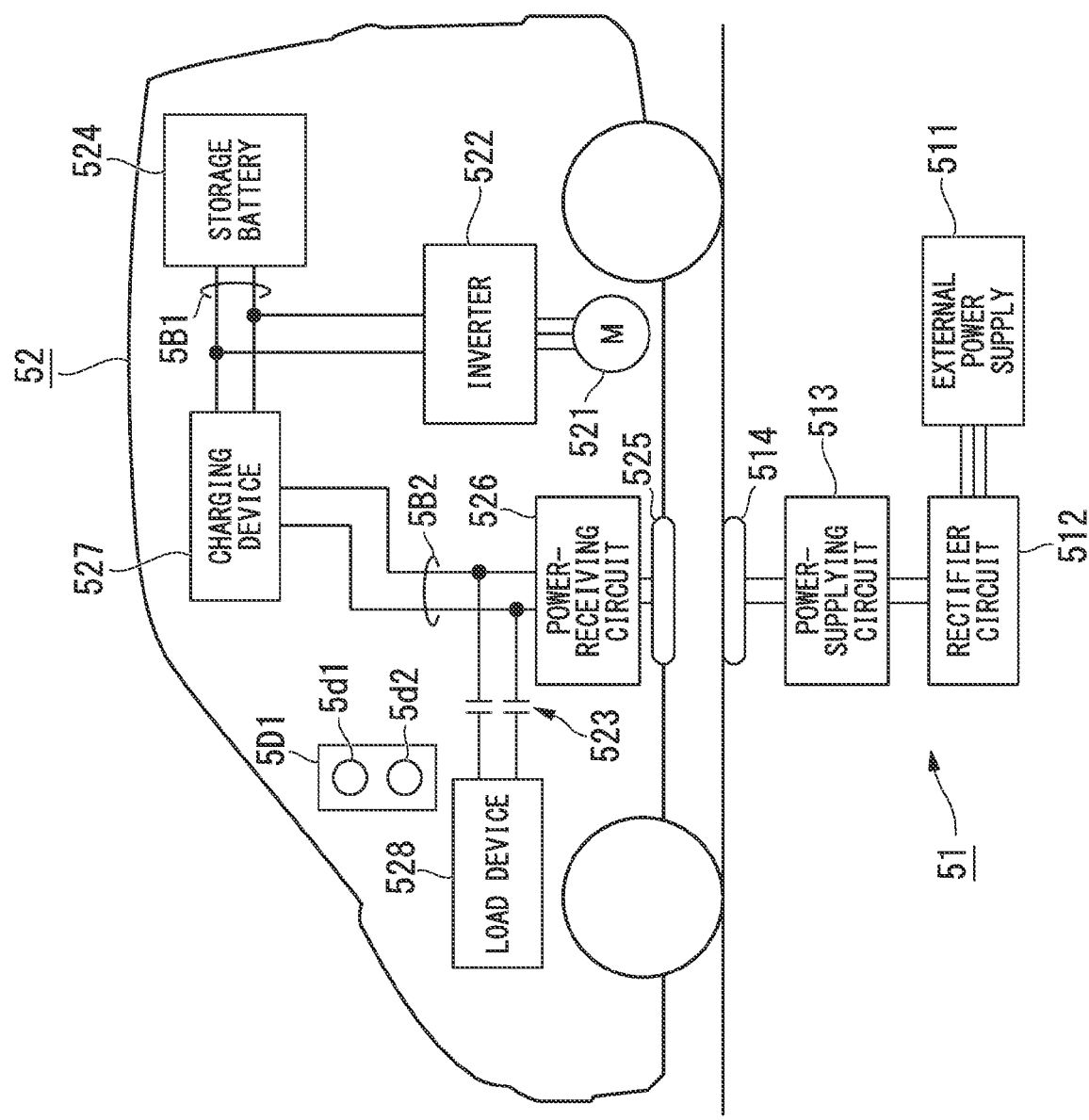
FIG. 17 is a block diagram showing main configurations of a vehicle and a wireless power transmission device according to a sixth embodiment of the present invention.

FIG. 17 is a block diagram showing main configurations of a vehicle and a wireless power transmission device according to the sixth embodiment of the present invention. As shown in FIG. 17, a wireless power transmission device 51 of this embodiment is installed in the ground. When an electric vehicle 52 as a vehicle traveling on the ground stops in a predetermined positional relationship (positional relationship in which an electromagnetic coupling circuit described below is formed), the wireless power transmission device 51 can wirelessly transmit electric power (electric power to charge a storage battery 524) to the electric vehicle 52. The wireless power transmission device 51 includes an external power supply 511, a rectifier circuit 512, a power-supplying circuit 513, a power-transmitting coil 514 (primary coil) and the like.

The external power supply 511 is a power supply which supplies electric power required to generate electric power to be transmitted to the electric vehicle 52, and is a power supply which supplies, for example, three-phase AC power whose voltage is 200 V. In addition, the external power supply 511 is not limited to a three-phase AC power supply, and may be a power supply which supplies single-phase AC power such as a commercial AC power supply. The rectifier circuit 512 is a circuit which rectifies and converts AC power supplied from the external power supply 511, into DC power.

A DC power supply such as a fuel battery or a solar battery can be used for the external power supply 511. In this case, the rectifier circuit 512 can be omitted.

The power-supplying circuit 513 converts DC power into AC power, wherein the DC power is supplied from the rectifier circuit 512. In addition, the power-supplying circuit 513 wirelessly supplies the AC power to the electric vehicle 52 through an electromagnetic coupling circuit which is formed of the power-transmitting coil 514 and a power-receiving coil 525 provided in the electric vehicle 52. Specifically, the power-supplying circuit 513 performs the wireless power supplying to the electric vehicle 52 by converting DC power from the rectifier circuit 512 into AC power and by supplying the AC power to the power-transmitting coil 514.

The power-transmitting coil 514 is installed in the ground and is a coil used to wirelessly supply AC power to the electric vehicle 52, wherein the AC power is supplied from the power-supplying circuit 513. The power-transmitting coil 514 and the power-receiving coil 525 provided in the electric vehicle 52 are disposed in adjacent positions to each other, and thereby the above-described electromagnetic coupling circuit is formed. The electromagnetic coupling circuit means a circuit in which the power-transmitting coil 514 and the power-receiving coil 525 are electromagnetically coupled together and the wireless power supplying from the power-transmitting coil 514 to the power-receiving coil 525 is performed. The electromagnetic coupling circuit may be either circuit, i.e., a circuit to supply electric power using "electromagnetic induction method" and a circuit to supply electric power using "electromagnetic field resonance method".

As shown in FIG. 17, the electric vehicle 52 as a vehicle includes a motor 521, an inverter 522, a contactor 523, the storage battery 524, the power-receiving coil 525 (secondary coil), a power-receiving circuit 526, a charging device 527, a load device 528 (first load device), a signal presentation unit 5D1 (command generation part, signal presentation part) and the like. In addition, the electric vehicle 52 has functions to assist a driver in adjusting the position of the power-receiving coil 525 with respect to the power-transmitting coil 514 of the wireless power transmission device 51. The inverter 522, the storage battery 524 and the charging device 527 among the above components are connected to a DC bus 5B1, and the contactor 523, the power-receiving circuit 526 and the charging device 527 are connected to a DC bus 5B2. Moreover, the contactor 523 and the charging device 527 compose a power-supplying destination-setting device of this embodiment.

As a motive power source which produces motive power to move the electric vehicle 52, the motor 521 is mounted on the electric vehicle 52 and produces motive power depending on the drive of the inverter 522. For the motor 521, it is possible to use a motor such as a permanent magnet synchronous motor or an induction motor. The inverter 522 drives the motor 521 using electric power supplied from the storage battery 524, under the control of a controller 534 (omitted in FIG. 17, refer to FIG. 18).

The contactor 523 is provided between the load device 528 and the DC bus 5B2, that is, between the power-receiving circuit 526 and the load device 528, and under the control of the controller 534, switches a connected state and a disconnected state between the power-receiving circuit 526 and the load device 528. Specifically, the contactor 523 becomes a closed state in order to connect the power-receiving circuit 526 and the load device 528 to each other during rising of the power transmission efficiency (described below) from the wireless power transmission device 51 to the electric vehicle 52, that is, during positioning of the power-receiving coil 525 with respect to the power-transmitting coil 514, and becomes an opened state in order to disconnect the power-receiving circuit 526 and the load device 528 from each other when the power transmission efficiency changes from rising into a fixed value or into dropping, that is, after the positioning is finished.

The storage battery 524 is a rechargeable battery (e.g., a secondary battery such as a lithium-ion battery or a nickel-hydrogen battery) which is mounted on the electric vehicle 52, and supplies electric power used to drive the motor 521.

The power-receiving coil 525 is provided in the bottom of the electric vehicle 52, and is a coil used to wirelessly receive electric power (AC power) supplied from the power-transmitting coil 514 provided in the wireless power transmission device 51. The power-receiving coil 525 approaches the power-transmitting coil 514 of the wireless power transmission device 51, and thereby the above-described electromagnetic coupling circuit is formed. That is, the power-receiving coil 525 is configured to be capable of performing wireless transmission of electric power between the power-receiving coil 525 and the power-transmitting coil 514 at the outside of the vehicle.

The power-receiving circuit 526 receives electric power (AC power) wirelessly supplied through the electromagnetic coupling circuit which is formed of the power-transmitting coil 514 of the wireless power transmission device 51 and the power-receiving coil 525, and converts the received electric power into DC power and supplies the DC power to the DC bus 5B2. The charging device 527 is a device which charges the storage battery 524 using electric power (DC power) supplied from the power-receiving circuit 526 through the DC bus 5B2. The load device 528 is connected to the DC bus 5B2 through the contactor 523. The load device 528 described above is, for example, a resistor having a predetermined resistance value, and consumes DC power supplied from the power-receiving circuit 526 when the load device 528 is connected to the power-receiving circuit 526 through the contactor 523.

In addition, the details of configurations and operations of the power-supplying circuit 513, the power-transmitting coil 514, the power-receiving coil 525, and the power-receiving circuit 526 are disclosed in, for example, Japanese Unexamined Patent Application, First Publication No. 2009-225551 ("POWER TRANSMISSION SYSTEM") or Japanese Unexamined Patent Application, First Publication No. 2008-236916 ("WIRELESS POWER TRANSMISSION DEVICE").

While the storage battery 524 mounted on the electric vehicle 52 is charged using the electric power from the wireless power transmission device 51, the signal presentation unit 5D1 presents, to the driver, a signal indicating a direction in which the electric vehicle 52 is to be moved, in order to perform positioning between the power-transmitting coil 514 of the wireless power transmission device 51 and the power-receiving coil 525 of the electric vehicle 52. Specifically, the signal presentation unit 5D1 includes a green lamp 5d1 and a red lamp 5d2, and presents a signal indicating a direction in which the electric vehicle 52 is to be moved, by lighting the green lamp 5d1 or the red lamp 5d2 based on the power transmission efficiency (described below) from the wireless power transmission device 51 to the electric vehicle 52. In other words, the signal presentation unit 5D1 is configured to generate, based on the above power transmission efficiency, a command to move the electric vehicle 52 in an appropriate direction, and is configured to present the command as a signal indicating a direction in which the electric vehicle 52 is to be moved.

For example, the signal presentation unit 5D1 lights the green lamp 5d1 when the electric vehicle 52 is moving in a direction in which the power transmission efficiency rises, and lights the red lamp 5d2 when the electric vehicle 52 is moving in a direction in which the power transmission efficiency drops. In addition, the signal presentation unit 5D1 may present a signal indicating the direction in which the electric vehicle 52 is to be moved, using light, or using sound (for example, repetition of a short-duration sound).

Figure 18:
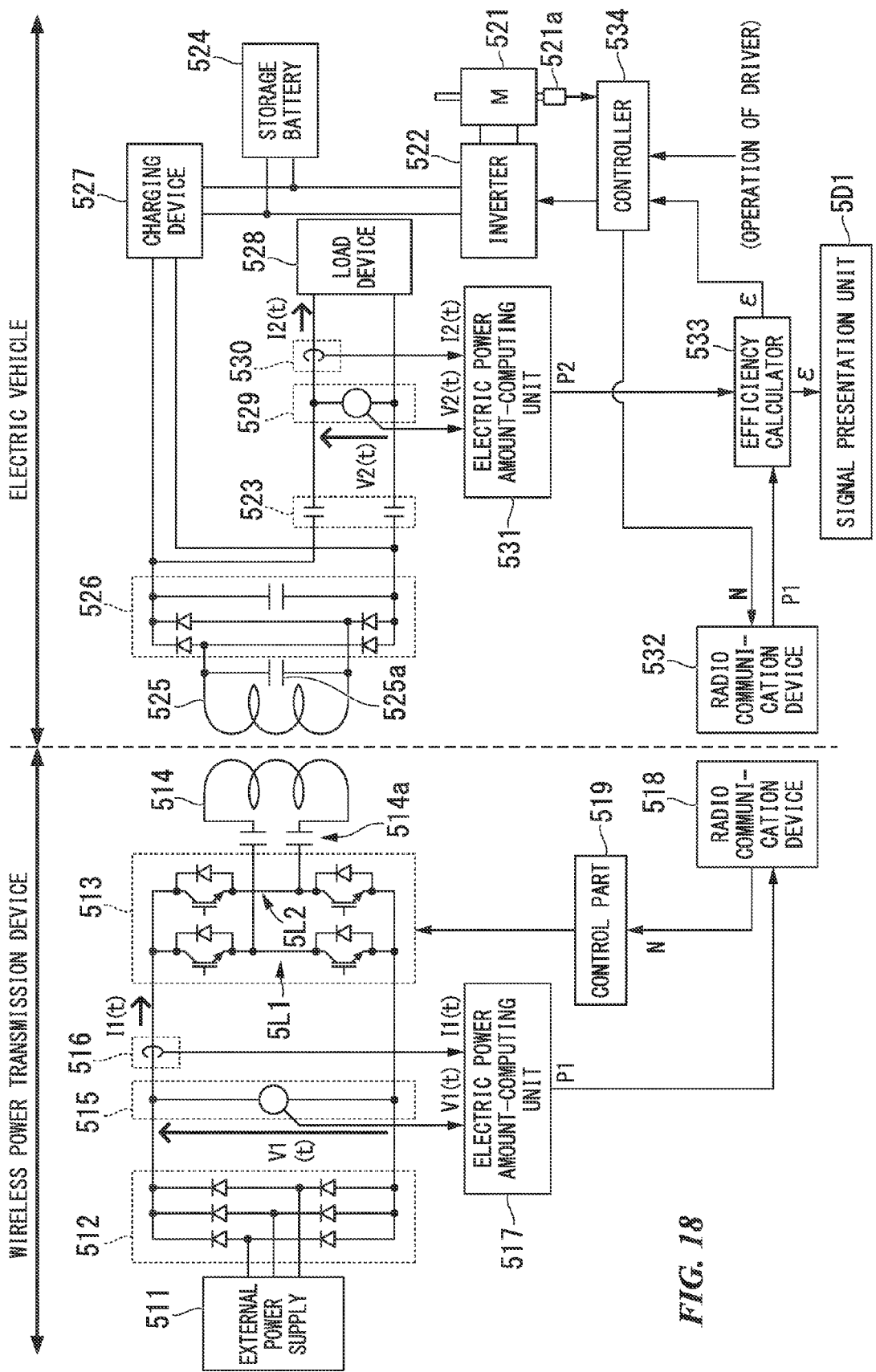
FIG. 18 is a diagram showing in detail electrical configurations of the vehicle and the wireless power transmission device according to the sixth embodiment of the present invention.

FIG. 18 is a diagram showing in detail electrical configurations of the vehicle and the wireless power transmission device according to the sixth embodiment of the present invention. Moreover, in FIG. 18, the same components as the components shown in FIG. 17 are represented by the same reference signs. As shown in FIG. 18, the rectifier circuit 512 of the wireless power transmission device 51 is configured as a three-phase full-wave rectifier circuit (bridge rectifier circuit). In addition, the power-supplying circuit 513 of the wireless power transmission device 51 is configured as a circuit (inverter) in which switching legs 5L1, 5L2 (each circuit composed of series-connected two transistors and a diode which is connected to each of the two transistors in parallel) are connected in parallel. Moreover, for the transistor, an IGBT (Insulated Gate Bipolar Transistor), a Power MOSFET (Metal-Oxide-Semiconductor Field-Effect Transistor) or the like can be used.

In addition, two capacitors 514a are provided between the power-supplying circuit 513 and the power-transmitting coil 514. The capacitors 514a together with the power-transmitting coil 514 form a series resonant circuit. One end of the power-transmitting coil 514 is connected to the switching leg 5L1 of the power-supplying circuit 513 through one capacitor 514a, and the other end of the power-transmitting coil 514 is connected to the switching leg 5L2 of the power-supplying circuit 513 through the other capacitor 514a.

The wireless power transmission device 51 includes a voltage measurement unit 515, a current measurement unit 516, an electric power amount-computing unit 517 (first power supply value-computing part), a radio communication device 518 (first device input part, first device output part) and a control part 519 in addition to the above-described components from the external power supply 511 to the power-transmitting coil 514. The voltage measurement unit 515 and the current measurement unit 516 are provided between the rectifier circuit 512 and the power-supplying circuit 513, and measure an input voltage V1 (t) and an input current I1 (t) of the power-supplying circuit 513, respectively.

The electric power amount-computing unit 517 determines an electric power amount P1 (a first power supply value) of electric power supplied to the power-supplying circuit 513, using the input voltage V1 (t) measured by the voltage measurement unit 515 and using the input current I1 (t) measured by the current measurement unit 516. Specifically, the electric power amount P1 is calculated by multiplying V1 (t) and I1 (t) together. In addition, if a loss of the power-supplying circuit 513 and the power-transmitting coil 514 is zero, the electric power amount P1 of electric power supplied to the power-supplying circuit 513 becomes equal to the amount of electric power (a power supply amount) supplied from the power-transmitting coil 514. The electric power amount P1 indicates the amount of electric power which the power-transmitting coil 514 supplies to the power-receiving coil 525.

The radio communication device 518 is capable of wirelessly communicating various pieces of information with a radio communication device 532 provided in the electric vehicle 52. For example, the radio communication device 518 sends the information indicating the electric power amount P1 determined by the electric power amount-computing unit 517 to the radio communication device 532, and receives a positioning completion notification N (described below) which the controller 534 outputs. In addition, the radio communication device 518 can communicate with the radio communication device 532 when the radio communication device 532 of the electric vehicle 52 is positioned in an area around the installation position of the radio communication device 518 in which the radius from the installation position is several meters.

The control part 519 controls the power-supplying circuit 513 in accordance with communication between the radio communication devices 518 and 532. That is, the control part 519 switches the electric power which the power-supplying circuit 513 outputs to the power-transmitting coil 514, between small electric power and large electric power, based on a signal (a positioning completion notification N described below) which the radio communication device 518 receives from the radio communication device 532.

In addition, as shown in FIG. 18, the power-receiving circuit 526 of the electric vehicle 52 is configured using a bridge rectifier circuit composed of four diodes and using a capacitor connected to the output terminals of the bridge rectifier circuit in parallel. Moreover, a capacitor 525a is connected between the power-receiving coil 525 and the power-receiving circuit 526 in parallel, and a rotation angle detector 521a such as a resolver or an encoder which detects a rotation angle of the motor 521 is attached to the motor 521.

The electric vehicle 52 includes a voltage measurement unit 529, a current measurement unit 530, an electric power amount-computing unit 531 (first received power value-computing part), the radio communication device 532 (first vehicle input part, first vehicle output part), an efficiency calculator 533 (first efficiency calculation part) and the controller 534 in addition to the above-described components from the motor 521 to the load device 528 and the signal presentation unit 5D1. The voltage measurement unit 529 and the current measurement unit 530 are provided between the power-receiving circuit 526 and the load device 528, and measure an input voltage V2 (t) and an input current I2 (t) of the load device 528, respectively. In addition, in the electric vehicle 52, the electric power amount-computing unit 531 and the efficiency calculator 533 composes a computing part of this embodiment.

The electric power amount-computing unit 531 determines an electric power amount P2 of electric power received by the power-receiving circuit 526, using the input voltage V2 (t) measured by the voltage measurement unit 529 and using the input current I2 (t) measured by the current measurement unit 530. That is, the electric power amount-computing unit 531 is configured to determine the electric power amount P2 (a first received power value) of electric power received by the power-receiving circuit 526 when the supply destination of the electric power received by the power-receiving coil 525 is set to the load device 528. Specifically, the electric power amount P2 is calculated by multiplying V2 (t) and I2 (t) together. In addition, if a loss of the power-receiving coil 525 and the power-receiving circuit 526 is zero, the electric power amount P2 of electric power received by the power-receiving circuit 526 becomes equal to the amount of electric power (a received power amount) received by the power-receiving coil 525. The electric power amount P2 indicates the amount of electric power which the power-receiving coil 525 has received from the power-transmitting coil 514.

The radio communication device 532 is capable of wirelessly communicating various pieces of information with the radio communication device 518 provided in the wireless power transmission device 51. For example, the radio communication device 532 receives the information indicating the electric power amount P1 sent from the radio communication device 518, and sends the positioning completion notification N (described below) which the controller 534 outputs. In addition, the radio communication device 532 can communicate with the radio communication device 518 when the radio communication device 518 of the wireless power transmission device 51 is positioned in an area around the radio communication device 532 in which the radius from the radio communication device 532 is several meters.

The efficiency calculator 533 calculates the power transmission efficiency ε from the wireless power transmission device 51 to the electric vehicle 52 based on the information indicating the electric power amount P2 determined by the electric power amount-computing unit 531 and on the information indicating the electric power amount P1 received by the radio communication device 532. Specifically, the power transmission efficiency ε is calculated by dividing the electric power amount P2 by the electric power amount P1.

The controller 534 outputs a torque command value to the inverter 522 while monitoring detection results of the rotation angle detector 521a, based on a rotation angle command value of the motor 521 depending on operations (driving operations) of the driver which an operating device (not shown) receives. In addition, when charging instructions are input from the above operating device through the operation of the driver, the controller 534 controls the contactor 523, thereby making the power-receiving circuit 526 and the load device 528 the connected state. Furthermore, the controller 534 controls the contactor 523 at the timing the power transmission efficiency ε calculated by the efficiency calculator 533 changes from rising into a fixed value or into dropping, thereby making the power-receiving circuit 526 and the load device 528 the disconnected state, and outputs a positioning completion notification N to the radio communication device 532.

The motor 521 rotates a tire whose radius is known, through a speed reducer (not shown) whose speed reduction ratio is known, and thus the relationship between the rotation angle of the motor 521 and the amount of movement of the electric vehicle 52 is fixed.

Specifically, if the radius of the tire is represented by r and the speed reduction ratio of the speed reducer is represented by n, the electric vehicle 52 moves a distance (2πr/n) when the motor makes one rotation. Therefore, by controlling the rotation angle of the motor 521, the amount of movement of the electric vehicle 52 can be controlled.

Next, operations of the wireless power transmission device 51 and the electric vehicle 52 having the above-described configurations are described. In addition, hereinafter, operations in which the storage battery 524 mounted on the electric vehicle 52 is charged using electric power supplied from the wireless power transmission device 51 are mainly described.

First, a driver drives the electric vehicle 52, and moves and stops the electric vehicle 52 at the installation position of the wireless power transmission device 51 or at the vicinity thereof. At this time, the control part 519 of the wireless power transmission device 51 determines whether the electric vehicle 52 is positioned in a power-transmitting area. For example, the control part 519 determines whether the electric vehicle 52 is in the power-transmitting area, based on whether the radio communication device 518 can wirelessly communicate with the radio communication device 532 of the electric vehicle 52.

When the control part 519 determines that the electric vehicle 52 is positioned in the power-transmitting area, the control part 519 operates the power-supplying circuit 513, thereby starting the transmission of small electric power. In addition, when the electric vehicle 52 is positioned in the power-transmitting area, an electromagnetic coupling circuit is formed of the power-transmitting coil 514 of the wireless power transmission device 51 and the power-receiving coil 525 of the electric vehicle 52.

After the driver moved and stopped the electric vehicle 52 at the installation position of the wireless power transmission device 51 or at the vicinity thereof, the driver gives charging instructions to an operating device (not shown) of the electric vehicle 52. Based on the instructions, the controller 534 of the electric vehicle 52 makes the contactor 523 the closed state, thereby making the power-receiving circuit 526 and the load device 528 the connected state. In addition, the controller 534 controls the power-receiving circuit 526, thereby starting the power-receiving operation, and controls the charging device 527, thereby stopping the operation thereof.

That is, the controller 534 switches the power-supplying destination of the power-receiving circuit 526 to the load device 528 from the charging device 527 in accordance with the start of positioning of the power-receiving coil 525 with respect to the power-transmitting coil 514. Moreover, the load of the load device 528 with respect to the power-receiving circuit 526 is greatly less than that of the charging device 527. Accordingly, in the above-described operations, the control part 519 operates the power-supplying circuit 513 so as to supply the electric vehicle 52 with greatly smaller electric power than the electric power supplied to the electric vehicle 52 in a state where the power-supplying destination of the power-receiving circuit 526 is set to the charging device 527.

In the electric vehicle 52, when the power transmission from the wireless power transmission device 51 is not performed, the output current I2 (t) is not measured by the current measurement unit 530, and the electric power amount P2 determined by the electric power amount-computing unit 531 is zero. Therefore, the power transmission efficiency ε calculated by the efficiency calculator 533 is also zero, and none of the green lamp 5d1 and the red lamp 5d2 provided in the signal presentation unit 5D1 is lit.

In contrast, when the power transmission from the wireless power transmission device 51 is performed, the output current I2 (t) is measured by the current measurement unit 530, and the electric power amount P2 based on the measured output current I2 (t) is determined by the electric power amount-computing unit 531. Moreover, while the wireless power transmission device 51 performs the transmission of electric power, the electric power amount P1 of electric power supplied to the power-supplying circuit 513 is always determined by the electric power amount-computing unit 517, and the information indicating the electric power amount P1 is sent from the radio communication device 518.

The information indicating the electric power amount P2 determined by the electric power amount-computing unit 531 and the information indicating the electric power amount P1 received by the radio communication device 532 are input into the efficiency calculator 533, and the efficiency calculator 533 calculates the power transmission efficiency ε from the wireless power transmission device 51 to the electric vehicle 52 using the electric power amounts P1 and P2. The power transmission efficiency ε calculated by the efficiency calculator 533 is input into the signal presentation unit 5D1, and the signal presentation unit 5D1 determines, every a certain period (e.g., 1/10 sec), whether the power transmission efficiency ε rises.

When the driver sets a selector to D-range and operates an accelerator, the controller 534 controls the inverter 522, thereby driving the motor 521. At this time, the inverter 522 drives the motor 521 based on the electric power supplied from the storage battery 524. In this way, the electric vehicle 52 slowly moves forward. When it is determined that the power transmission efficiency ε rose due to the forward movement of the electric vehicle 52, the signal presentation unit 5D1 lights the green lamp 5d1 and prompts the driver of the electric vehicle 52 to continue the movement (forward movement).

In contrast, when it is determined that the power transmission efficiency ε maintains a fixed value or dropped due to the forward movement of the electric vehicle 52, the signal presentation unit 5D1 lights the red lamp 5d2 and prompts the driver of the electric vehicle 52 to stop the vehicle or to change the moving direction (moving backward). Since the power transmission efficiency ε is maximized at the time the signal presentation unit 5D1 switches the lighting to the red lamp 5d2 after the green lamp 4d1 lights once, the driver stops the electric vehicle 52 at this time. At the time of this stop, the relative position of the power-receiving coil 525 with respect to the power-transmitting coil 514 is adjusted to the position suitable for the wireless transmission of electric power.

On the other hand, when the power transmission efficiency ε changes from rising into a fixed value or into dropping, the controller 534 makes the contactor 523 the opened state, thereby making the power-receiving circuit 526 and the load device 528 the disconnected state, and makes the radio communication device 532 send a positioning completion notification indicating that the positioning was finished, the electric vehicle 52 stopped, and the contactor 523 was set in the disconnected state (opened state). That is, the controller 534 switches the power-supplying destination of the power-receiving circuit 526 to the charging device 527 from the load device 528.

When the electric vehicle 52 is stopped, the controller 534 controls the charging device 527, thereby starting the operation thereof, and controls the inverter 522, thereby stopping the operation thereof. Thereby, the controller 534 starts charging the storage battery 524. Specifically, the AC power from the wireless power transmission device 51 is wirelessly transmitted to the electric vehicle 52 through the electromagnetic coupling circuit formed of the power-transmitting coil 514 and the power-receiving coil 525 and is received by the power-receiving circuit 526. The AC power received by the power-receiving circuit 526 is converted into DC power, and the converted DC power is supplied to the charging device 527. Thus, the charge to the storage battery 524 using this direct current is performed by the charging device 527. When the storage battery 524 becomes the fully charged state through the charge by the charging device 527, the controller 534 stops the charging device 527, thereby stopping the charge to the storage battery 524.

On the other hand, after starting the transmission of small electric power, when the positioning completion notification N received by the radio communication device 532 is input, the control part 519 of the wireless power transmission device 51 controls the power-supplying circuit 513, thereby starting the transmission of increased electric power used to charge a battery (large electric power to charge the storage battery 524). That is, the control part 519 switches the electric power transmitted from the power-transmitting coil 514, from small electric power to large electric power used to charge a battery.

After starting the transmission of increased electric power to charge a battery, the control part 519 determines whether the charge to the storage battery 524 mounted on the electric vehicle 52 is finished. For example, the control part 519 determines whether a signal indicating the charge completion of the storage battery 524 has been sent from the radio communication device 532 of the electric vehicle 52. When the control part 519 determines that the charge is finished, the control part 519 stops the power-supplying circuit 513, thereby stopping the electric power transmission.

As described above, in this embodiment, the power transmission efficiency $\epsilon$ from the wireless power transmission device 51 to the electric vehicle 52 is determined, and the signal presentation unit SDI presents, based on the power transmission efficiency $\epsilon$, a signal indicating a direction in which the electric vehicle 52 is to be moved, to the driver. Accordingly, the position of the vehicle can be precisely adjusted through the operation of the driver even if electric vehicles 52 vary in size or in the attachment position of the power-receiving coil 525, and thus electric power can be efficiently transmitted. In addition, a mechanism used to individually move the power-transmitting coil 514 or the power-receiving coil 525, a secondary coil used to sense a position or the like is unnecessary, and thus the increase in size, the complicated structure, or the increase in cost is not caused.

In addition, in this embodiment, the power transmission efficiency $\epsilon$ from the wireless power transmission device 51 to the electric vehicle 52 is determined based on the electric power amount P1 of electric power supplied to the power-supplying circuit 513 of the wireless power transmission device 51 and on the electric power amount P2 of electric power received by the power-receiving circuit 526 of the electric vehicle 52. The power transmission efficiency $\epsilon$ is not only the power transmission efficiency between the power-transmitting coil 514 and the power-receiving coil 525, but is the power transmission efficiency in a state including the power-supplying circuit 513 and the power-receiving circuit 526, and is approximately the same as the actual power transmission efficiency. Therefore, the position between the power-transmitting coil 514 of the wireless power transmission device 51 and the power-receiving coil 525 of the electric vehicle 52 can be adjusted to a more appropriate position so that the actual power transmission efficiency is maximized.

In addition, in this embodiment, when the positioning between the power-transmitting coil 514 and the power-receiving coil 525 is performed, the motor 521 is driven and controlled using the electric power of the storage battery 524. That is, the above positioning is performed without using the electric power supplied from the power-transmitting coil 514. In this way, during the positioning, the power-transmitting coil 514 does not have to supply electric power to drive the motor 521, and it is sufficient if the power-transmitting coil 514 supplies minimum electric power required to perform the positioning. As a result, it is possible to reduce a power loss caused by the power-receiving coil 525 not receiving part of electric power output from the power-transmitting coil 514.

Seventh Embodiment

FIG. 19 is a block diagram showing main configurations of a vehicle and a wireless power transmission device according to a seventh embodiment of the present invention. FIG. 20 is a diagram showing in detail electrical configurations of the vehicle and the wireless power transmission device according to the seventh embodiment of the present invention. In the above-described sixth embodiment, a signal presentation unit used to present a signal indicating a direction in which an electric vehicle is to be moved is provided in the electric vehicle. On the other hand, in this embodiment, the signal presentation unit is provided at the outside of an electric vehicle (in a wireless power transmission device).

That is, as shown in FIGS. 19 and 20, a wireless power transmission device 53 of this embodiment has a configuration in which a radio communication device 518A (second device input part), an efficiency calculator 520 (third efficiency calculation part) and a signal presentation unit 5D2 (signal presentation part) are added to the components from the external power supply 511 to the electric power amount-computing unit 517 and the control part 519 which the wireless power transmission device 51 shown in FIGS. 17 and 18 includes. Moreover, in the wireless power transmission device 53, the electric power amount-computing unit 517 and the efficiency calculator 520 compose a computing part of this embodiment.

On the other hand, an electric vehicle 54 of this embodiment has a configuration in which the efficiency calculator 533 and the signal presentation unit 5D1 which the electric vehicle 52 shown in FIGS. 17 and 18 includes are omitted, and a radio communication device 532A (second vehicle output part) is used instead of the radio communication device 532. Moreover, the radio communication device 518A of the wireless power transmission device 53 receives the information indicating the electric power amount P2 which is determined by the electric power amount-computing unit 531 (first received power value-computing part) of the electric vehicle 54 and which is sent from the radio communication device 532A, and the radio communication device 532A of the electric vehicle 54 sends the information indicating the electric power amount P2.

The efficiency calculator 520 calculates a power transmission efficiency ϵ from the wireless power transmission device 53 to the electric vehicle 54 based on the information indicating the electric power amount P1 determined by the electric power amount-computing unit 517 and on the information indicating the electric power amount P2 received by the radio communication device 518A. Specifically, the power transmission efficiency ϵ is calculated by dividing the electric power amount P2 by the electric power amount P1. The signal presentation unit 5D2 has a configuration similar to the signal presentation unit 5D1, and is mounted on, for example, a pole 540 in a state where waterproofing or the like is applied thereto.

In the wireless power transmission device 53 and the electric vehicle 54 having the above-described configurations, the power transmission efficiency ϵ from the wireless power transmission device 53 to the electric vehicle 54 is calculated in the wireless power transmission device 53, and a green lamp 5d1 or a red lamp 5d2 provided in the signal presentation unit 5D2 is lit based on the calculation result of the power transmission efficiency ϵ. In addition, the control part 519 switches the electric power transmitted from the power-transmitting coil 514, from small electric power to large electric power to charge a battery, based on the power transmission efficiency ϵ input from the efficiency calculator 520. Furthermore, the control part 519 makes the radio communication device 518A send the power transmission efficiency ϵ.

On the other hand, the controller 534 of the electric vehicle 54 controls the inverter 522, the contactor 523 and the charging device 527 based on the power transmission efficiency ϵ received by the radio communication device 532A, similar to the above-described sixth embodiment. In addition, since the operation during the charge to the storage battery 524 mounted on the electric vehicle 54 is similar to that of the sixth embodiment, its description is omitted.

As described above, in this embodiment, the power transmission efficiency ϵ from the wireless power transmission device 53 to the electric vehicle 54 is determined, and the signal presentation unit 5D2 presents, based on the power transmission efficiency ϵ, a signal indicating a direction in which the electric vehicle 54 is to be moved, to a driver. Accordingly, the position of the vehicle can be precisely adjusted through the operation of the driver even if electric vehicles 54 vary in size or in the attachment position of the power-receiving coil 525, and electric power can be efficiently transmitted. In addition, a mechanism used to individually move the power-transmitting coil 514 or the power-receiving coil 525, a secondary coil used to sense a position or the like is unnecessary, and thus the increase in size, the complicated structure, or the increase in cost is not caused.

In addition, in this embodiment, the power transmission efficiency ϵ from the wireless power transmission device 53 to the electric vehicle 54 is also determined based on the electric power amount P1 of electric power supplied to the power-supplying circuit 513 of the wireless power transmission device 53 and on the electric power amount P2 of electric power received by the power-receiving circuit 526 of the electric vehicle 54. The power transmission efficiency ϵ is not only the power transmission efficiency between the power-transmitting coil 514 and the power-receiving coil 525, but is the power transmission efficiency in a state including the power-supplying circuit 513 and the power-receiving circuit 526, and is approximately the same as the actual power transmission efficiency. Therefore, the position between the power-transmitting coil 514 of the wireless power transmission device 53 and the power-receiving coil 525 of the electric vehicle 54 can be adjusted to a more appropriate position so that the actual power transmission efficiency is maximized.

In addition, in this embodiment, during the positioning between the power-transmitting coil 514 and the power-receiving coil 525, the motor 521 is driven and controlled using the electric power of the storage battery 524. That is, the positioning is performed without using the electric power supplied from the power-transmitting coil 514. Accordingly, during the positioning, it is sufficient if the power-transmitting coil 514 supplies minimum electric power required to perform the positioning, and thus it is possible to reduce a power loss caused by the power-receiving coil 525 not receiving part of electric power output from the power-transmitting coil 514.

Hereinbefore, a vehicle and a wireless power transmission device according to the embodiments of the present invention were described. However, the present invention is not limited to the above-described sixth or seventh embodiment, and modifications can be freely adopted within the scope of the present invention. For example, in the sixth or seventh embodiment, a signal indicating a direction in which the vehicle is to be moved is presented based on the power transmission efficiency ϵ from the wireless power transmission device 51 or 53 to the electric vehicle 52 or 54. However, a signal indicating a direction in which the vehicle is to be moved may be presented based on the electric power amount P2 (the electric power received by the power-receiving circuit 526) determined by the electric power amount-computing unit 531, instead of the power transmission efficiency ϵ. That is, the signal presentation unit 5D1 or 5D2 may be configured to present a signal indicating a direction in which the electric vehicle 52 or 54 is to be moved, using the electric power amount P2 determined by the electric power amount-computing unit 531.

The wireless power transmission device 51 or 53 and the power-transmitting coil 514 may not be installed to be strictly flush with the ground. For example, they may be buried in the ground so that the efficiency of wireless power transmission is not remarkably decreased, and may be installed to be lower than the ground. In addition, they may be projected so that the traveling of the electric vehicle 52 or 54 is not remarkably disturbed, and may be installed to be higher than the ground.

In addition, in the sixth or seventh embodiment, a case where the positioning is performed by moving the electric vehicle 52 backward and forward was described as an example. However, if a vehicle can linearly move rightward and leftward, the positioning can be performed by moving the vehicle rightward and leftward. Moreover, in general, a vehicle can move only backward and forward if a steering is not operated, and cannot linearly move rightward and leftward. Accordingly, it is desirable to use a power-transmitting coil which does not cause an excessive drop of the transmission efficiency even if a position shift in the right-and-left direction occurs.

Therefore, the power-transmitting coil 514 of the wireless power transmission device 51 or 53 may be arranged in a configuration similar to the power-transmitting coil 114 in FIG. 4 of the above-described first embodiment.

In addition, when the wireless power transmission device 51 or 53 is installed in a place where the movement of the electric vehicle 52 or 54 is limited to one-way (for example, a place where the movement is limited only to forward movement), the electric vehicle 52 or 54 is stopped immediately after the electric vehicle 52 or 54 entered a power-transmitting area. That is, the electric vehicle 52 is stopped so that the power-receiving coil 525 is disposed near the periphery of the power-transmitting area. In this way, the power transmission efficiency ε gradually rises as the electric vehicle 52 or 54 moves forward, and thus it is possible to prevent the electric vehicle 52 or 54 form moving backward.

In addition, when the power transmission efficiency ε remarkably decreases during the positioning, in the sixth embodiment, it is desirable to prompt the driver to stop the vehicle by lighting the red lamp 5d2 of the signal presentation unit 5D1, and it is desirable to stop the transmission of electric power by notifying the wireless power transmission device 51 through the radio communication devices 532 and 518 that the power transmission efficiency ε remarkably decreases. Moreover, in the seventh embodiment, it is desirable to prompt the driver to stop the vehicle by lighting the red lamp 5d2 of the signal presentation unit 5D2, and it is desirable to let the wireless power transmission device 53 stop the transmission of electric power. In this way, it is possible to prevent unexpected trouble which occurs during the positioning.

In addition, the signal presentation unit 5D1 or 5d2 may be provided at each of several positions, and the same signal may be presented thereon. For example, in the seventh embodiment, the signal presentation units 5D2 which present the same signal are provided in the back side and the front side of the position at which the electric vehicle 54 is to be stopped, and thereby the driver can easily recognize the signal. Moreover, in the sixth or seventh embodiment, a case where an object to be supplied with electric power is an electric vehicle with a storage battery mounted thereon was described as an example. However, the present invention can be applied to a plug-in hybrid vehicle or to a transportation vehicle. Furthermore, the present invention can be applied to an unmanned vehicle.

In addition, in the sixth or seventh embodiment, the contactor 523 is employed as a device used to switch the supply route of electric power, but an electronic switch such as a relay or an FET (Field Effect Transistor) may be employed instead of the contactor 523.

In addition, in the sixth or seventh embodiment, a resistor is employed as the load device 528. However, if the load device 528 consumes small electric power (a few watts), an electronic load device may be used therefor. For example, the voltage of part of small electric power is converted using a converter, and the converted electric power may be used as auxiliary control power for various devices (electronic load devices) in the electric vehicle 52.

In addition, in the sixth or seventh embodiment, during the positioning, the contactor 523 is set in the connected state (the closed state), and the charging device 527 is stopped. When the positioning is finished, the contactor 523 is set in the disconnected state (the opened state), and the charging device 527 is set to start the charging operation. In this way, the supply destination of electric power received by the power-receiving coil 525 is switched between the load device 528 and the storage battery 524 (the charging device 527). However, the present invention is not limited to this configuration. For example, instead of the contactor 523, a switching circuit which switches the connection destination of the power-receiving circuit 526 to the charging device 527 or to the load device 528 may be provided at the connection point between the load device 528 and the DC bus 5B2. That is, the switching circuit switches the connection destination of the power-receiving circuit 526 to the charging device 527 or to the load device 528, and thereby the supply destination of electric power received by the power-receiving coil 525 may be switched to the load device 528 or to the storage battery 524 (the charging device 527). As a result, during the positioning, the power-receiving circuit 526 and the charging device 527 are set in the disconnected state, and thus it is not necessary to stop the charging device 527.

In addition, in the sixth or seventh embodiment, at the positioning or at the charging of the electric vehicle 52 or 54, the wireless power transmission device 51 or 53 switches the electric power which the power-transmitting coil 514 transmits, to small electric power or to large electric power to charge a battery, but the present invention is not limited to this configuration. For example, the wireless power transmission device 51 or 53 may not switch the electric power which the power-transmitting coil 514 transmits, at the positioning or at the charging, and the power-transmitting coil 514 may continue transmitting constant large electric power to charge a battery. Moreover, at this time, it is necessary to set the load device 528 of the electric vehicle 52 or 54 to a load capable of consuming large electric power to charge a battery. In this case, the electric vehicle 52 or 54 does not have to send the positioning completion notification to the wireless power transmission device 51 or 53.

Furthermore, an electric vehicle and a wireless power transmission device may be configured to be applied to any one of the first to seventh embodiments. For example, based on a predetermined condition, a case where the positioning of a vehicle is automatically performed as shown in the first to third embodiments and a case where a driver performs the positioning of a vehicle as shown in the fourth to seventh embodiments may be alternately switched. Moreover, in the above-described embodiments, electric power is wirelessly transmitted employing the electromagnetic induction method using a coil. On the other hand, in a case of employing the electromagnetic field resonance method, a capacitor or the like may be used together with a coil.

INDUSTRIAL APPLICABILITY

The present invention can be widely applied to a vehicle capable of moving using the motive power of a motor, and to a wireless power transmission device capable of wirelessly transmitting electric power to the vehicle.

DESCRIPTION OF REFERENCE SIGNS

11, 21, 31, 41, 43, 51, 53 wireless power transmission device
12, 22, 32, 42, 44, 52, 54 electric vehicle (vehicle)
114, 214, 414, 514 power-transmitting coil (primary coil)
117, 217, 417, 517 electric power amount-computing unit (first power supply value-computing part)
118, 418 radio communication device (first device output part)
121, 221, 331, 421, 521 motor
123, 423 contactor (switching circuit)
124, 224, 333, 424, 524 storage battery
125, 225, 425, 525 power-receiving coil (secondary coil)
127, 227, 338, 427, 527 charging device
130, 231, 430, 531 electric power amount-computing unit (first received power value-computing part)
131, 431 radio communication device (first vehicle input part)
132a, 233a, 432, 533 efficiency calculator (first efficiency calculation part)
132b command value generator (command generation part)
132c controller (control part)
218, 518 radio communication device (first device input part, first device output part)
228, 528 load device (first load device)

232, 532 radio communication device (first vehicle input part, first vehicle output part)
233c, 343c controller (command generation part, control part)
316 ground coil (primary coil)
317 load device (second load device)
320 electric power amount-computing unit (second received power value-computing part)
321 radio communication device (first device input part, second device output part)
334 vehicle coil (secondary coil)
343a efficiency calculator (second efficiency calculation part)
341 electric power amount-computing unit (second power supply value-computing part)
342 radio communication device (second vehicle input part, first vehicle output part)
418A radio communication device (second device input part)
419, 520 efficiency calculator (third efficiency calculation part)
431A radio communication device (second vehicle output part)
518A radio communication device (second device input part)
532A radio communication device (second vehicle output part)
4D1, 5D1 signal presentation unit (command generation part, signal presentation part)
4D2, 5D2 signal presentation unit (signal presentation part)

The invention claimed is:

1. A vehicle comprising:
a motor used to produce motive power for movement;
a storage battery used to supply electric power to drive the motor;
a secondary coil capable of performing wireless transmission of electric power between the secondary coil and a primary coil at an outside of the vehicle; and
a command generation part used to generate a command to move the vehicle so as to adjust a relative position of the secondary coil with respect to the primary coil, using a first received power value indicating an amount of electric power received by the secondary coil from the primary coil or using a second received power value indicating an amount of electric power received by the primary coil from the secondary coil.

2. The vehicle according to claim 1, further comprising:
a first received power value-computing part used to determine the first received power value to be used in the command generation part; and
a control part used to control the motor based on the command generated by the command generation part so as to adjust the position of the secondary coil with respect to the primary coil.

3. The vehicle according to claim 2,
wherein the control part is configured to adjust the position of the secondary coil with respect to the primary coil by controlling the motor and by moving the vehicle backward and forward.

4. The vehicle according to claim 2,
wherein the vehicle is configured so that electric power received by the secondary coil is used as electric power to drive the motor when the control part controls the motor so as to perform positioning of the secondary coil with respect to the primary coil.

5. The vehicle according to claim 2, further comprising:
a charging device used to charge the storage battery using electric power received by the secondary coil; and
a switching circuit used to electrically disconnect the motor from the storage battery during charging of the storage battery by the charging device.

6. The vehicle according to claim 2, further comprising:
a first vehicle input part into which a first power supply value is input from the outside, the first power supply value indicating an amount of electric power which the primary coil supplies to the secondary coil; and
a first efficiency calculation part used to determine power transmission efficiency from the primary coil to the secondary coil, using the first received power value determined by the first received power value-computing part and using the first power supply value input into the first vehicle input part,
wherein the command generation part is configured to generate the command based on the power transmission efficiency determined by the first efficiency calculation part.

7. A wireless power transmission device capable of wirelessly transmitting electric power outside thereof,
wherein the wireless power transmission device is configured to wirelessly transmit, to the secondary coil from the primary coil, electric power to charge the storage battery provided in the vehicle according to claim 1.

8. A wireless power transmission device capable of wirelessly transmitting electric power outside thereof, and of wirelessly transmitting, to the secondary coil from the primary coil, electric power to charge the storage battery provided in the vehicle according to claim 6, the wireless power transmission device comprising:
a first power supply value-computing part used to determine the first power supply value indicating an amount of electric power which the primary coil supplies to the secondary coil; and
a first device output part used to output the first power supply value determined by the first power supply value-computing part outside.

9. The vehicle according to claim 1, further comprising:
a first load device used to consume electric power received by the secondary coil;
a power-supplying destination-setting device used to set a supply destination of the electric power received by the secondary coil to one of the first load device and the storage battery;
a first received power value-computing part used to determine the first received power value indicating an amount of electric power received by the secondary coil in a state where the supply destination of the electric power received by the secondary coil is set to the first load device by the power-supplying destination-setting device; and
a control part used to control the motor based on the command generated by the command generation part so as to adjust the position of the secondary coil with respect to the primary coil,
wherein the command generation part is configured to generate the command using the first received power value determined by the first received power value-computing part.

10. The vehicle according to claim 9,
wherein the control part is configured to adjust the position of the secondary coil with respect to the primary coil by controlling the motor and by moving the vehicle backward and forward.

11. The vehicle according to claim 9, further comprising:
a first vehicle input part into which a first power supply value is input from the outside, the first power supply value indicating an amount of electric power which the primary coil supplies to the secondary coil; and a first efficiency calculation part used to determine power transmission efficiency from the primary coil to the secondary coil, using the first received power value determined by the first received power value-computing part and using the first power supply value input into the first vehicle input part, wherein the command generation part is configured to generate the command based on the power transmission efficiency determined by the first efficiency calculation part.

12. The vehicle according to claim 9, further comprising:

a first vehicle output part used to output, outside, a positioning completion notification indicating that positioning of the secondary coil with respect to the primary coil is finished.

13. A wireless power transmission device capable of wirelessly transmitting electric power to the vehicle according to claim 9 using the primary coil.

14. A wireless power transmission device capable of wirelessly transmitting electric power to the vehicle according to claim 11 using the primary coil, the wireless power transmission device comprising:

a first power supply value-computing part used to determine the first power supply value indicating an amount of electric power which the primary coil supplies to the secondary coil; and a first device output part used to output the first power supply value determined by the first power supply value-computing part outside thereof.

15. A wireless power transmission device capable of wirelessly transmitting electric power to the vehicle according to claim 12 using the primary coil, the wireless power transmission device comprising:

a first power supply value-computing part used to determine a first power supply value indicating an amount of electric power which the primary coil supplies to the secondary coil;

a first device output part used to output the first power supply value determined by the first power supply value-computing part outside thereof, and a first device input part into which the positioning completion notification output from the first vehicle output part is input, wherein the wireless power transmission device is configured to increase an amount of electric power supplied from the primary coil to the secondary coil when the positioning completion notification is input into the first device input part.

16. The vehicle according to claim 1, further comprising:

a second vehicle input part into which the second received power value is input from the outside, the second received power value indicating an amount of electric power received by the primary coil from the secondary coil and being used in the command generation part; and a control part used to control the motor based on the command generated by the command generation part so as to adjust the position of the secondary coil with respect to the primary coil.

17. The vehicle according to claim 16, further comprising:

a second power supply value-computing part used to determine a second power supply value indicating an amount of electric power which the secondary coil supplies to the primary coil; and a second efficiency calculation part used to determine power transmission efficiency from the secondary coil to the primary coil, using the second power supply value determined by the second power supply value-computing part and using the second received power value input into the second vehicle input part, wherein the command generation part is configured to generate the command based on the power transmission efficiency determined by the second efficiency calculation part.

18. The vehicle according to claim 16, wherein the control part is configured to adjust the position of the secondary coil with respect to the primary coil by controlling the motor and by moving the vehicle backward and forward.

19. The vehicle according to claim 16, wherein the vehicle is configured to start receiving electric power from the primary coil through the secondary coil when positioning of the secondary coil with respect to the primary coil is finished.

20. The vehicle according to claim 16, further comprising:

a first vehicle output part used to output, outside, a positioning completion notification indicating that positioning of the secondary coil with respect to the primary coil is finished, wherein the vehicle is configured to start receiving electric power from the primary coil through the secondary coil when the first vehicle output part outputs the positioning completion notification outside.

21. A wireless power transmission device capable of wirelessly receiving or transmitting electric power from or to the vehicle according to claim 16 using the primary coil, the wireless power transmission device comprising:

a second load device used to consume electric power received by the primary coil from the secondary coil;

a second received power value-computing part used to determine the second received power value indicating an amount of electric power received by the primary coil from the secondary coil; and a second device output part used to output the second received power value determined by the second received power value-computing part outside thereof, wherein the wireless power transmission device is configured to start supplying electric power from the primary coil to the secondary coil when positioning of the secondary coil with respect to the primary coil is finished.

22. A wireless power transmission device capable of wirelessly receiving or transmitting electric power from or to the vehicle according to claim 20 using the primary coil, the wireless power transmission device comprising:

a second load device used to consume electric power received by the primary coil from the secondary coil;

a second received power value-computing part used to determine the second received power value indicating an amount of electric power received by the primary coil from the secondary coil;

a second device output part used to output the second received power value determined by the second received power value-computing part outside thereof; and a first device input part into which the positioning completion notification output from the first vehicle output part is input, wherein the wireless power transmission device is configured to start supplying electric power from the primary coil to the secondary coil when the positioning completion notification is input into the first device input part.

23. The vehicle according to claim 1, wherein the command generation part is a signal presentation part used to present the command to move the vehicle so as to adjust the relative position of the secondary coil with respect to the primary coil, as a signal indicating a direction in which the vehicle is to be moved.

24. The vehicle according to claim 23, further comprising:
a first received power value-computing part used to determine the first received power value which indicates an amount of electric power received by the secondary coil from the primary coil and which is used in the command generation part.

25. The vehicle according to claim 23,
wherein the signal presentation part is configured to present the signal indicating the direction in which the vehicle is to be moved, using light or sound.

26. The vehicle according to claim 23,
wherein the vehicle is configured so that electric power received by the secondary coil is used as electric power to drive the motor.

27. The vehicle according to claim 23, further comprising:
a charging device used to charge the storage battery using electric power received by the secondary coil; and
a switching circuit used to electrically disconnect the motor from the storage battery during charging of the storage battery by the charging device.

28. The vehicle according to claim 24, further comprising:
a first vehicle input part into which a first power supply value is input from the outside, the first power supply value indicating an amount of electric power which the primary coil supplies to the secondary coil; and
　　a first efficiency calculation part used to determine power transmission efficiency from the primary coil to the secondary coil, using the first received power value determined by the first received power value-computing part and using the first power supply value input into the first vehicle input part,
wherein the command generation part is configured to generate the command based on the power transmission efficiency determined by the first efficiency calculation part.

29. A wireless power transmission device capable of wirelessly transmitting, to the secondary coil from the primary coil, electric power to charge the storage battery provided in the vehicle according to claim 23.

30. A wireless power transmission device capable of wirelessly transmitting, to the secondary coil from the primary coil, electric power to charge the storage battery provided in the vehicle according to claim 28, the wireless power transmission device comprising:
a first power supply value-computing part used to determine a first power supply value indicating an amount of electric power which the primary coil supplies to the secondary coil; and
a first device output part used to output the first power supply value determined by the first power supply value-computing part outside thereof.

31. The vehicle according to claim 23, further comprising:
a first load device used to consume electric power received by the secondary coil;
a power-supplying destination-setting device used to set a supply destination of the electric power received by the secondary coil to one of the first load device and the storage battery; and
a first received power value-computing part used to determine the first received power value indicating an amount of electric power received by the secondary coil in a state where the supply destination of the electric power received by the secondary coil is set to the first load device by the power-supplying destination-setting device,
wherein the signal presentation part is configured to present the signal indicating the direction in which the vehicle is to be moved, using the first received power value determined by the first received power value-computing part.

32. The vehicle according to claim 31,
wherein the signal presentation part is configured to present the signal indicating the direction in which the vehicle is to be moved, using light or sound.

33. The vehicle according to claim 31, further comprising:
a first vehicle input part into which a first power supply value is input from the outside, the first power supply value indicating an amount of electric power which the primary coil supplies to the secondary coil; and
a first efficiency calculation part used to determine power transmission efficiency from the primary coil to the secondary coil, using the first received power value determined by the first received power value-computing part and using the first power supply value input into the first vehicle input part,
wherein the signal presentation part is configured to present the signal indicating the direction in which the vehicle is to be moved, based on the power transmission efficiency determined by the first efficiency calculation part.

34. The vehicle according to claim 31, further comprising:
a first vehicle output part used to output, outside, a positioning completion notification indicating that positioning of the secondary coil with respect to the primary coil is finished.

35. A wireless power transmission device capable of wirelessly transmitting electric power to the vehicle according to claim 31 using the primary coil.

36. A wireless power transmission device capable of wirelessly transmitting electric power to the vehicle according to claim 33 using the primary coil, the wireless power transmission device comprising:
a first power supply value-computing part used to determine a first power supply value indicating an amount of electric power which the primary coil supplies to the secondary coil; and
a first device output part used to output the first power supply value determined by the first power supply value-computing part outside thereof.

37. A wireless power transmission device capable of wirelessly transmitting electric power to the vehicle according to claim 34 using the primary coil, the wireless power transmission device comprising:
a first power supply value-computing part used to determine a first power supply value indicating an amount of electric power which the primary coil supplies to the secondary coil;
a first device output part used to output the first power supply value determined by the first power supply value-computing part outside thereof, and
a first device input part into which the positioning completion notification output from the first vehicle output part is input,
wherein the wireless power transmission device is configured to increase an amount of electric power supplied from the primary coil to the secondary coil when the positioning completion notification is input into the first device input part.

38. A vehicle comprising:
a motor used to produce motive power for movement;
a storage battery used to supply electric power to drive the motor;
a secondary coil capable of performing wireless transmission of electric power between the secondary coil and a primary coil at an outside of the vehicle;
a first received power value-computing part used to determine a first received power value indicating an amount of electric power received by the secondary coil from the primary coil; and
a second vehicle output part used to output the first received power value determined by the first received power value-computing part outside.

39. The vehicle according to claim 38,
wherein the vehicle is configured so that electric power received by the secondary coil is used as electric power to drive the motor.

40. The vehicle according to claim 38, further comprising:
a charging device used to charge the storage battery using electric power received by the secondary coil; and
a switching circuit used to electrically disconnect the motor from the storage battery during charging of the storage battery by the charging device.

41. The vehicle according to claim 38, further comprising:
a first load device used to consume electric power received by the secondary coil; and
a power-supplying destination-setting device used to set a supply destination of the electric power received by the secondary coil to one of the first load device and the storage battery,
wherein the first received power value-computing part is configured to determine the first received power value in a state where the supply destination of the electric power received by the secondary coil is set to the first load device by the power-supplying destination-setting device.

42. A wireless power transmission device capable of wirelessly transmitting, from the primary coil, electric power to charge the storage battery provided in the vehicle according to claim 38, the wireless power transmission device comprising:
a first power supply value-computing part used to determine a first power supply value indicating an amount of electric power which the primary coil supplies to the secondary coil;
a second device input part into which the first received power value indicating an amount of electric power received by the secondary coil from the primary coil is input;
a third efficiency calculation part used to determine power transmission efficiency from the primary coil to the secondary coil, using the first power supply value determined by the first power supply value-computing part and using the first received power value input into the second device input part; and
a signal presentation part used to present a signal indicating a direction in which the vehicle is to be moved, based on the power transmission efficiency determined by the third efficiency calculation part.

43. The wireless power transmission device according to claim 42,
wherein the signal presentation part is configured to present the signal indicating the direction in which the vehicle is to be moved, using light or sound.

44. The vehicle according to claim 1, wherein the command generation part is configured to generate the command so that one of the first received power value, the second received power value, power transmission efficiency from the primary coil to the secondary coil, and power transmission efficiency from the secondary coil to the primary coil is increased.

* * * * *